(12) United States Patent
Chen et al.

(10) Patent No.: US 11,125,890 B2
(45) Date of Patent: Sep. 21, 2021

(54) ADVANCED NAVIGATION SATELLITE SYSTEM POSITIONING METHOD AND SYSTEM USING SEEDING INFORMATION

(71) Applicant: Trimble Inc., Sunnyvale, CA (US)

(72) Inventors: Xiaoming Chen, Hoehenkirchen (DE); Nico Reussner, Hoehenkirchen (DE); Stephan Seeger, Hoehenkirchen (DE)

(73) Assignee: Trimble Inc., Sunnyvale, CA (US)

(*) Notice: Subject to any disclaimer, the term of this patent is extended or adjusted under 35 U.S.C. 154(b) by 300 days.

(21) Appl. No.: 16/208,806

(22) Filed: Dec. 4, 2018

(65) Prior Publication Data

US 2019/0196024 A1 Jun. 27, 2019

(30) Foreign Application Priority Data

Dec. 22, 2017 (EP) .................................... 17210152

(51) Int. Cl.
*G01S 19/44* (2010.01)
*G01S 19/29* (2010.01)
(Continued)

(52) U.S. Cl.
CPC .............. *G01S 19/44* (2013.01); *G01S 19/29* (2013.01); *G01S 19/07* (2013.01); *G01S 19/33* (2013.01); *G01S 19/41* (2013.01); *G01S 19/43* (2013.01)

(58) Field of Classification Search
CPC ................................. G01S 19/43; G01S 19/44
See application file for complete search history.

(56) References Cited

U.S. PATENT DOCUMENTS 5,359,332 A 10/1994 Allison et al.
5,991,691 A * 11/1999 Johnson ................... G01S 19/15
342/357.27
(Continued)

FOREIGN PATENT DOCUMENTS

CN 107422343 A * 12/2017
EP 3 206 050 A1 8/2017
(Continued)

OTHER PUBLICATIONS

Extended European Search Report for Application No. 17210152.9-1206, dated Jun. 18, 2018, 7 pages.
(Continued)

*Primary Examiner* — Gregory C. Issing
(74) *Attorney, Agent, or Firm* — Kilpatrick Townsend & Stockton LLP

(57) ABSTRACT

The invention relates to a method carried out by a navigation satellite system (NSS) receiver or a processing entity receiving data therefrom, for estimating parameters useful to determine a position. The NSS receiver observes NSS signals from NSS satellites over multiple epochs. A filter, called "precise estimator", is operated, which uses state variables, makes use of NSS signals observed by the NSS receiver, and computes its state variable values based on observations that are not derived from NSS signals observed by the NSS receiver. Seeding information is obtained, and a constrained solution, called "seeding- and ambiguity-constrained solution", is computed by constraining the ambiguities of the precise estimator by the seeding information, by resolving the resulting ambiguities, and by constraining at least one of the other state variables of the precise estimator by the resolved ambiguities. A corresponding system is also disclosed.

16 Claims, 41 Drawing Sheets

(51) Int. Cl.
  *G01S 19/07* (2010.01)
  *G01S 19/43* (2010.01)
  *G01S 19/41* (2010.01)
  *G01S 19/33* (2010.01)

(56) References Cited

U.S. PATENT DOCUMENTS

| | | | | |
|---|---|---|---|---|
| 6,127,968 | A * | 10/2000 | Lu | G01S 19/44 |
| | | | | 342/357.31 |
| 6,950,059 | B2 * | 9/2005 | Rapoport | G01C 15/00 |
| | | | | 342/357.27 |
| 7,119,741 | B2 | 10/2006 | Sharpe et al. | |
| 7,504,996 | B2 * | 3/2009 | Martin | G01S 19/47 |
| | | | | 342/357.25 |
| 8,760,343 | B2 * | 6/2014 | Milyutin | G01S 19/44 |
| | | | | 342/357.27 |
| 9,164,174 | B2 | 10/2015 | Chen et al. | |
| 9,322,918 | B2 | 4/2016 | Vollath et al. | |
| 9,562,975 | B2 | 2/2017 | Vollath et al. | |
| 9,709,683 | B2 | 7/2017 | Leandro et al. | |
| 10,274,607 | B2 * | 4/2019 | Niesen | G01S 19/426 |
| 10,371,820 | B2 * | 8/2019 | Saito | G01S 19/22 |
| 10,802,160 | B2 * | 10/2020 | Dai | G01S 19/25 |
| 2012/0286991 | A1 * | 11/2012 | Chen | G01S 19/32 |
| | | | | 342/357.23 |
| 2014/0002300 | A1 | 1/2014 | Leandro et al. | |
| 2016/0231429 | A1 | 8/2016 | Wilson et al. | |
| 2016/0231430 | A1 | 8/2016 | Wilson et al. | |
| 2016/0231431 | A1 | 8/2016 | Wilson et al. | |

FOREIGN PATENT DOCUMENTS

| | | |
|---|---|---|
| EP | 3 293 549 A1 | 3/2018 |
| WO | 2011/034616 A2 | 3/2011 |
| WO | 2012/151006 A1 | 11/2012 |

OTHER PUBLICATIONS

Mozo, A. et al., "Demonstrating In-The-Field Real-Time Precise Positioning," 25$^{th}$ International Technical Meeting of the Satellite Division of the Institute of Navigation, Nashville, TN, Sep. 17-21, 2012, pp. 3066-3076.

Watanabe, K., "ARIADNE: Accurate Visual Marker Based Rapid Initialization of PPP," IEEE Aerospace Conference, Mar. 4, 2017, pp. 1-8.

Landau, H. et al., "Virtual Reference Station Systems," *Journal of Global Positioning Systems*, (2002), vol. 1, No. 2, pp. 137-143.

Teunissen, P. J. G. et al., "The least-squares ambiguity decorrelation adjustment: its performance on short GPS baselines and short observation spans," Journal of Geodesy, (1997), vol. 71, pp. 589-602.

Datta-Barua, S. et al., "Bounding higher-order ionosphere errors for the dual-frequency GPS user," Radio Science, vol. 43, 2008, pp. 1-15.

Chen, X. et al., "Trimble RTX, an Innovative New Approach for Network RTK," 24$^{th}$ International Technical Meeting of the Satellite Division of the Institute of Navigation, 2011, ION GNSS 2011, 3: pp. 2214-2219.

Brown, N. et al., "RTK Rover Performance using the Master-Auxiliary Concept," *Journal of Global Positioning Systems*, (2006), vol. 5, No. 1-2: pp. 135-144.

Kalman, R. E., "A New Approach to Linear Filtering and Prediction Problems," Transactions of the ASME, Journal of Basic Engineering, vol. 82D, Mar. 1960, 13 pages.

Teunissen, P. J. G., "A New Method for Fast Carrier Phase Ambiguity Estimation," Proceedings of IEEE Position Location and Navigation Symposium Plans '94, Conference Paper, May 1994, pp. 562-573.

Morton, Y. T. et al., "Assessment of the Higher Order Ionosphere Error on Position Solutions," ION GNSS, 21$^{st}$ International Technical Meeting of the Satellite Division, Sep. 16-19, 2008, Savannah, GA, pp. 2361-2369.

* cited by examiner

ADVANCED NAVIGATION SATELLITE SYSTEM POSITIONING METHOD AND SYSTEM USING SEEDING INFORMATION

CROSS-REFERENCE TO RELATED APPLICATIONS

The present application claims priority to European Patent Application No. EP 17 210 152.9 filed Dec. 22, 2017, the entire contents of which are incorporated herein by reference for all purposes.

FIELD OF TECHNOLOGY

The invention relates to global or regional navigation satellite systems (NSS) position estimation methods, systems and computer programs. The fields of application of the methods, systems and computer programs include, but are not limited to, navigation, map-making, land surveying, civil engineering, agriculture, disaster prevention and relief, and scientific research.

BACKGROUND

Navigation satellite systems (NSS) include both global navigation satellite systems (GNSS) and regional navigation satellite systems (RNSS), such as the Global Positioning System (GPS) (United States), GLONASS (Russia), Galileo (Europe), BDS (China), QZSS (Japan), and the Indian Regional Navigational Satellite System (IRNSS) (systems in use or in development). An NSS typically uses a plurality of satellites orbiting the Earth. The plurality of satellites forms a constellation of satellites. An NSS receiver detects a code modulated on an electromagnetic signal broadcast by a satellite. The code is also called a ranging code. Code detection includes comparing the bit sequence modulated on the broadcasted signal with a receiver-side version of the code to be detected. Based on the detection of the time of arrival of the code for each of a series of the satellites, the NSS receiver estimates its position. Positioning includes, but is not limited to, geolocation, i.e. the positioning on the surface of the Earth.

An overview of GPS, GLONASS and Galileo is provided for instance in sections 9, 10 and 11 of reference [1] (a list of references is provided at the end of the present description).

Positioning using NSS signal codes provides a limited accuracy, notably due to the distortion the code is subject to upon transmission through the atmosphere. For instance, the GPS includes the transmission of a coarse/acquisition (C/A) code at about 1575 MHz, the so-called L1 frequency. This code is freely available to the public, whereas the Precise (P) code is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors, and multipath propagation.

An alternative to positioning based on the detection of a code is positioning based on carrier phase measurements. In this alternative approach or additional approach (ranging codes and carrier phases can be used together for positioning), the carrier phase of the NSS signal transmitted from the NSS satellite is detected, not (or not only) the code modulated on the signal transmitted from the satellite.

The approach based on carrier phase measurements has the potential to provide much greater position precision, i.e. down to centimetre-level or even millimetre-level precision, compared to the code-based approach. The reason may be intuitively understood as follows. The code, such as the GPS C/A code on the L1 band, is much longer than one cycle of the carrier on which the code is modulated. The position resolution may therefore be viewed as greater for carrier phase detection than for code detection.

However, in the process of estimating the position based on carrier phase measurements, the carrier phases are ambiguous by an unknown number of cycles. The phase of a received signal can be determined, but the number of cycles cannot be directly determined in an unambiguous manner. This is the so-called "integer ambiguity problem", "integer ambiguity resolution problem" or "phase ambiguity resolution problem", which may be solved to yield the so-called fixed solution.

GNSS observation equations for code observations and for carrier phase observations are for instance provided in reference [1], section 5. An introduction to the GNSS integer ambiguity resolution problem, and its conventional solutions, is provided in reference [1], section 7.2. The skilled person will recognize that the same or similar principles apply to RNSS systems.

The main GNSS observables are therefore the carrier phase and code (pseudorange), the former being much more precise than the latter, but ambiguous. These observables enable a user to obtain the geometric distance from the receiver to the satellite. With known satellite position and satellite clock error, the receiver position can be estimated.

As mentioned above, the GPS includes the transmission of a C/A code at about 1575 MHz, the so-called L1 frequency. More precisely, each GPS satellite transmits continuously using two radio frequencies in the L-band, referred to as L1 and L2, at respective frequencies of 1575.42 MHz and 1227.60 MHz. With the ongoing modernization of the GPS, signals on a third L5 frequency are becoming available. Among the two signals transmitted on L1, one is for civil users and the other is for users authorized by the United States Department of Defense (DoD). Signals are also transmitted on L2, for civil users and DoD-authorized users. Each GPS signal at the L1 and L2 frequencies is modulated with a pseudo-random number (PRN) code, and with satellite navigation data. Two different PRN codes are transmitted by each satellite: a C/A code and a P code which is encrypted for DoD-authorized users. Each C/A code is a unique sequence of 1023 bits, which is repeated each, millisecond. Other NSS systems also have satellites transmitting multiple signals on multiple carrier frequencies.

The common-mode errors of GNSS positioning (i.e., the errors common to all satellite measurements) are orbit errors and signal propagation time errors caused by the atmosphere. Common-mode errors are nearly identical for close nearby stations and the difference between the errors grows with the distance between the two GNSS stations. In network real-time kinematic (RTK), a network of reference stations is not used to simply select the closest reference station for the relative positioning of a rover station although that would indeed reduce the common-mode errors. A main feature of network RTK is the estimation of common-mode errors at the reference stations based on fixed double-difference ambiguities. Afterwards, the errors are interpolated for the location of the rover station. Since the error reduction by interpolation is better than the reduction by observation differencing, the spacing between reference stations can be increased to 50-100 km. Known methods of network RTK include Area Correction Parameters (ACP), Virtual Reference Station (VRS) (references [2], [3]), and Master Auxiliary Concept (MAC) (reference [4]). In all these methods, finally the observation data of one or several reference stations are transmitted to the rover. The need for local reference stations is eliminated when a regional and/or global network of reference stations has been incorporated into the system, which allows the absolute position of the rover to be determined in a global reference frame such as the International Terrestrial Reference System (ITRF). Such methods using regional and/or global networks are often referred to as "precise point positioning" (PPP). U.S. Pat. No. 9,164,174 B2 discloses an example of such a system using a global network and regional network.

U.S. Pat. No. 7,119,741 B2 relates to the combined use of a local RTK system and a wide-area differential GPS system (WADGPS), and to using an RTK system to initialize the floating ambiguity values in the WADGPS system (abstract). In that system, the known position of a user receiver may be used to compute a set of theoretical ranges to the satellites (col. 9, lines 28-43), an initial floating ambiguity value corresponding to each satellite is computed by subtracting from the computed theoretical range the range obtained from a refraction-corrected carrier-phase measurement with respect to the same satellite (col. 9, lines 44-54), and the floating ambiguity values are resolved by adding the initial floating ambiguity values to corresponding refraction-corrected carrier-phase measurements in subsequent measurement epochs and setting the variance of the floating ambiguity values to low (col. 9, line 55 to col. 10, line 9). U.S. Pat. No. 7,119,741 B2 therefore appears to relate to a coarse "subtracting-then-adding" method.

U.S. Pat. No. 9,709,683 B2 relates to a method for processing GNSS data to provide high precision positioning with rapid solution convergence or reconvergence, by taking advantage of predetermined knowledge of the user location (known position input). An ionospheric-free carrier-phase ambiguity per satellite is estimated based on a known rover antenna position. The estimated ionospheric-free carrier phase ambiguities are then used to assist in determining an aided rover antenna position.

There is a constant need for improving the implementation of positioning systems based notably on GNSS (or RNSS) measurements, to obtain a precise estimation of the receiver position, and in particular to quickly obtain a precise estimation by reducing convergence and reconvergence times following, for example, partial or full interruptions of GNSS signal tracking typical in obscured user environments, so as to increase the productivity of such positioning systems.

SUMMARY

The present invention aims at addressing, at least partially, the above-mentioned need. The invention includes methods, systems, and computer programs as defined in the independent claims. Particular embodiments are defined in the dependent claims.

In one embodiment, a method is carried out by an NSS receiver and/or a processing entity capable of receiving data from the NSS receiver, in order to estimate parameters useful to determine a position (such as for example the position of the NSS receiver). The NSS receiver observes an NSS signal from each of a plurality of NSS satellites over multiple epochs, each of these epochs being here referred to as "receiver epoch". The method comprises operating a filter, here referred to as "precise estimator", that uses state variables comprising at least, but not only, ambiguities in the carrier phases. The precise estimator computes values of its state variables and associated covariances, those values being here referred to as a "float solution" (FS), based on (a) at least one of: (a.1) NSS signals observed by the NSS receiver, and (a.2) information derived from said. NSS signals; and (b) information, here referred to as "reference information", comprising at least one of: (b.1) observations that are not derived from NSS signals observed by the NSS receiver, and (b.2) information derived from said observations. The method further comprises obtaining information, here referred to as "seeding information", comprising at least one of: (i) a position of the NSS receiver and associated covariances, (ii) tropospheric delay information and associated covariances, and (iii) ionospheric delay information and associated covariances. The method also comprises computing a constrained solution, here referred to as "seeding- and ambiguity-constrained solution" (SACS), by constraining the ambiguities of the precise estimator by the seeding information, resolving the resulting precise estimator's ambiguities, and constraining at least one of the other state variables of the precise estimator by the resolved ambiguities.

The method enables the reduction of the convergence and reconvergence times compared to prior art methods. This is achieved by incorporating seeding information, such as for example an accurate position input, into the computation, so that a precise navigation solution is generally provided more quickly than if no seeding information was used. In particular, the seeding information is incorporated by means of at least the three following steps: first, the ambiguities of the precise estimator are pre-constrained by the seeding information; secondly, the resulting ambiguities are resolved; and then at least one of the other state variables of the precise estimator is constrained by the resolved ambiguities.

The invention also relates, in one embodiment, to a system comprising an NSS receiver and/or a processing entity capable of receiving data from the NSS receiver, for estimating parameters useful to determine a position, wherein, as explained above, the NSS receiver observes an NSS signal from each of a plurality of NSS satellites over multiple receiver epochs. The system comprises a precise estimator configured for operation as described above, and the system is further configured for obtaining seeding information and for computing an SACS, as described above.

The invention also relates, in some embodiments, to computer programs, computer program products, and storage mediums for storing such computer programs, comprising computer-readable instructions configured for causing the above-mentioned method to be carried out when said computer-readable instructions are executed on a computer such as one embedded in an NSS receiver or in another apparatus, device, or system.

BRIEF DESCRIPTION OF THE DRAWINGS

Embodiments of the present invention shall now be described, in conjunction with the appended drawings in which:

FIG. 1b schematically illustrates an exemplary architecture of the method illustrated in FIG. 1a;

FIG. 5b schematically illustrates an exemplary architecture of the method illustrated in FIG. 5a;

DETAILED DESCRIPTION

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive. A list of abbreviations and their meaning is provided at the end of the detailed description.

Throughout the following detailed description, the abbreviation "GNSS" is sometimes used. The invention is, however, not limited to global navigation satellite systems (GNSS) but also applies to regional navigation satellite systems (RNSS) or a combination of GNSS and RNSS. Thus, it is to be understood that each occurrence of "GNSS" in the following can be replaced by "RNSS" or "GNSS and RNSS" to form additional embodiments.

Figure 1A:
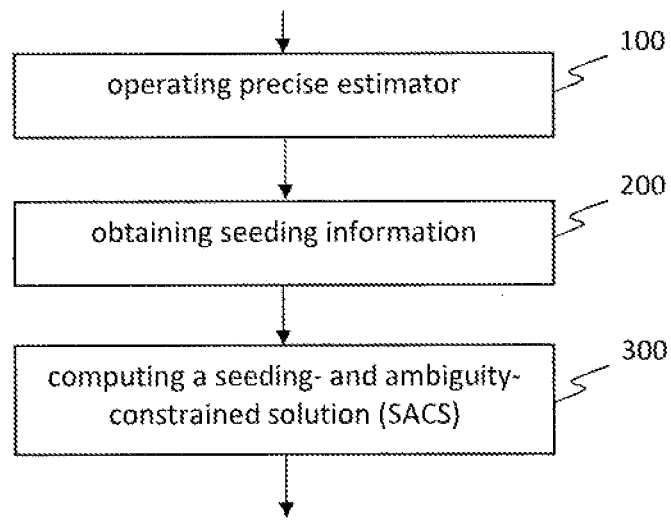
FIG. 1a is a flowchart of a method in one embodiment of the invention.
Figure 1B:
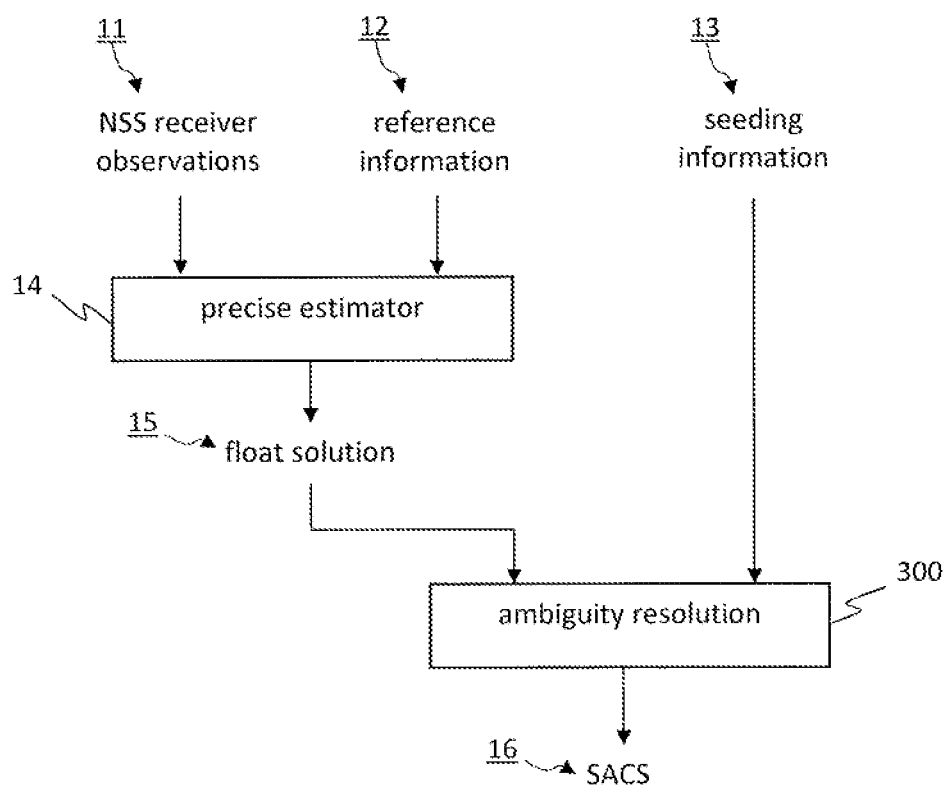

FIG. 1a is a flowchart of a method in one embodiment of the invention, and FIG. 1b schematically illustrates a corresponding exemplary architecture for such a method. The method is carried out by an NSS receiver and/or a processing entity capable of receiving data from the NSS receiver. This means that embodiments of the invention may be carried out (a) in an NSS receiver, (b) in another processing entity, for example for post-mission processing purposes, or (c) in both an NSS receiver and another processing entity.

The purpose of the method is to estimate parameters useful to determine a position, such as for example the position of the NSS receiver.

The estimated parameters may for example indicate the most probable number of carrier cycles along the distance separating an NSS satellite from the NSS receiver, i.e. the estimated parameters may be the resolved integer ambiguity. This also means that the method may output the position itself but not necessarily: parameters may be output that may be used, for example by another entity (such as a processing entity on a server dedicated to such task), to estimate or determine the position of the NSS receiver (i.e., the rover position) or of a reference station. Furthermore, other parameters such as, for example, properties of the ionosphere may be output. Indeed, if the position of both the NSS receiver and the plurality of NSS satellites are known, resolving the integer ambiguities may enable the determination of parameters affecting the transmission of the signals (or some components thereof) through the ionosphere or other parts of the atmosphere. Yet furthermore, beyond determining the position of a rover or a reference station, if the position of NSS receivers (such as reference stations) is known, solving the integer ambiguities in the carrier phases by solving observation equations may also be used to eventually determine the position of a satellite.

The NSS receiver observes an NSS signal from each of a plurality of NSS satellites over multiple epochs. Each of these epochs is here referred to as "receiver epoch". The observed NSS signal may for example be a GPS signal (such as for example the L1 or L2 signal), a GLONASS signal, a Galileo signal, a BeiDou signal, a QZSS signal, or an IRNSS signal. If a given NSS satellite emits more than one NSS signal, the NSS receiver may observe more than one NSS signal from said satellite. Furthermore, the NSS receiver may observe NSS signals from a single NSS or, alternatively, from a plurality of different NSS.

The method comprises operating 100 a filter 14, here referred to as "precise estimator" 14. In that context, a filter is or comprises an algorithm or process, or a piece of software and/or hardware configured for implementing such an algorithm or process, in which a set of state variables (or "state vector") are maintained over time, i.e. the values of the state variables are estimated based on a series of measurements made over time.

Precise estimator 14 may comprise, for example, a Kalman filter, a least squares estimator, and/or a robust estimator. The invention is, however, not limited to the use of Kalman filter(s), least squares estimator(s), and/or robust estimator(s).

Precise estimator 14 uses state variables, including ambiguities in the carrier phases and some other state variables (such as for example, but not limited to: position offset to an approximate position, receiver clock error, ionospheric delay, and tropospheric delay). Furthermore, precise estimator 14 computes values of its state variables and associated covariances. These computed values are here collectively referred to as a "float solution" (FS) 15, which is the complete state vector and covariance matrix. By "covariances", it is here meant for the sake of conciseness both the variances and covariances (since it is well known that, in a covariance matrix, the diagonal elements are variances).

In particular, FS 15 is computed based, on the one hand, on (a) information, here referred to as "NSS receiver observations" 11, comprising: (a.1) NSS signals observed by the NSS receiver (i.e., observations by the NSS receiver), and/or (a.2) information derived from said NSS signals (such as for example, but not limited to: a linear combination of NSS signals observed by the NSS receiver, and/or a noise model derived from the NSS signals observed by the NSS receiver); and, on the other hand, on (b) information, here referred to as "reference information" 12, comprising: (b.1) observations that are not derived from NSS signals observed by the NSS receiver, and/or (b.2) information derived from said observations. Reference information 12 is generally delayed with respect to the receiver epoch under consideration, when it reaches or is used by precise estimator 14. In one embodiment, reference information 12 comprises NSS observations from at least one reference NSS receiver.

For example, reference information 12, which precise estimator 14 receives, may comprise correction information obtained by a network of reference stations (i.e., reference receivers). The correction information may comprise correction data relating to NSS satellites, such as, but not limited to, accurate orbital data and accurate satellite clock data. The correction information may be computed or prepared by a regional and/or global network of reference receivers with precisely known positions in a global reference frame (i.e., coordinate system). The data from the reference receivers is transmitted for example over the internet to a processing centre, where the data is collected, synchronized, and processed. During the data processing, a variety of products may be generated, including e.g. satellite orbits, satellite clock errors, GNSS (and/or RNSS) measurement biases, and atmospheric corrections. The products (or corrections) may then be sent to the NSS receivers (i.e., the rovers) on the field. The transmission to the NSS receivers may take place in many different forms, of which the most commonly used are the internee and satellite links. For a descriptive example of a global GNSS positioning correction service see e.g. WO 2011/034616 A2.

In one embodiment, reference information 12 comprises delayed NSS data, i.e. NSS information that is delayed by at least one receiver epoch.

The method further comprises obtaining 200 seeding information 13. Seeding information 13 comprises at least one of: (i) a position of the NSS receiver and associated covariances, (ii) tropospheric delay information and associated covariances, and (iii) ionospheric delay information and associated covariances.

In one embodiment, seeding information 13 comprises only a position of the NSS receiver and covariances associated therewith (element (i)). In one embodiment, seeding information 13 comprises only tropospheric delay information and covariances associated therewith (element (ii)). In one embodiment, seeding information 13 comprises only ionospheric delay information and covariances associated therewith (element (iii)). In one embodiment, seeding information 13 comprises a combination of two of elements (i), (ii), and (iii), i.e. the combination of elements (i) and (ii), the combination of elements (i) and (iii), or the combination of elements (ii) and (iii). In one embodiment, seeding information 13 comprises the combination of all of three elements (i), (ii), and (iii).

Seeding information 13 may for example be inputted by an end user by means of a user interface, or it may be retrieved from a local or external storage unit using wired and/or wireless communication means (e.g., the information may come from a previous survey operation using the NSS receiver under consideration or another NSS receiver).

The method further comprises computing 300 a constrained solution, here referred to as "seeding- and ambiguity-constrained solution" (SACS) 16, through (at least) the following three consecutive steps:

constraining the ambiguities of precise estimator 14 by seeding information 13 (in that respect, see for example equations (29) and (30) below, and the related description), resolving the resulting, constrained precise estimator's ambiguities (in that respect, see for example equations (25) to (28) below, and the related description), and constraining at least one of the other state variables of precise estimator 14 by the resolved ambiguities (in that respect, see for example equations (31) to (34) below, and the related description).

Through these three steps, seeding information 13 is incorporated in a more rigorous manner than in prior art methods, as seeding information 13 is used as a direct constraint in the ambiguity resolution. These three steps may be further understood by reference to FIG. 15*b*, which schematically illustrates an exemplary embodiment for the computation 300 of SACS 16. By "the other state variables" of precise estimator 14, it is meant here the precise estimator's 14 state variables other than the ambiguities in the carrier phases. Furthermore, regarding the concept of "constraining" state variables, see one possible, exemplary implementation that is expressed by equations (23) and (24) below, discussed in the related description, and, illustrated by FIG. 20.

The method may for example output a position solution (or navigation solution) which may be SACS 16, a position solution derived therefrom, or a position solution selected based on some test(s) performed on SACS 16 (as will be explained further below). The outputted position solution may include parameters to determine a position, or estimated errors that may be used by (an)other filter(s), unit(s) or entity(ies) to determine a position.

The method enables the reduction of the convergence and reconvergence times compared to prior art methods. This is achieved by incorporating seeding information 13 (or "first seeding information", such as for example position information, ionospheric information, and/or tropospheric information, as explained above) and the corresponding covariances (i.e., variances and co-variances) into the computation, so that a precise navigation solution may be provided more quickly than if no seeding information was used. In particular, seeding information 13 is incorporated in the process by means of the three above-described steps, which together form an efficient and rigorous way of incorporating seeding information 13.

The order of steps 100, 200, 300 may be different from that shown in FIG. 1a. In particular, seeding information 13 may be obtained 200 before, or in parallel with, operating 100 precise estimator 14. Steps 100, 200, 300 may also repeated for a plurality of receiver epochs.

Figure 2:
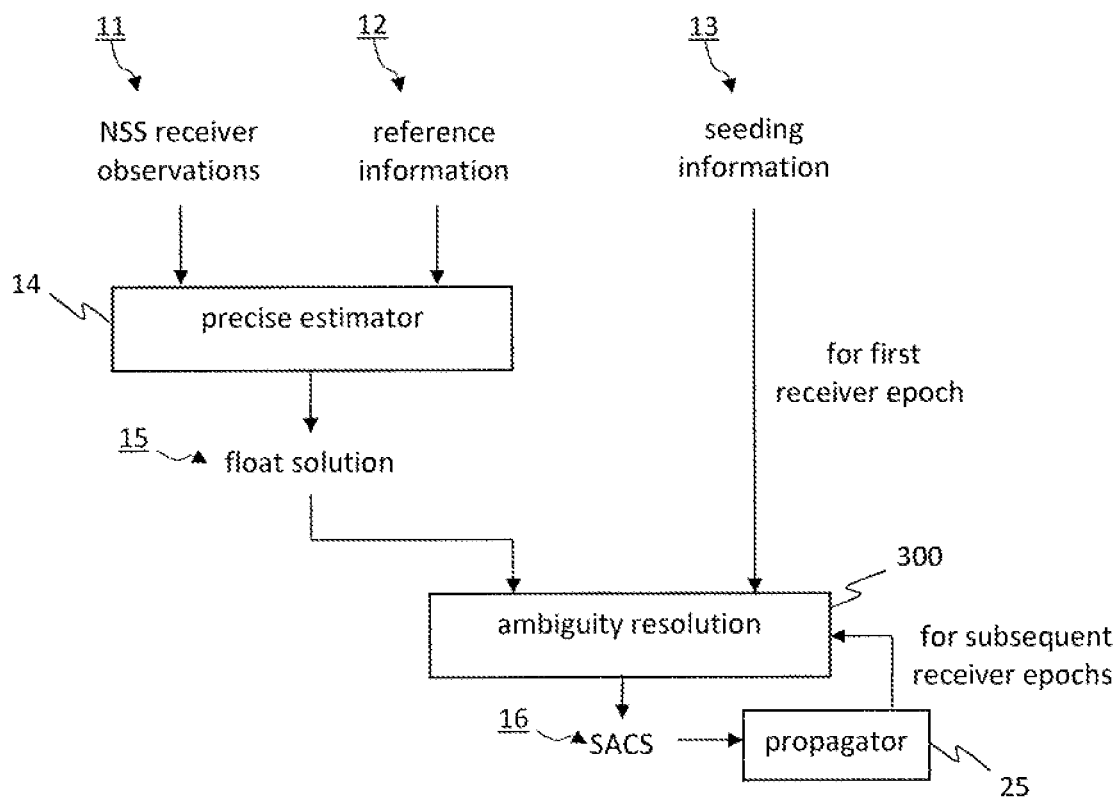
FIG. 2 schematically illustrates an exemplary architecture of a method in one embodiment of the invention, wherein the SACS is used, after propagation to the next receiver epoch, as seeding information for subsequent receiver epochs.

FIG. 2 schematically illustrates an exemplary architecture of a method in one embodiment of the invention, which differs from the method described with reference to FIGS. 1a and 1b in that, in FIG. 2, SACS 16 is used as seeding information for subsequent receiver epochs, i.e. SACS 16 is used as subsequent seeding information after propagation of SACS 16 to the next receiver epoch.

In particular, for a first receiver epoch, an SACS 16 is computed 300 by constraining the ambiguities of precise estimator 14 by seeding information 13, by resolving the resulting, constrained ambiguities of precise estimator 14, and by constraining at least one of the other state variables of precise estimator 14 by the resolved ambiguities.

Then, for a second receiver epoch after the first receiver epoch, an SACS 16 is computed 300 as follows: The ambiguities of precise estimator 14 are constrained by the SACS 16 computed for the first receiver epoch, after propagation, by means of propagator 25 or propagator unit 25, of SACS 16 to the next receiver epoch. The resulting, constrained ambiguities are resolved. Then, at least one of the other state variables of precise estimator 14 is constrained by the resolved ambiguities.

Thereafter, for at least one receiver epoch after the second receiver epoch, an SACS 16 is computed 300 as follows: The ambiguities of precise estimator 14 are constrained by the SACS 16 computed for the receiver epoch preceding the receiver epoch under consideration, after propagation of SACS 16 to the receiver epoch under consideration. The resulting, constrained ambiguities are resolved. Then, at least one of the other state variables of precise estimator 14 is constrained by the resolved ambiguities.

In other words, subsequent seeding information is based on the results of the previous epoch after propagation of these results in time, so that a feedback loop is formed within the processing without requiring additional input. Such feedback loop allows the user to move the NSS receiver after the first application of the original seeding information 13. In some embodiments, when seeding information 13 comprises ionospheric delay information and/or tropospheric delay information, the feedback loop becomes immune against cycle slips on all satellites at the same time.

As mentioned above, the propagation of SACS 16 to the next receiver epoch may be carried out, in one embodiment, by means of propagator 25 or propagator unit 25. The propagation in time of SACS 16 may for example, be carried out as follows:

a) For position state variables, the propagation of SACS 16 may be carried out by means of a timely estimator based on delta-phase observations (i.e. phase observations differenced between two time steps, thus eliminating ambiguities in that respect, see references [11], [12], [13], [14]; and see also equations (35) and (36) below and the related description), or by means of an alternative timely estimator (using for example the method described in reference [5]; see also propagated position as expressed by equation (41) below and the related description).

b) For ionospheric and tropospheric state variables, the propagation may be carried out by simply keeping their values and optionally increasing their variances.

Figure 12:
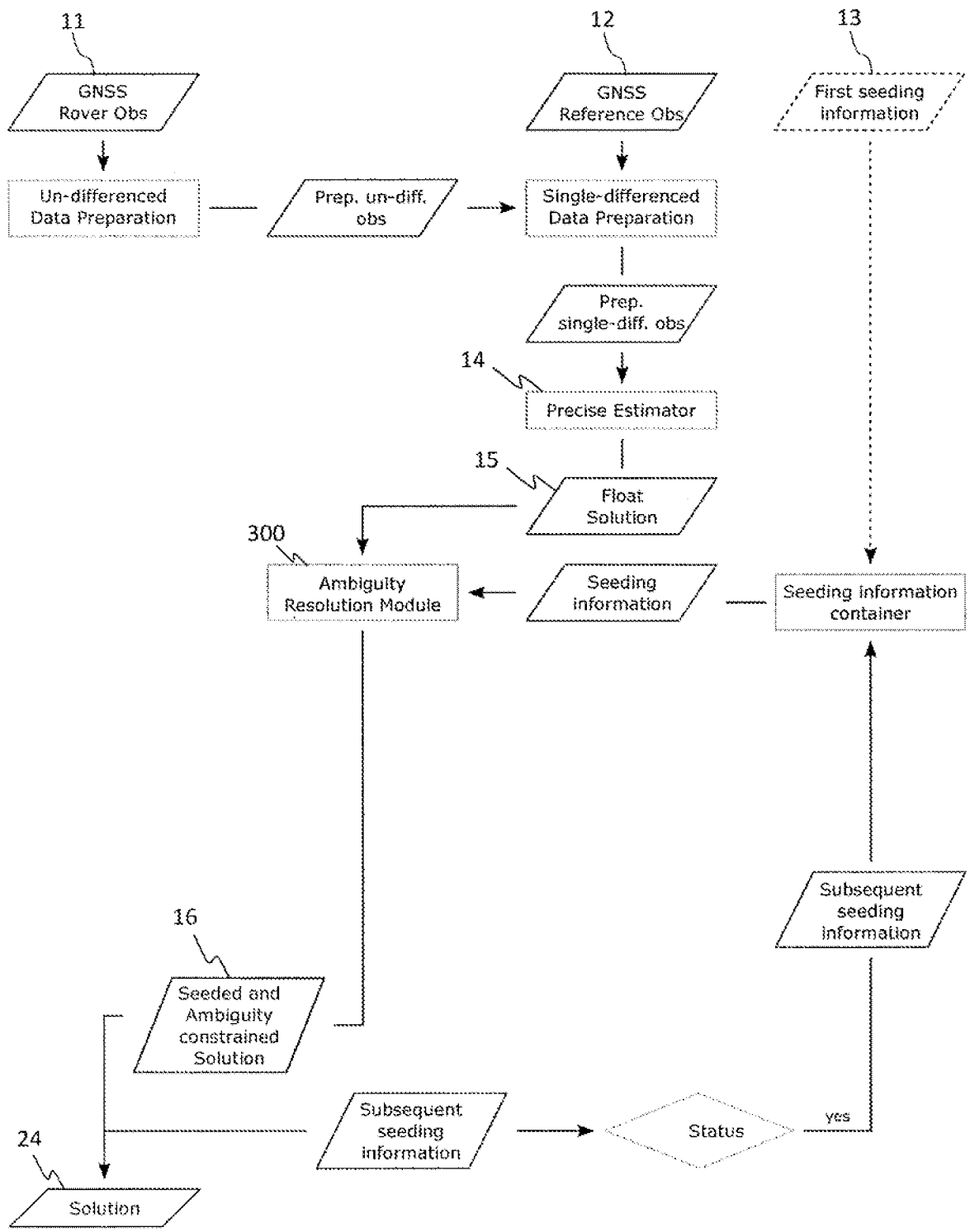
FIG. 12 schematically illustrates an exemplary architecture of a method in one embodiment of the invention, wherein the SACS is used, after propagation to the next receiver epoch, as seeding information for subsequent receiver epochs.

The process involving the above-discussed feedback loop may be further understood by reference to FIG. 12, which schematically illustrates an embodiment being similar to the method discussed with reference to FIG. 2, wherein SACS 16 may be used as seeding information for subsequent receiver epochs after propagation of SACS 16 in time. In FIG. 12, the lozenge-shaped box labelled "Status" refers generally to the feature according to which the feedback loop initiated based on initial seeding information 13 may be terminated under certain conditions, for example after a given duration.

Namely, a feedback loop initiated based on a given seeding information may be terminated at any time, i.e. immediately at the first receiver epoch, at a second receiver epoch, or at any subsequent receiver epoch. Furthermore, the termination may be triggered, in some embodiments, by the outcome of a convergence check, or, in the same or other embodiments, by the outcome of a consistency check. Other reasons may lead to terminating said feedback loop, such as for example the loop having reached a maximum number of occurrences or the loop having operated during a maximum period of time.

In one embodiment, the process may be repeated until it is determined that an ambiguity-constrained solution (ACS) 20 has converged towards SACS 16 (as will be explained by way of example with reference to FIGS. 4a to 4c, 7a to 7c, 11a to 11c, 14a to 14c, 18a, and 18b) and/or until it is determined that SACS 16 has become inconsistent (as will be explained by way of example with reference to FIGS. 3a to 7c, 10a to 14c, 16a to 17b, and 18b).

In one embodiment, the nature of the initial seeding information 13 may differ from that of the subsequent seeding information 13, i.e. from that of the seeding information 13 resulting from the feedback loop. For example, the initial seeding information 13 may comprise a position of the NSS receiver and associated covariances, whereas the subsequent seeding information 13 may comprise ionospheric delay information and associated covariances.

Figure 3A:
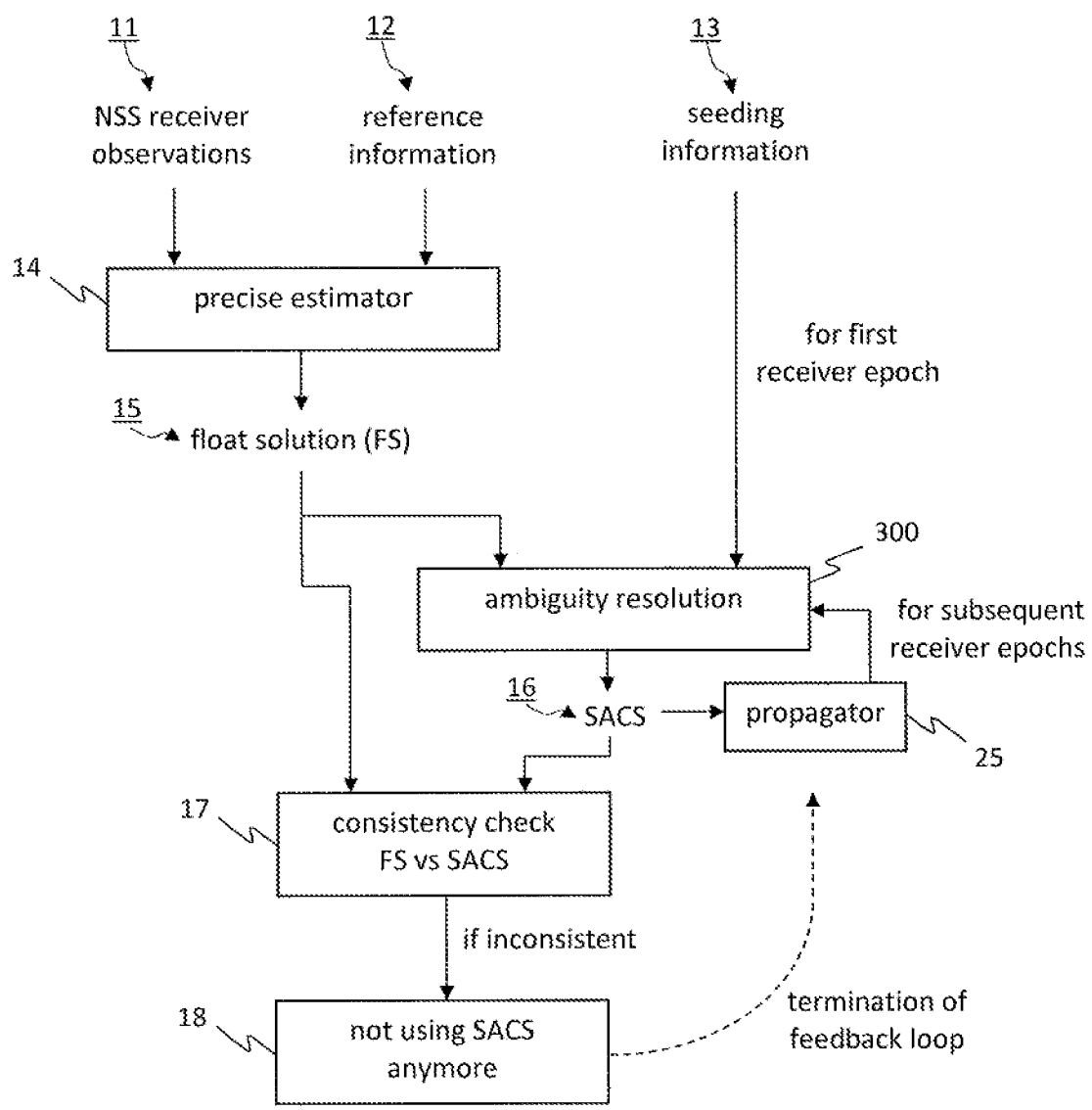
FIG. 3a schematically illustrates an exemplary architecture of a method in one embodiment of the invention, involving an SACS vs FS consistency check.

FIG. 3a schematically illustrates an exemplary architecture of a method in one embodiment of the invention, which differs from the methods described with reference to FIGS. 1a, 1b, and 2 in that, in FIG. 3a, an SACS vs FS consistency check 17 is carried out. Consistency check 17 is performed in order to decide whether to continue using SACS 16.

In particular, the method comprises, at a receiver epoch under consideration: determining 17 whether the SACS 16 computed at the receiver epoch under consideration is inconsistent with the FS 15 computed by precise estimator 14 at the receiver epoch under consideration. If so, the SACS 16 computed at the receiver epoch under consideration is not propagated in time and not used 18 to constrain the ambiguities of precise estimator 14 in order to compute an SACS for any receiver epoch following the receiver epoch under consideration. That is, SACS 16 is no longer used for subsequent receiver epochs, and the feedback loop is terminated, as illustrated by the dashed arrow labelled "termination of feedback loop" originating from the box 18 labelled "not using SACS anymore". When new seeding information 13 is received, obtained, and/or inputted, the process making use of seeding information 13 may however start again, and a new feedback loop may be initiated.

Figure 13A:
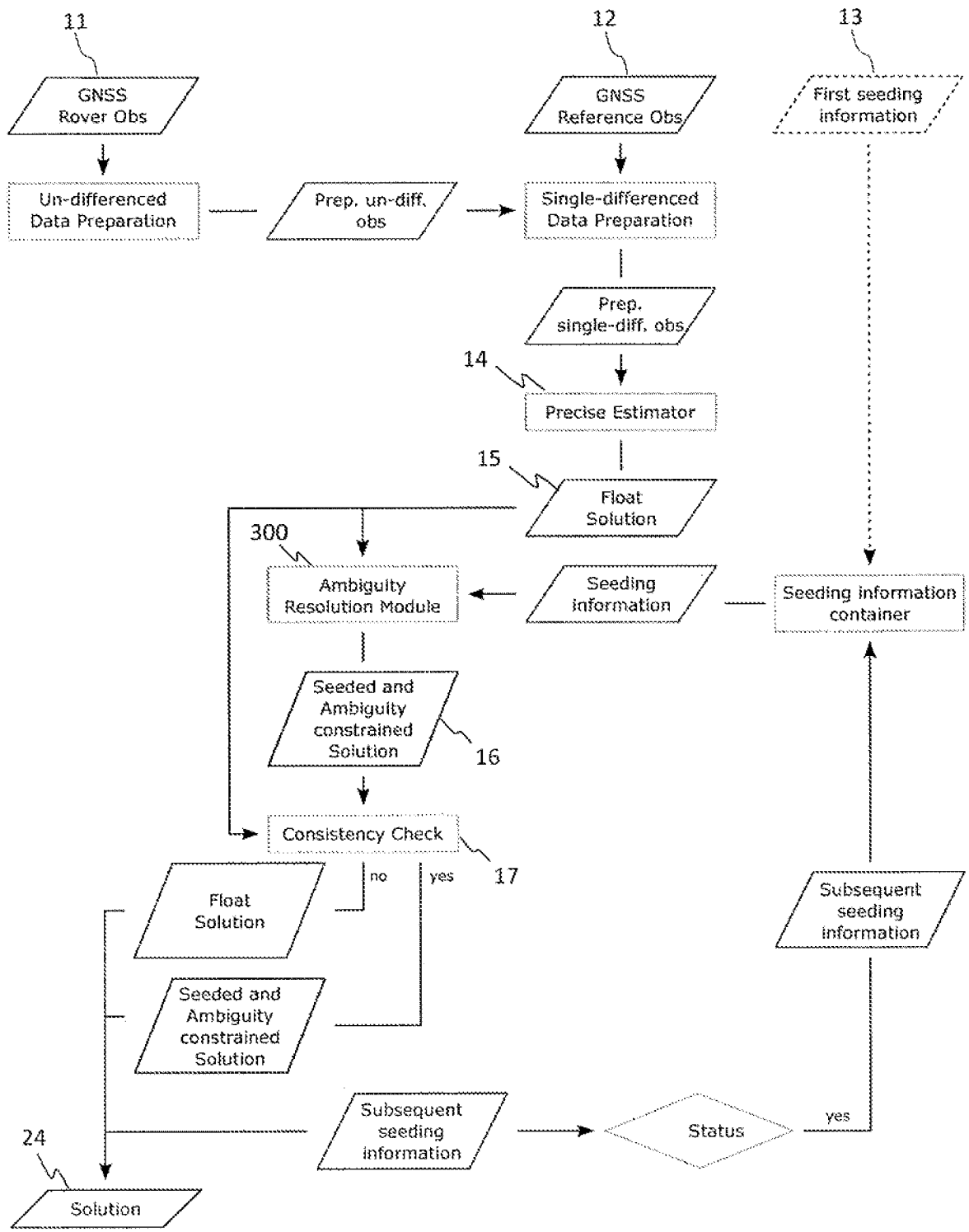
FIGS. 13a to 13c and 14a to 14c schematically illustrate the exemplary architecture of six methods in six embodiments of the invention, each involving at least a consistency check.

The process may be further understood by reference to FIG. 13a, which schematically illustrates an embodiment being similar to the method discussed with reference to FIG. 3a.

A consistency check, such as consistency check 17, is useful because incorrect seeding information, e.g. position information which does not fit to current user location, may corrupt the final solution. Hence, there is a potential misuse due to incorrect seeding information. Statistical tests may be performed to detect incorrect first seeding information 13 and/or incorrect subsequent seeding information. If one of the resulting figures exceeds a predefined threshold, the test fails (consistency check).

Figure 17A:
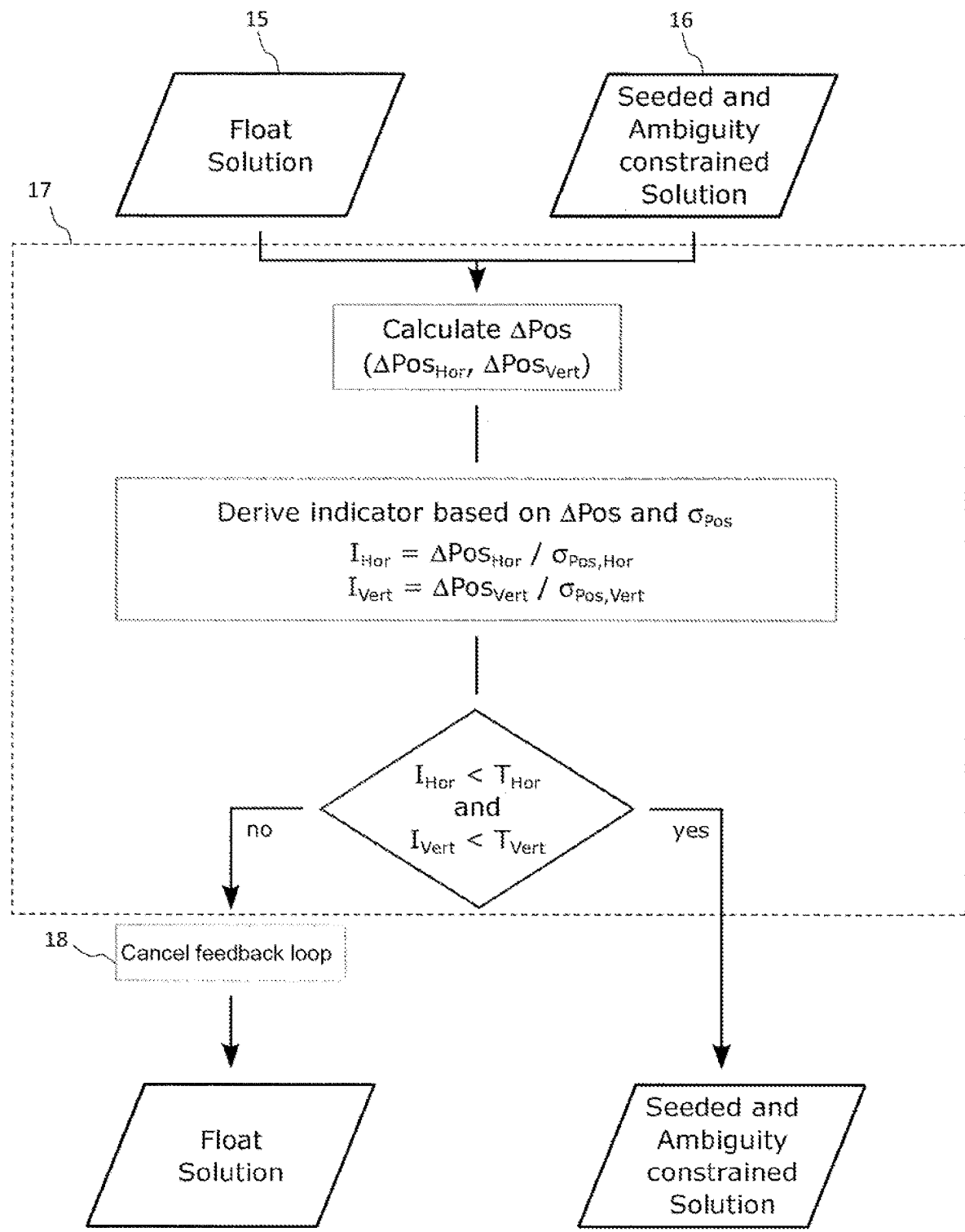
FIG. 17a schematically illustrates exemplary steps for performing an FS vs SACS consistency check in one embodiment of the invention.

In particular, before making use of SACS 16 (as current positioning solution or, for example, by forwarding SACS 16 to a timely estimator, as will be described later on with reference to FIGS. 5a, 5b, and 9), SACS 16 may be compared 17 to FS 15. FIG. 17a schematically illustrates such a process in one embodiment of the invention. In particular, the statistical tests may be carried out independently for the horizontal and vertical component. For example, if horizontal indicator $I_{Hor}$ exceeds a threshold $T_{Hor}$, or if vertical indicator $I_{Vert}$ exceeds a threshold $T_{Vert}$, or if both indicators $I_{Hor}$, $I_{Vert}$ exceed their respective thresholds $T_{Hor}$, $T_{Vert}$, the feedback loop may be stopped 18. That is, no subsequent seeding information is derived from the final solution and no subsequent seeding information is used in the next epoch. FS 15 rather than SACS 16 is then used (as current positioning solution or, for example, to compute a positioning solution via a timely estimator, as will be described later on with reference to FIGS. 6a and 10a, and as expressed by equation (41)).

Figure 3B:
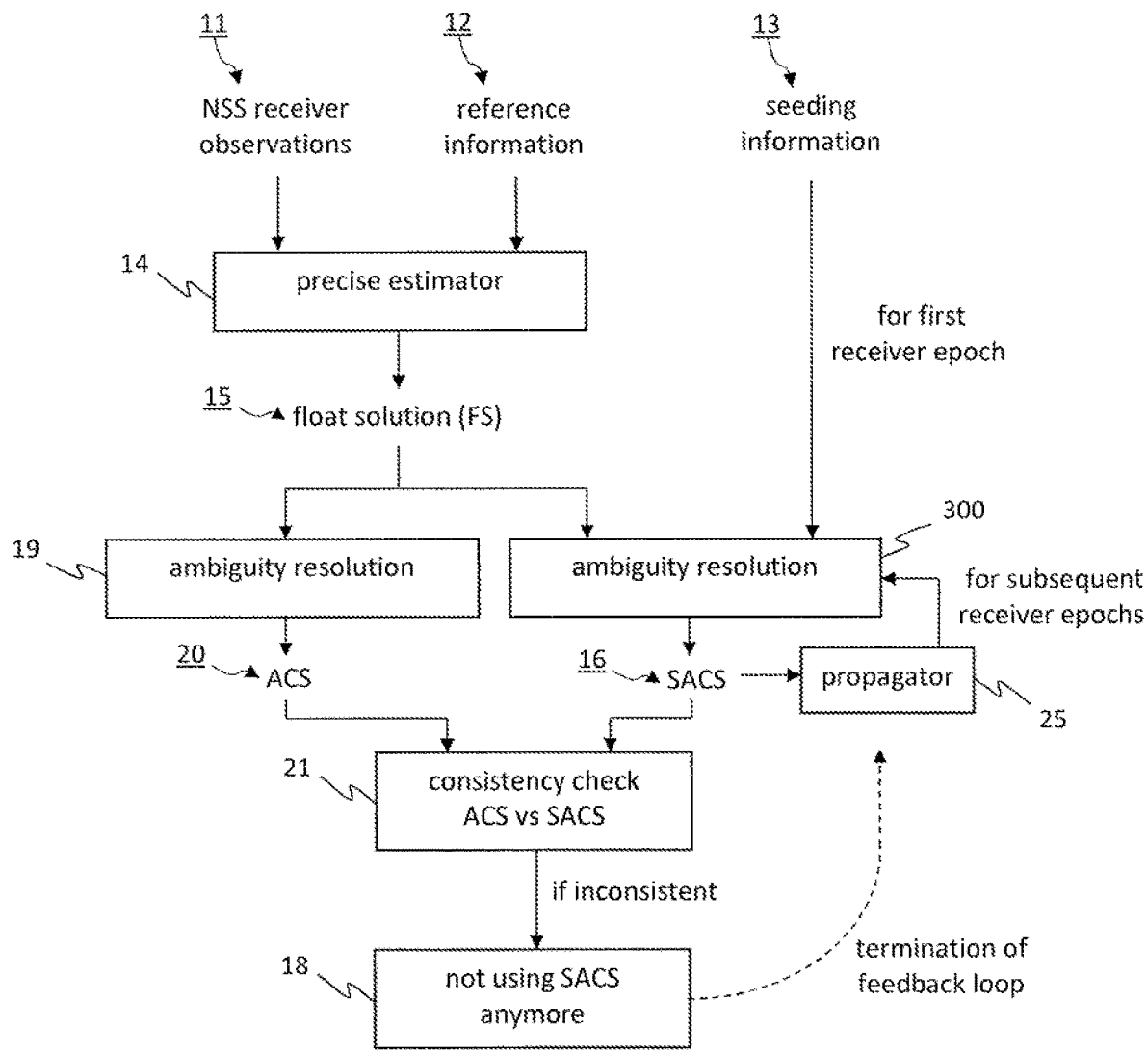
FIG. 3b schematically illustrates an exemplary architecture of a method in one embodiment of the invention, involving an SACS vs ambiguity-constrained solution (ACS) consistency check.

FIG. 3b schematically illustrates an exemplary architecture of a method in one embodiment of the invention, which differs from the method described with reference to FIGS. 1a and 1b and FIG. 2 in that, in FIG. 3b, an ACS vs SACS consistency check 21 is carried out.

In particular, the method further comprises, at a receiver epoch under consideration the following steps: A further constrained solution, i.e. ACS 20, is computed 19 by resolving precise estimator's 14 ambiguities and by constraining at least one of the other state variables of the precise estimator 14 by the resolved ambiguities. Then, it is determined 21 whether the SACS 16 computed at the receiver epoch under consideration is inconsistent with the ACS 20 computed at the receiver epoch under consideration. If so, the SACS 16 computed at the receiver epoch under consideration is not propagated in time and not used 18 to constrain the ambiguities of precise estimator 14 in order to compute an SACS for any receiver epoch following the receiver epoch under consideration. That is, the feedback loop is terminated, as illustrated by the dashed arrow labelled "termination of feedback loop".

Figure 13B:
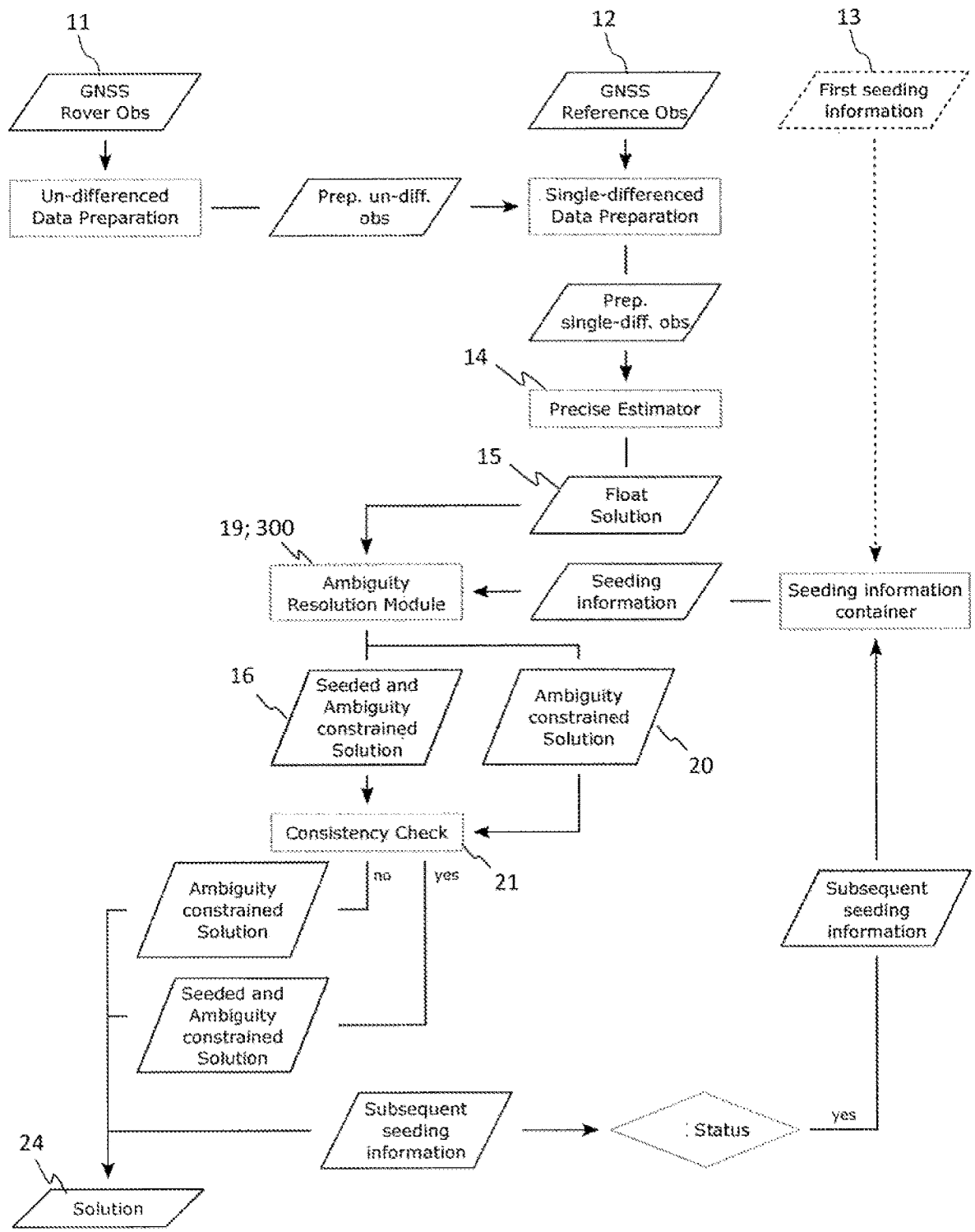

The process may be further understood by reference to FIG. 13b, which schematically illustrates an embodiment being similar to the method discussed with reference to FIG. 3b.

Figure 15A:
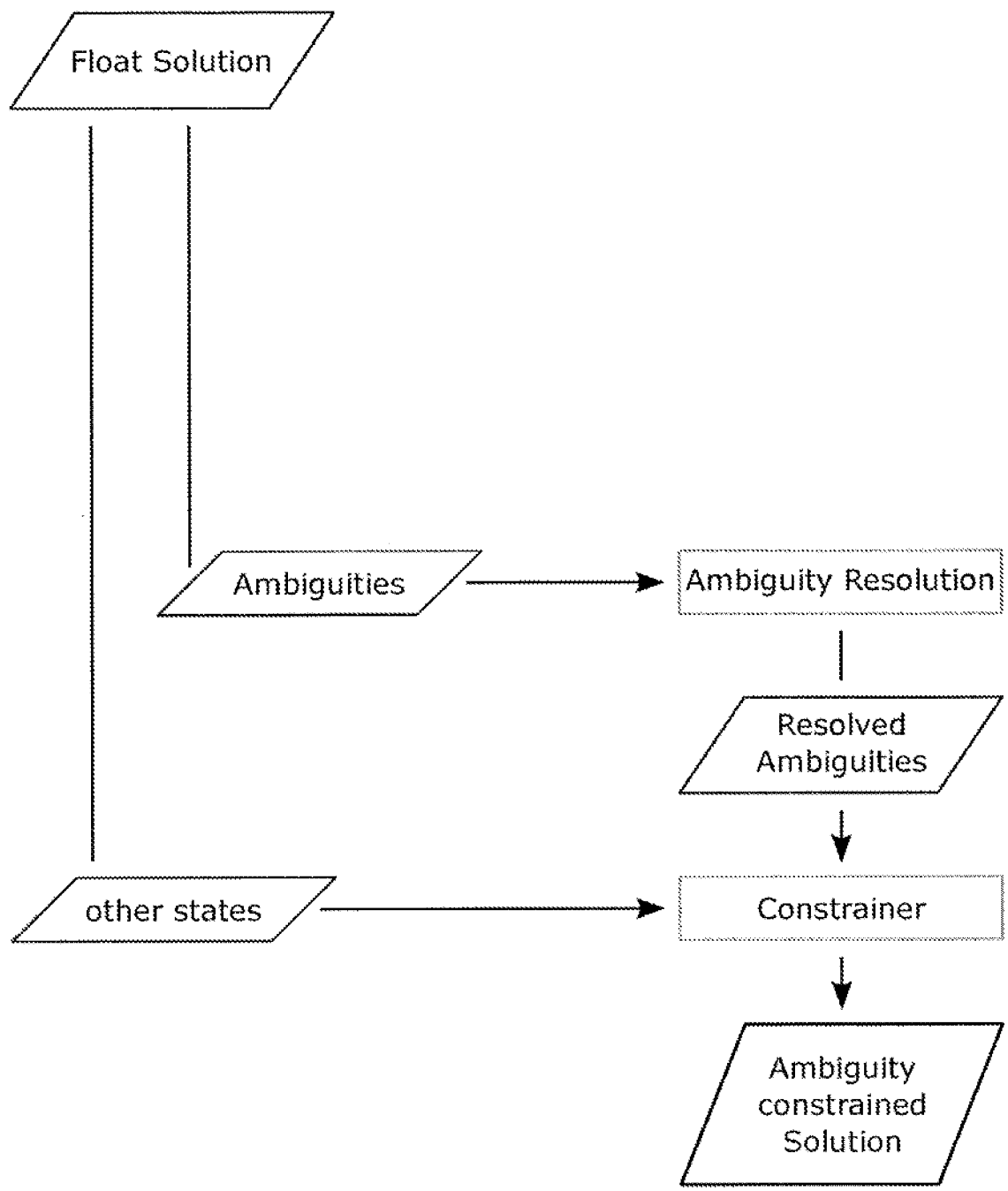
FIG. 15a schematically illustrates exemplary steps for computing an ACS in one embodiment of the invention.
Figure 15B:
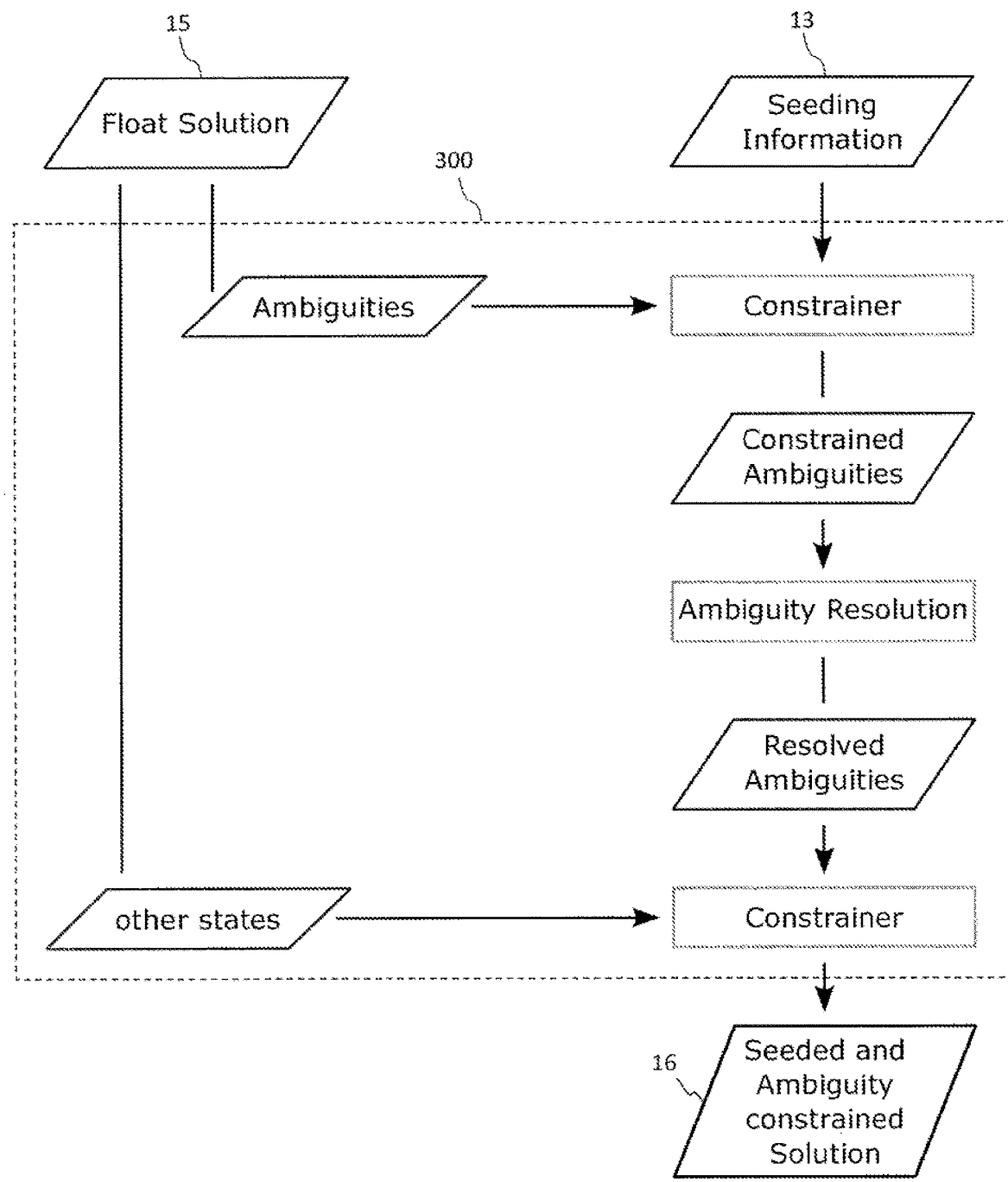
FIG. 15b schematically illustrates exemplary steps for computing an SACS in one embodiment of the invention.

ACS 20 is generated by resolving the ambiguities and by constraining at least one of the other state variables of FS 15 by the resolved ambiguities, as illustrated in FIG. 15a.

Figure 16A:
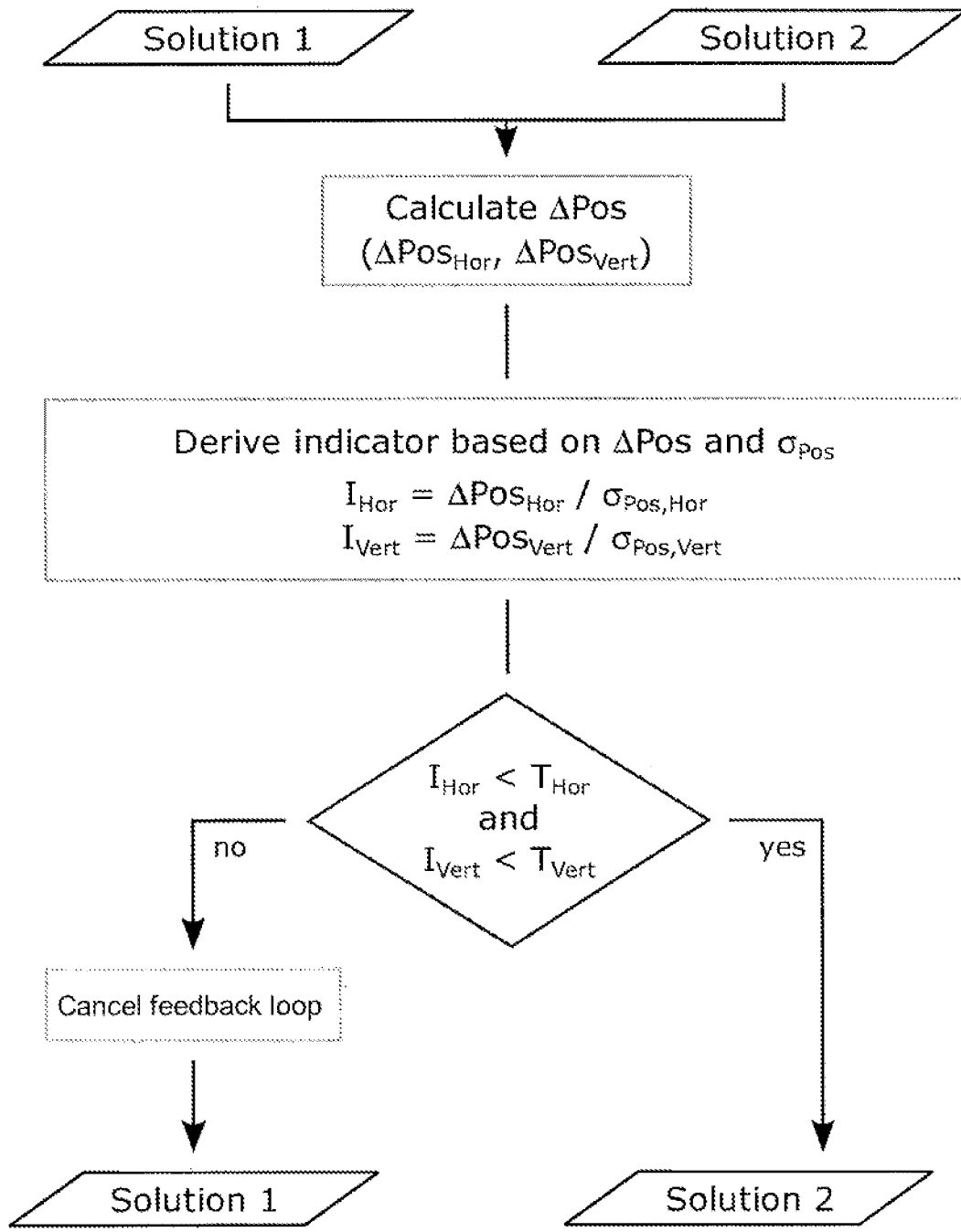
FIG. 16a schematically illustrates exemplary steps for performing a consistency check in one embodiment of the invention.
Figure 16B:
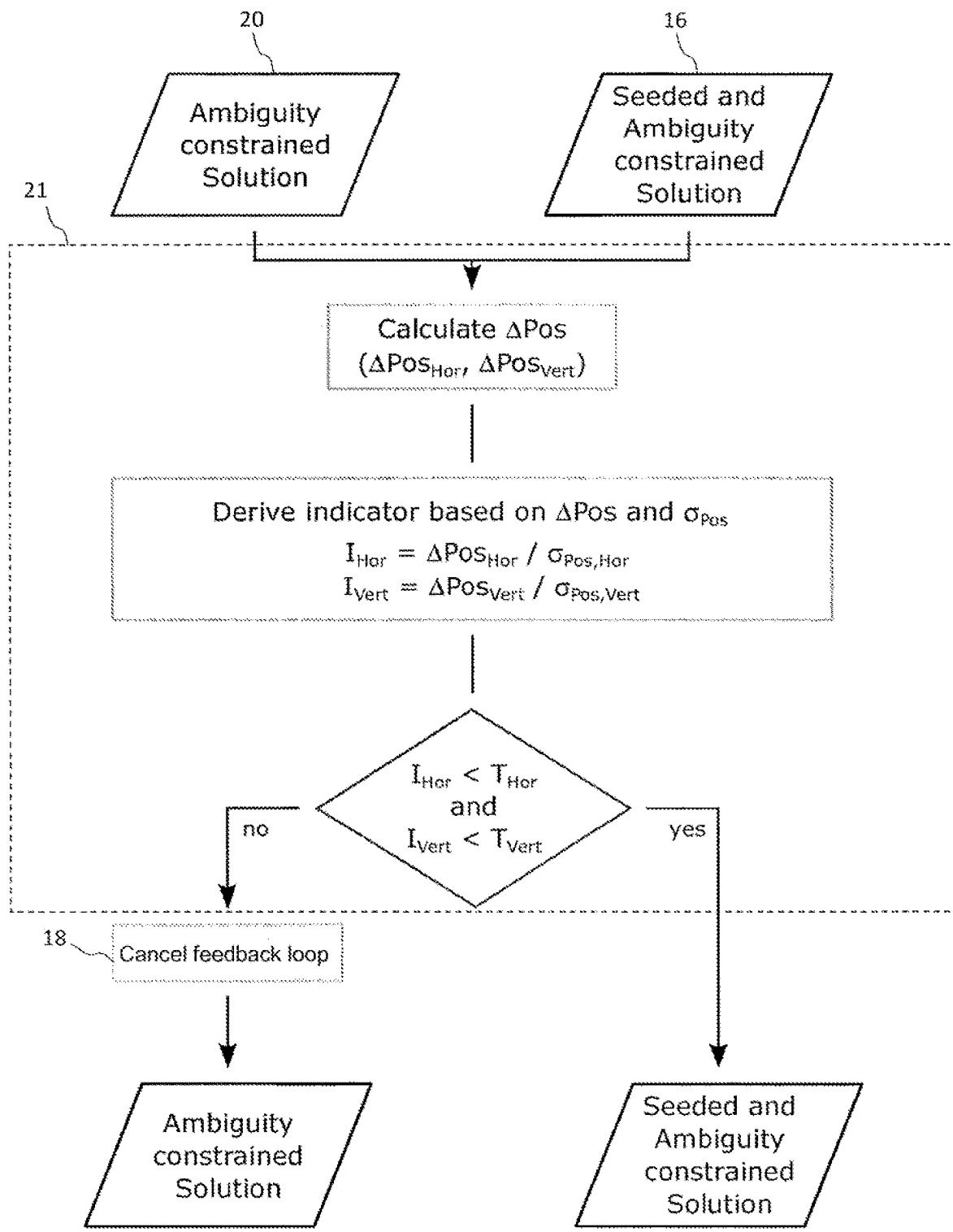
FIG. 16b schematically illustrates exemplary steps for performing an ACS vs SACS consistency check in one embodiment of the invention.

Then, SACS 16 is compared to ACS 20, as illustrated in FIG. 16b (which is a specific form of the more generic consistency check schematically illustrated by FIG. 16a).

The statistical tests may be carried out independently for both the horizontal and vertical components. If any of the horizontal indicator $I_{Hor}$ and vertical indicators $I_{Ver}$ exceeds its respective threshold $T_{Hor}$, $T_{Vert}$, the feedback loop is stopped 18. That is, no subsequent seeding information is derived from the final solution and no subsequent seeding information is used in the next epoch. ACS 20 rather than SACS 16 is used (as current positioning solution or, for example, to compute a positioning solution via a timely estimator, as will be described later on with reference to FIGS. 6b and 10b, and as expressed by equation (41)).

Figure 3C:
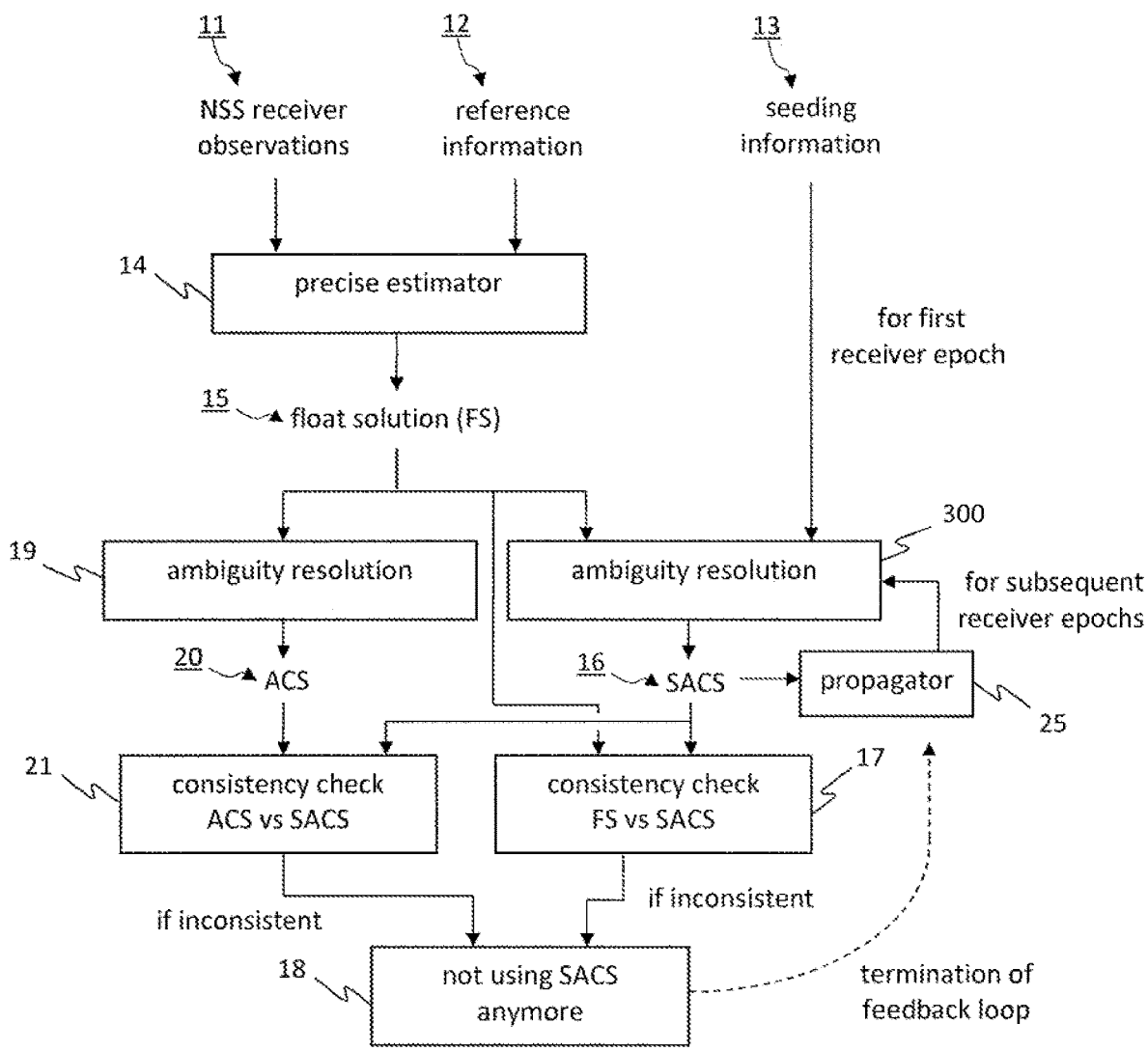
FIG. 3c schematically illustrates an exemplary architecture of a method in one embodiment of the invention, involving both an ACS vs SACS consistency check and an FS vs SACS consistency check.

FIG. 3c schematically illustrates an exemplary architecture of a method in one embodiment of the invention, in which both an ACS vs SACS consistency check 21 and an FS vs SACS consistency check 17 are carried out. Namely the method combines the embodiments described with reference to FIGS. 3a and 3b.

Figure 13C:
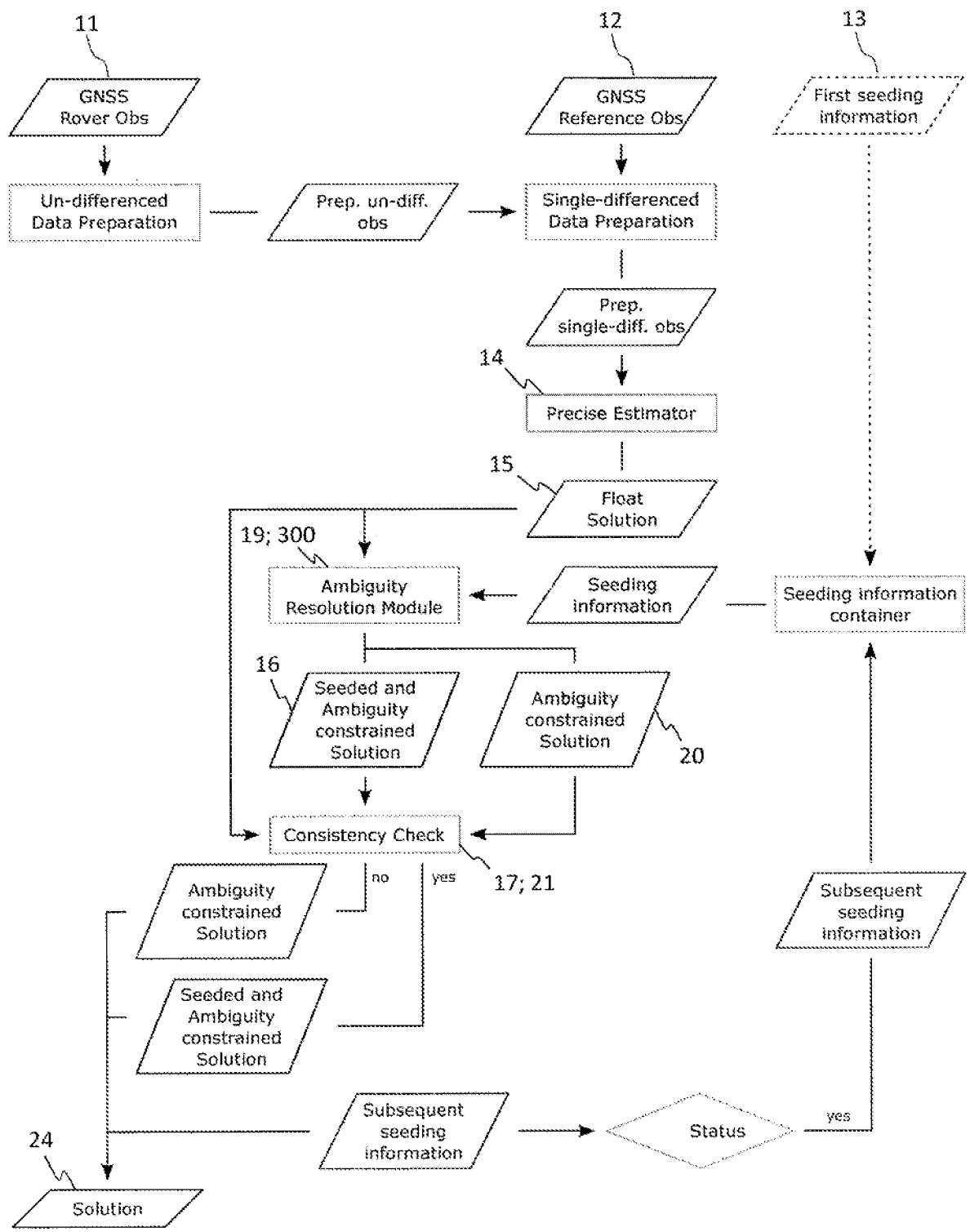

The process may be further understood by reference to FIG. 13c, which schematically illustrates an embodiment being similar to the method discussed with reference to FIG. 3c.

Figure 17B:
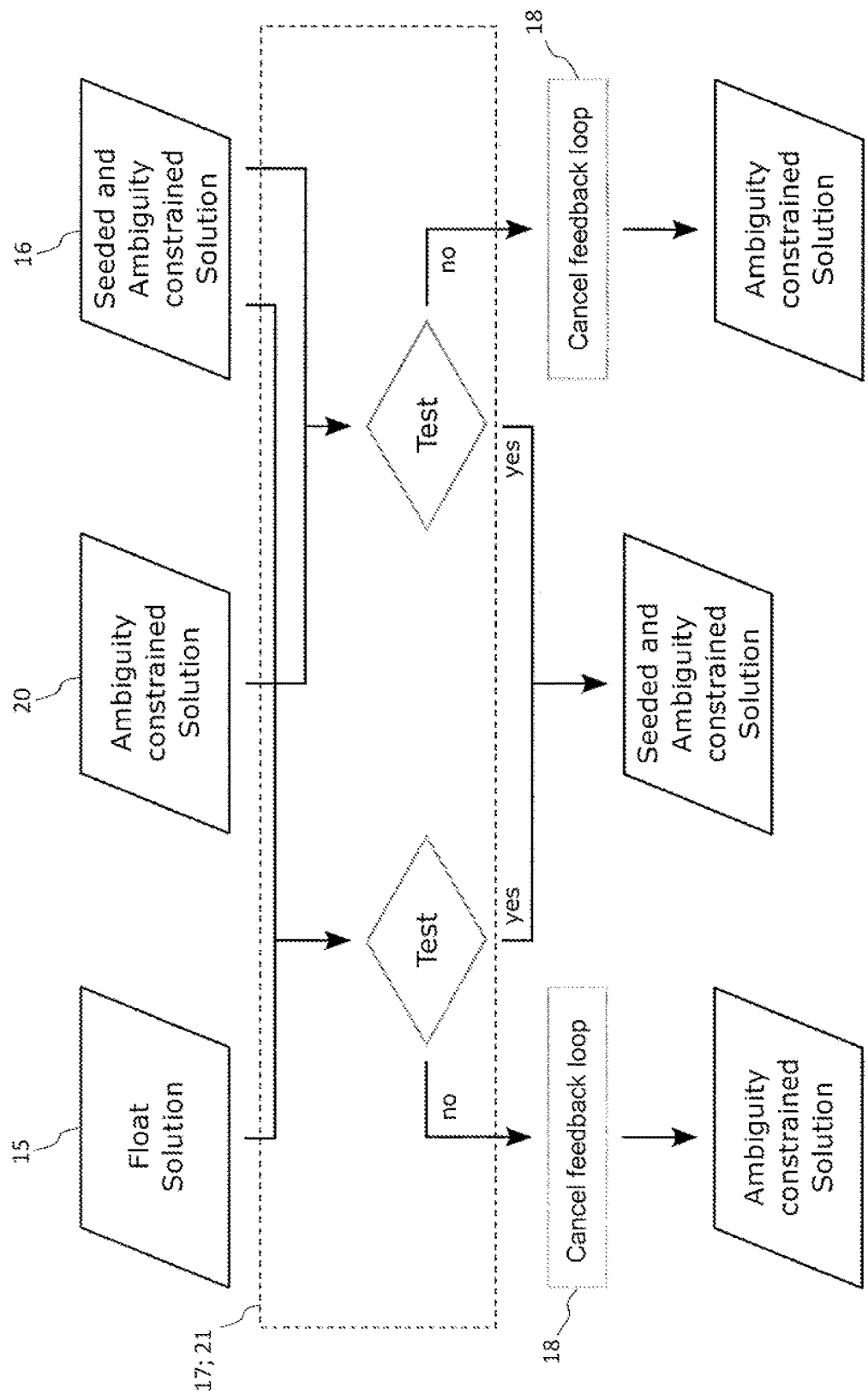
FIG. 17b schematically illustrates exemplary steps for performing both an ACS vs SACS consistency check and an FS vs SACS consistency check, in one embodiment of the invention.

Namely, SACS 16 is compared to FS 15 and to ACS 20, as illustrated in FIG. 17b. The statistical tests may be carried out independently for both the horizontal and vertical components. If any of the FS vs SACS and ACS vs SACS consistency checks fails, the feedback loop is stopped 18. That is, no subsequent seeding information is derived from the final solution and no subsequent seeding information is used in the next epoch. The ACS instead of the SACS is used (as current positioning solution or, for example, to compute a positioning solution via a timely estimator, as will be discussed later with reference to FIGS. 6c and 10c, and as expressed by equation (41)).

Figure 4A:
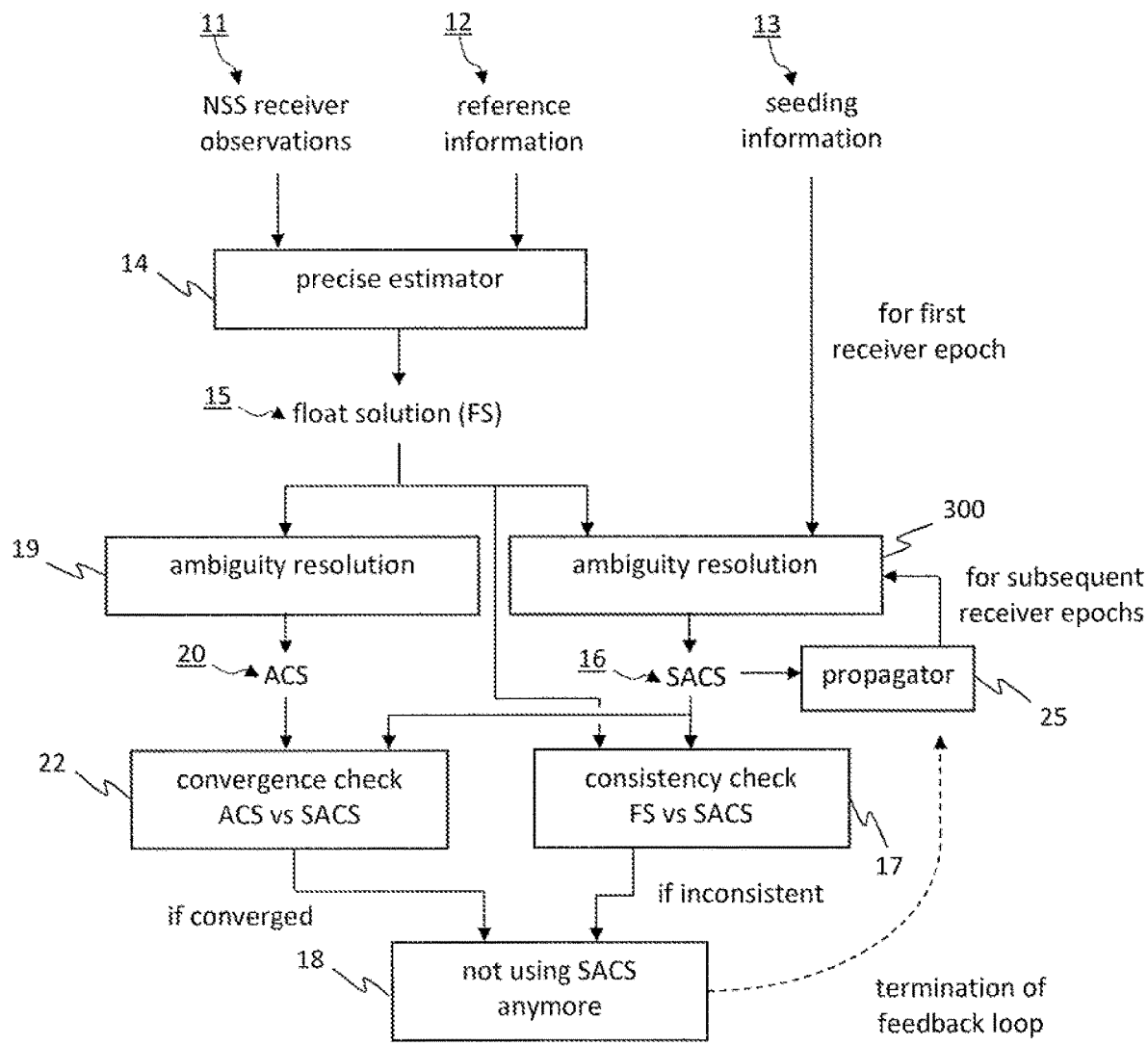
FIGS. 4a to 4c schematically illustrate the exemplary architecture of three methods in three embodiments of the invention, each involving one or more consistency checks and an ACS vs SACS convergence check.

FIG. 4a schematically illustrates an exemplary architecture of a method in one embodiment of the invention, which differs from the method described with reference to FIG. 3a in that, in FIG. 4a, both an ACS vs SACS convergence check 22 and an FS vs SACS consistency check 17 are carried out.

In particular, the method comprises, at the receiver epoch under consideration, determining 22 whether the SACS 16 computed at the receiver epoch under consideration and the ACS 20 computed at the receiver epoch under consideration have converged towards one another. If so, the SACS 16 computed at the receiver epoch under consideration is not used 18 anymore, i.e. not propagated in time and not used to constrain the ambiguities of precise estimator 14 in order to compute an SACS for any receiver epoch following the receiver epoch under consideration. That is, in such case, the feedback loop is terminated, as illustrated by the dashed arrow labelled "termination of feedback loop".

In one embodiment (not illustrated in FIG. 4a), ACS vs SACS convergence check 22 is carried out after FS vs SACS consistency check 17 and only if consistency check 17 did not lead SACS 16 to be considered inconsistent.

Figure 14A:
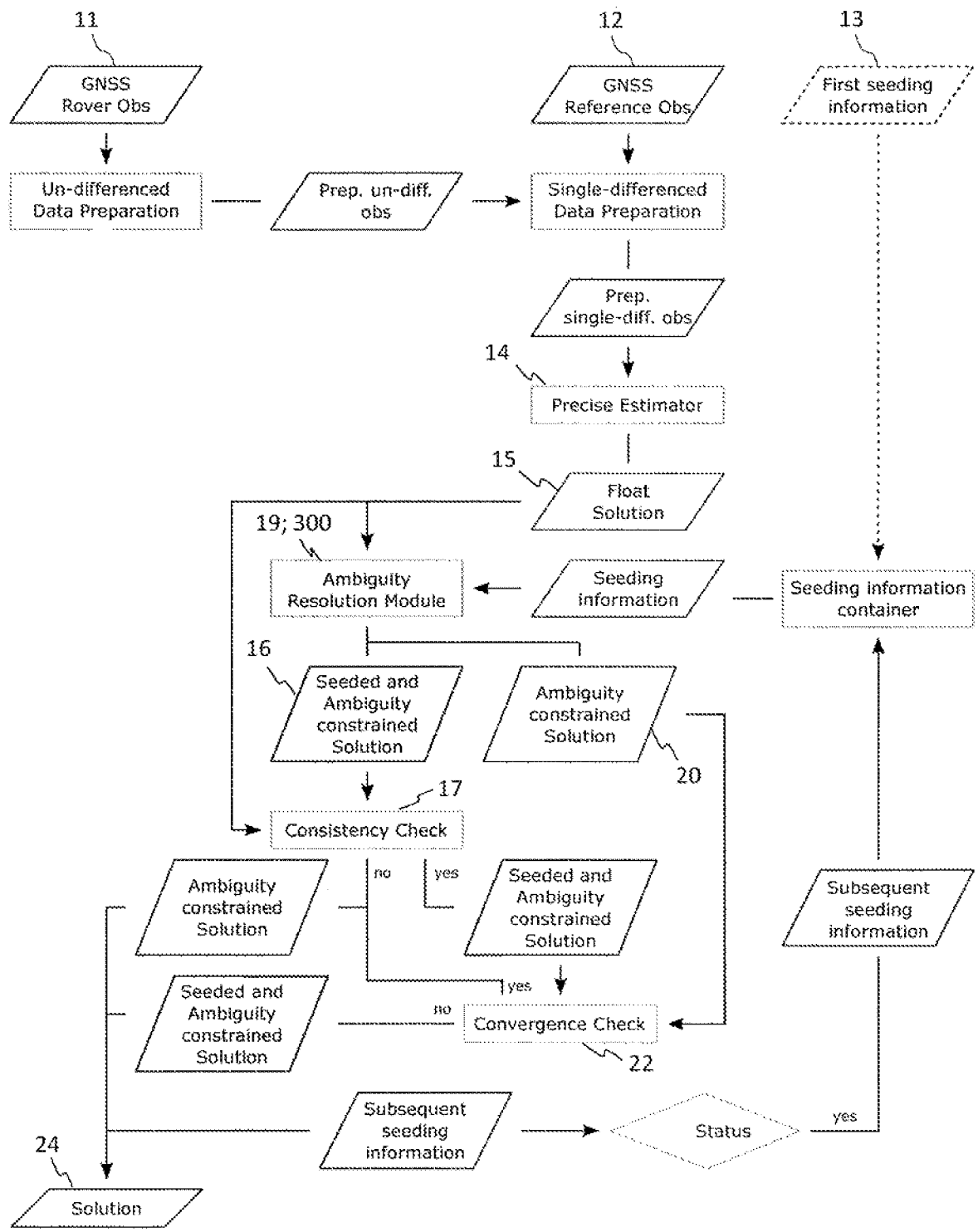

The process may be further understood by reference to FIG. 14a, which schematically illustrates an embodiment being similar to the method discussed with reference to FIG. 4a.

Figure 18A:
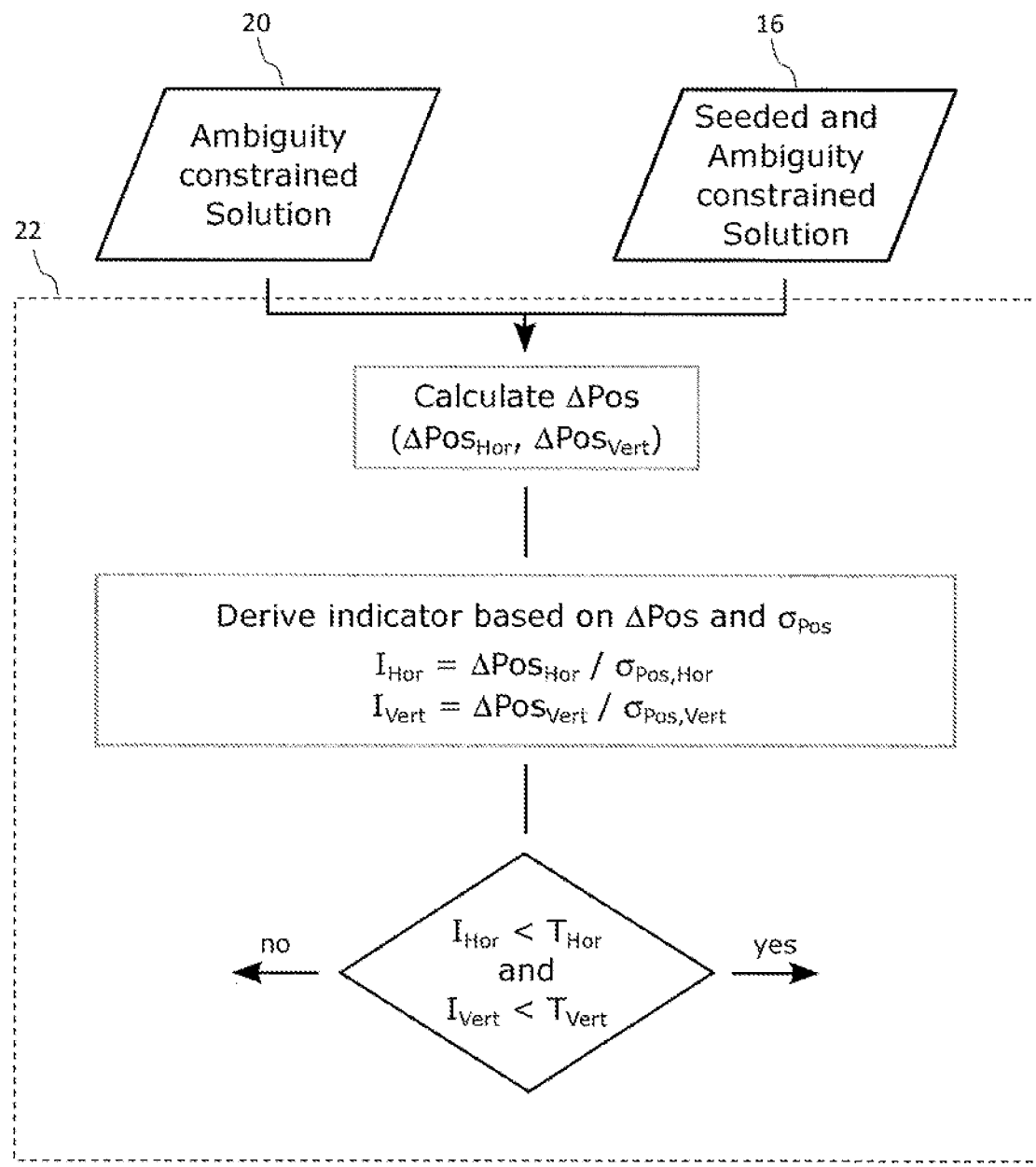
FIGS. 18a and 18b schematically illustrate two exemplary sets of steps for performing an ACS vs SACS convergence check, in two embodiments of the invention.
Figure 18B:
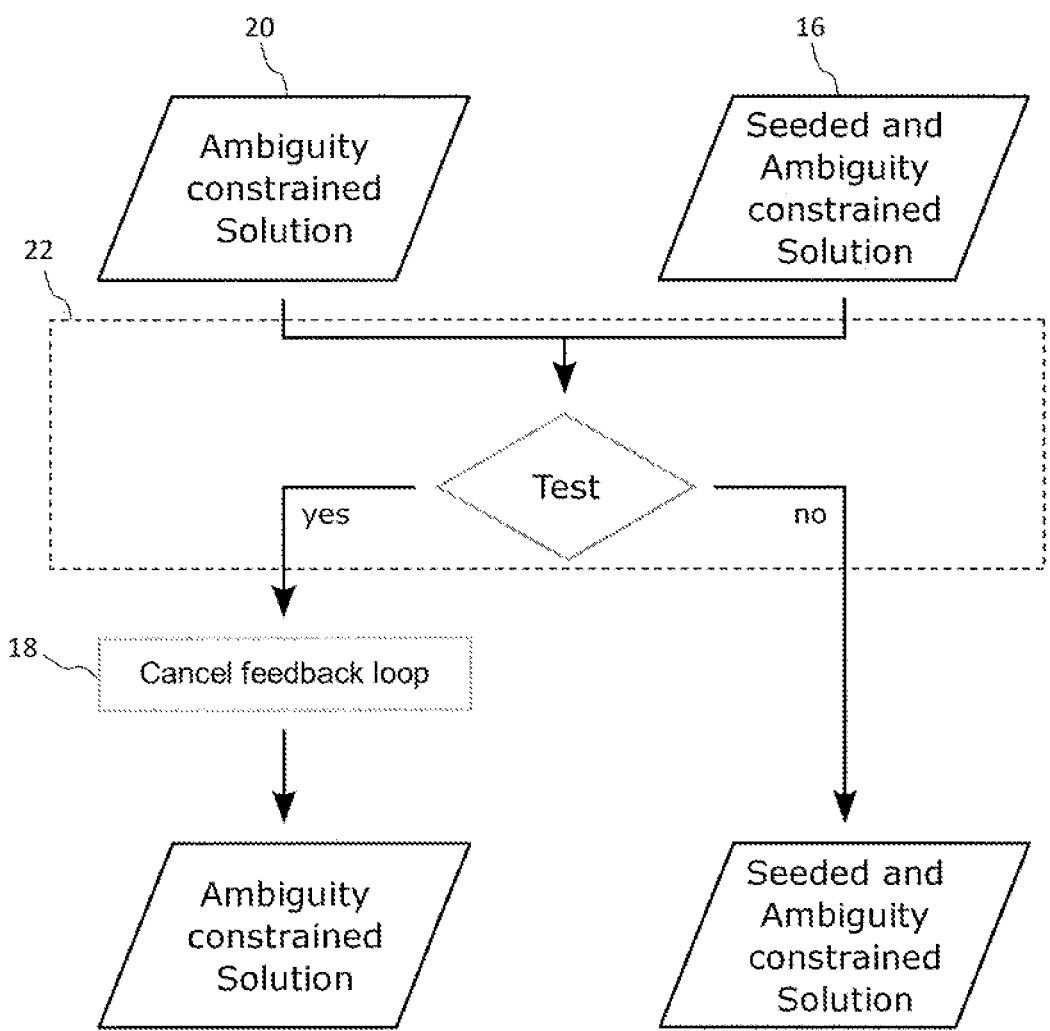

In particular, SACS 16 is compared to ACS 20, as schematically illustrated for example in FIGS. 18a and 18b. The statistical tests may be carried out independently for both the horizontal and vertical components. If both the horizontal and vertical indicators $I_{Hor}$, $I_{Vert}$ do not exceed their respective threshold, the feedback loop is stopped 18. That is, no subsequent seeding information is derived from the final solution and no subsequent seeding information is used in the next epoch. The ACS instead of the SACS is used (as current positioning solution or, for example, to compute a positioning solution via a timely estimator, as will be discussed later with reference to FIGS. 7a and 11a).

Figure 4B:
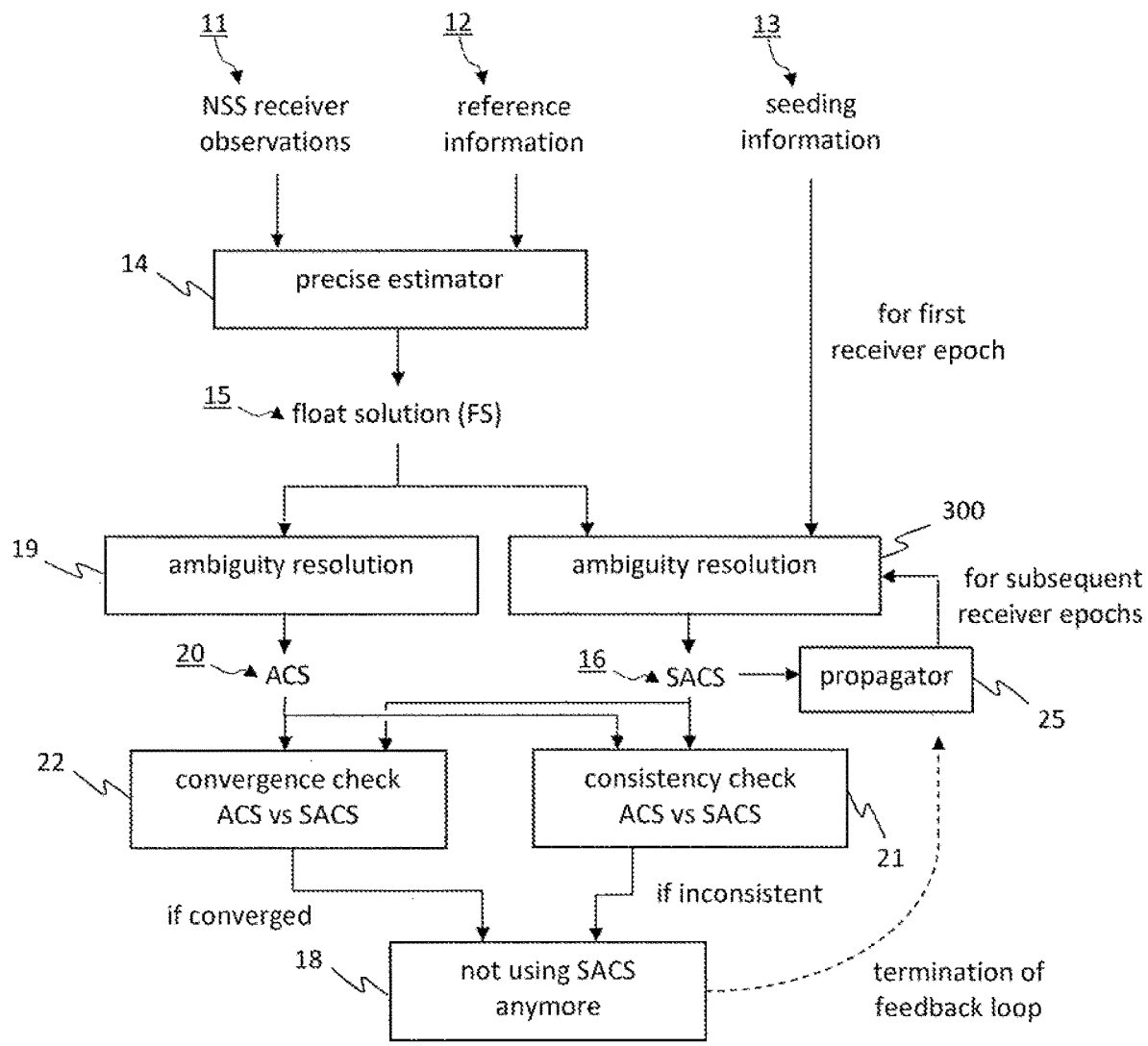

FIG. 4b schematically illustrates an exemplary architecture of a method in one embodiment of the invention, which differs from the method described with reference to FIG. 3b in that, in FIG. 4b, both an ACS vs SACS convergence check 22 and an ACS vs SACS consistency check 21 are carried out.

In particular, the method further comprises, at the receiver epoch under consideration, determining 22 whether the SACS 16 computed at the receiver epoch under consideration and the ACS 20 computed at the receiver epoch under consideration have converged towards one another. If so, the SACS 16 computed at the receiver epoch under consideration is not used 18 anymore, i.e. not propagated in time and not used to constrain the ambiguities of precise estimator 14 in order to compute an SACS for any receiver epoch following the receiver epoch under consideration. In one embodiment (not illustrated in FIG. 4b). ACS vs SACS convergence check 22 is carried out after ACS vs SACS consistency check 21 and only if consistency check 21 did not lead SACS 16 to be considered inconsistent. That is, in such case, the feedback loop is terminated, as illustrated by the dashed arrow labelled "termination of feedback loop".

Figure 14B:
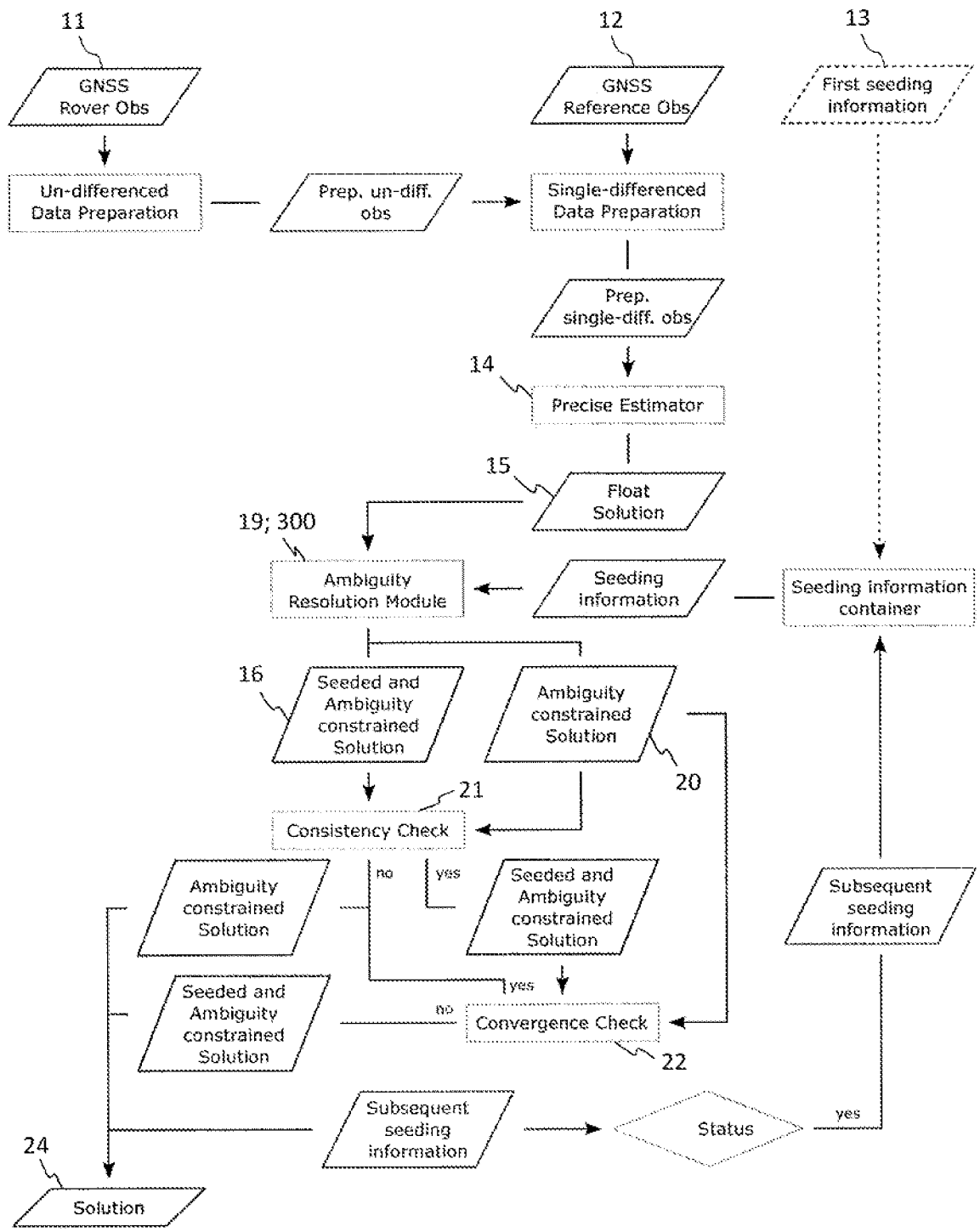

The process may be further understood by reference to FIG. 14b, which schematically illustrates an embodiment being similar to the method discussed with reference to FIG. 4b.

In particular, SACS 16 is compared to ACS 20, both in a convergence check 21 as schematically illustrated in FIGS. 18a and 18b (and as already explained above with reference to FIG. 4a) as well as in a consistency check 21 (and as already explained above with reference to FIG. 3b).

Figure 4C:
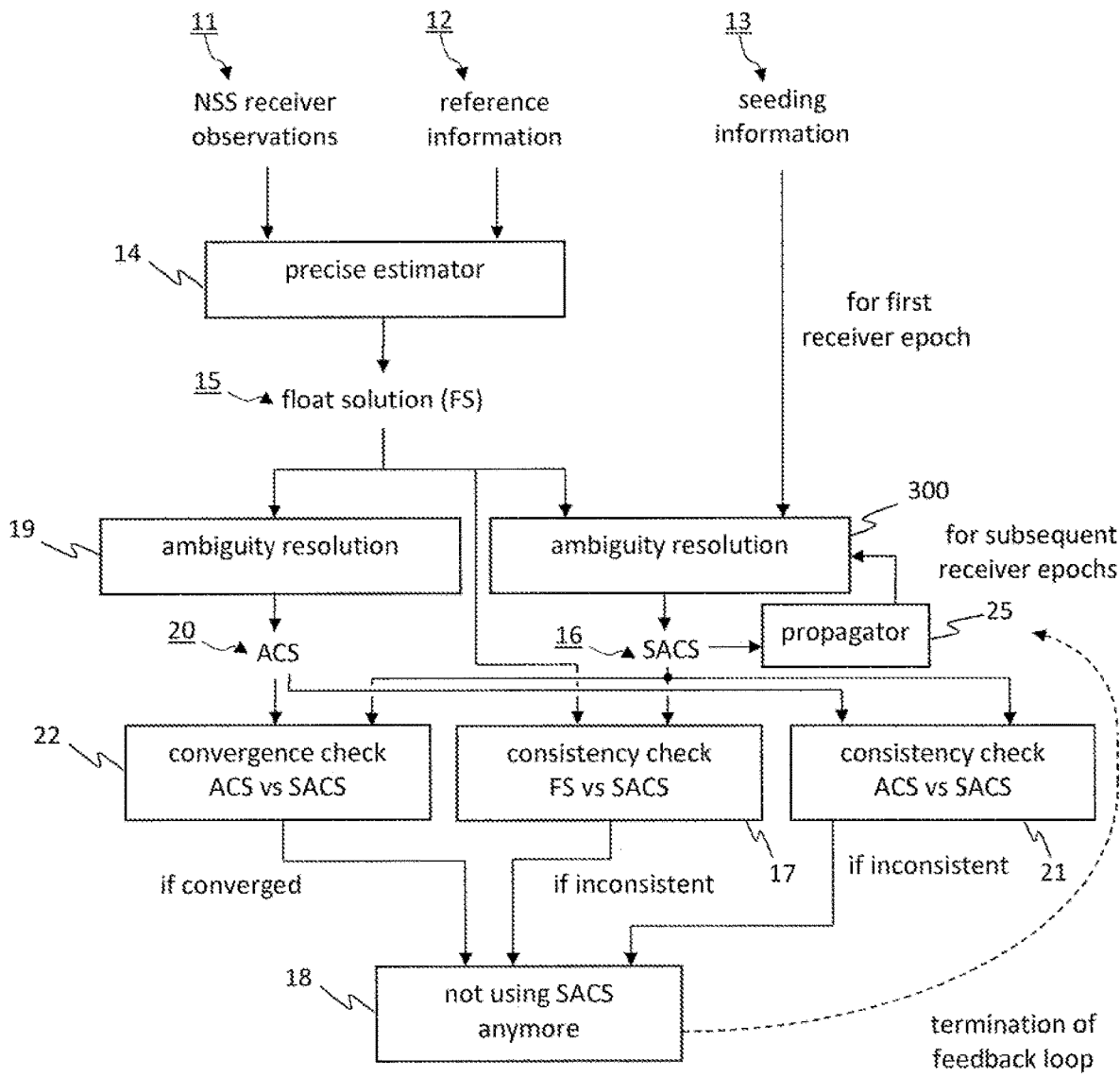

FIG. 4c schematically illustrates an exemplary architecture of a method in one embodiment of the invention, which differs from the method described with reference to FIG. 3c in that, in FIG. 4c, an ACS vs SACS convergence check 22 is additionally carried out.

In one embodiment (not illustrated in FIG. 4c), ACS vs SACS convergence check 22 is carried out after FS vs SACS consistency check 17 and ACS vs SACS consistency check 21 and only if neither consistency check 17 nor consistency check 21 led SACS 16 to be considered inconsistent.

Figure 14C:
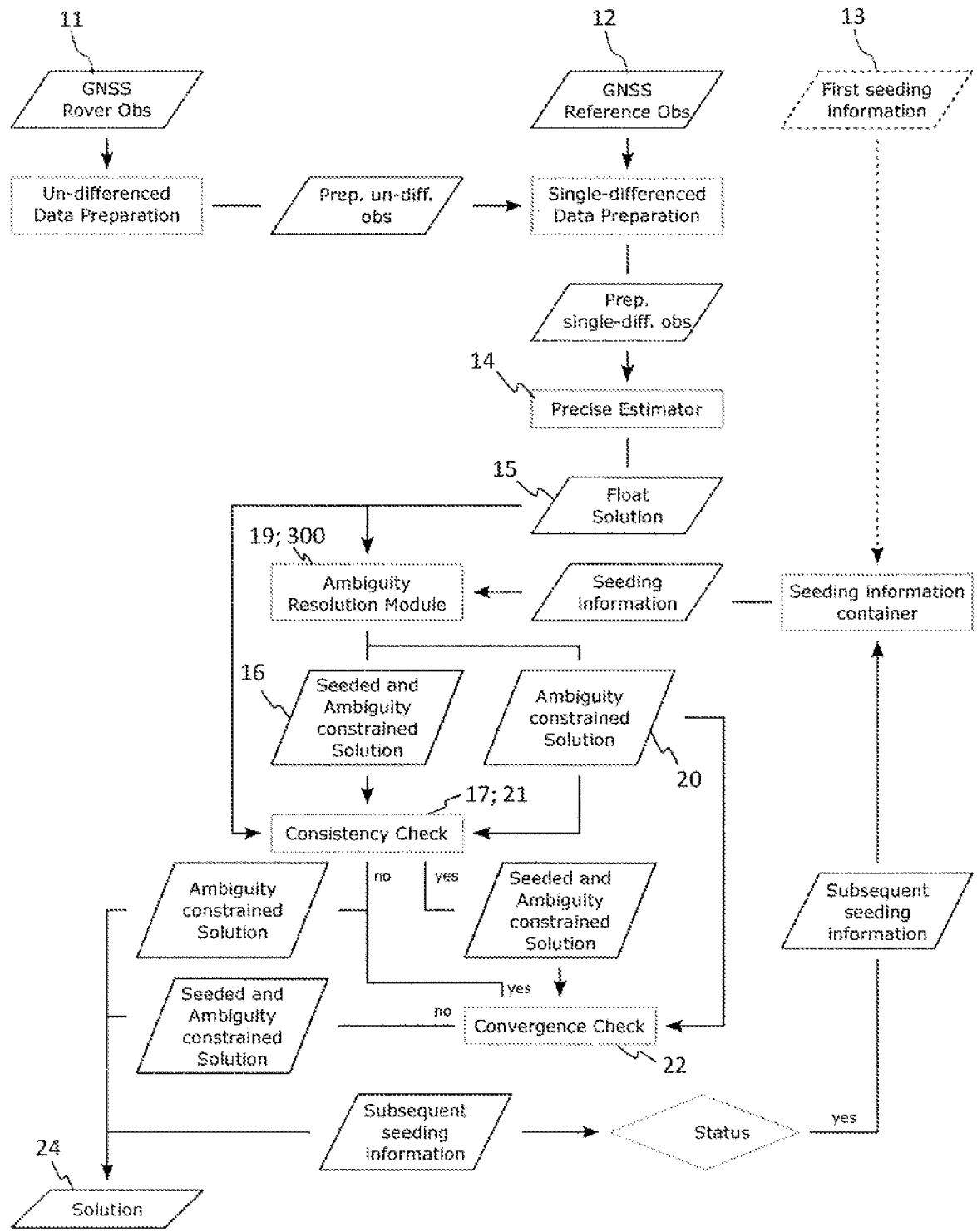

The process may be further understood by reference to FIG. 14c, which schematically illustrates an embodiment being similar to the method discussed with reference to FIG. 4c.

Figure 8:
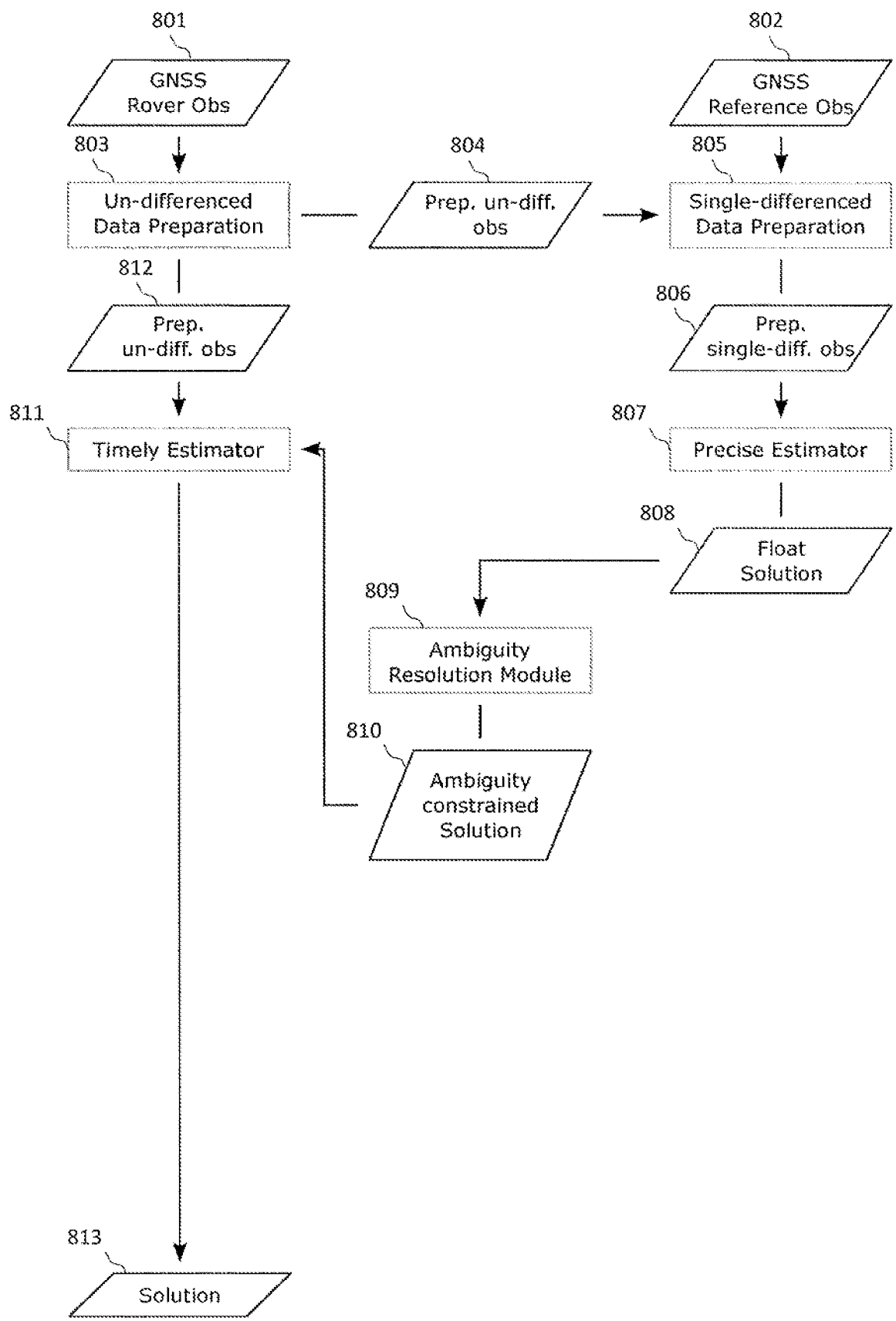
FIG. 8 schematically illustrates an exemplary architecture of a reference implementation of a method involving both a precise estimator and a timely estimator.

Before discussing further embodiments of the invention, let us now discuss FIG. 8, which schematically illustrates an exemplary architecture of a reference implementation of a method involving both a precise estimator and a timely estimator.

In that method, a position solution 813 is computed based on GNSS rover observations 801 and GNSS reference observations 802. In that context, reference observations 802 are typically delayed with respect to the rover observations 801, although not necessarily.

The rover observations 801 are prepared in the un-differenced data preparation step 803. That is, for example, the satellite coordinates corresponding to the rover observations are computed and the observations are corrected for the influence of ionosphere and troposphere (in that respect, see for example equations (5) to (8) below, and the related description).

The prepared un-differenced rover observations are forwarded 804 to the single-differenced data preparation 805. There, prepared single-differenced observations 806 are formed based on synchronized prepared un-differenced rover and prepared un-differenced reference observations after the reference observations were prepared (e.g. the satellite coordinates corresponding to the reference observations were computed and the observations are corrected for the influence of ionosphere and troposphere) in a previous step (in that respect see for example equations (5) to (8), and the related description).

The prepared single-differenced observations 806 are then used in the precise estimator 807 to compute a float solution (FS) 808 including position state variable, phase ambiguities, and other state variables.

FS 808 is inputted to the ambiguity resolution module 809. First, the phase ambiguities are resolved. Afterwards, the resolved ambiguities are used to constrain at least one of the other state variables (usually including at least the position state variable) of FS 808. The resulting solution is called ambiguity-constrained solution 810 (ACS) (see also FIG. 15a).

ACS 810 is then used as input into timely estimator 811. Thereafter, the latest prepared un-differenced rover observations 812 are used to compute the final solution 813 including position state variable, and other state variables (FIG. 8) (in that respect, see for example the implementation disclosed in reference [5]).

Figure 5A:
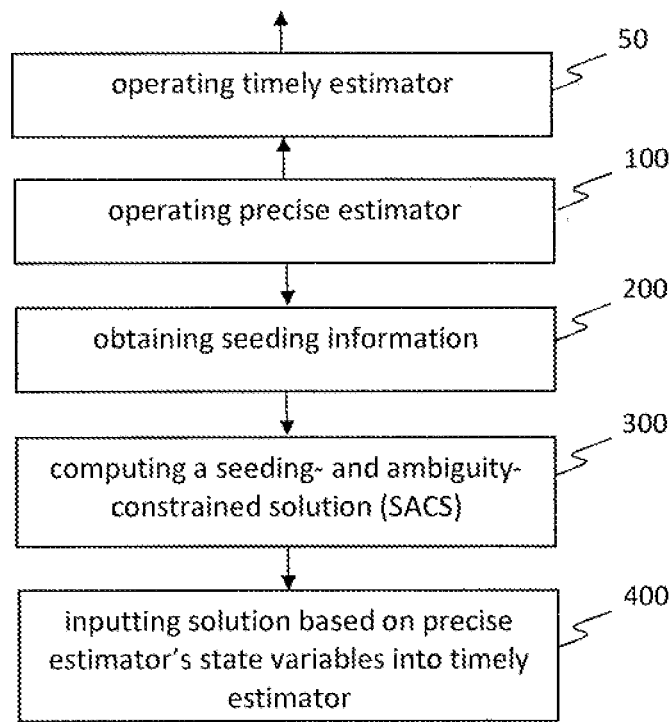
FIG. 5a is a flowchart of a method in one embodiment of the invention, involving a timely estimator.
Figure 5B:
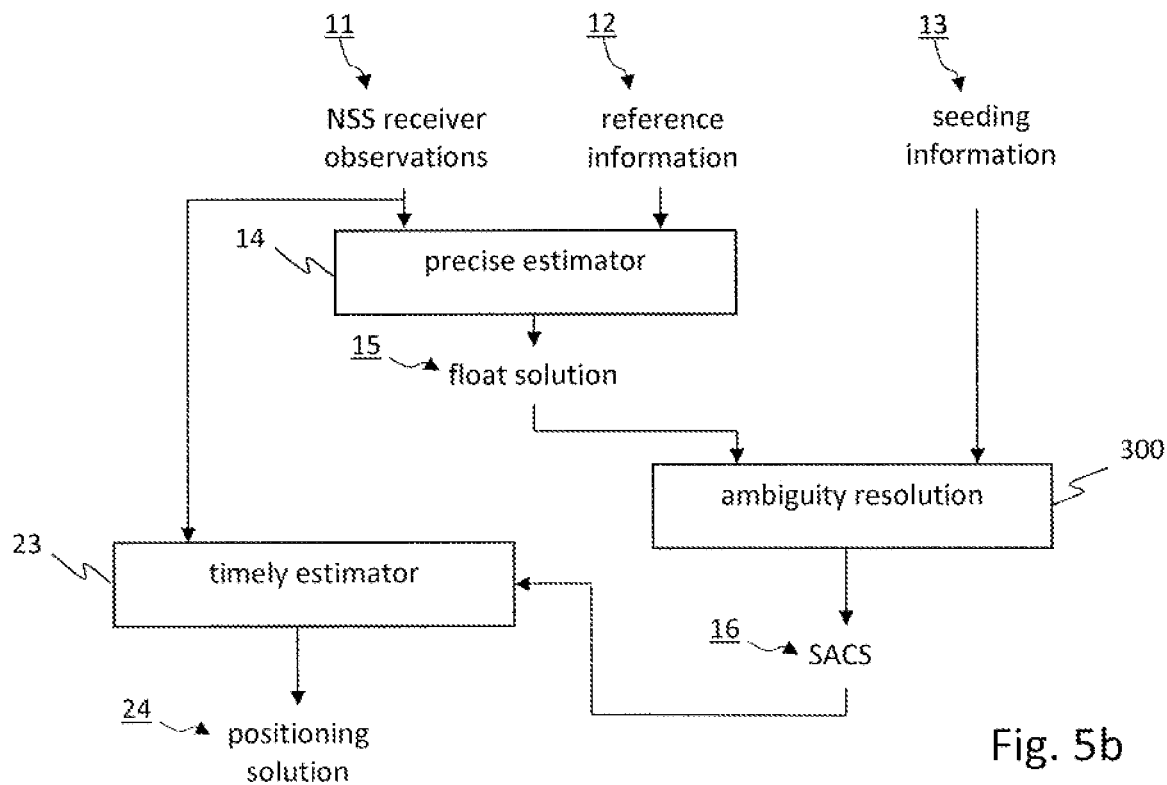

FIG. 5a is a flowchart of a method in one embodiment of the invention, involving a timely estimator 23, and FIG. 5b schematically illustrates an exemplary architecture for the method illustrated in FIG. 5a. Timely estimator 23 is similar to timely estimator 811 described above with reference to FIG. 8.

Compared to the method described with reference to FIGS. 1a and 1b, the method illustrated by FIGS. 5a and 5b further comprises the following steps: As mentioned above, a further filter, i.e. timely estimator 23, is operated. Timely estimator 23 also uses state variables; and it computes values of its state variables and associated covariances based on: NSS signals 11 observed by the NSS receiver at the current receiver epoch, and/or information 11 derived from said NSS signals. Furthermore, a solution computed based on the precise estimator's 14 state variables is inputted 400 into timely estimator 23. In one embodiment, inputting into timely estimator 23 a solution computed based on the precise estimator's 14 state variables more specifically comprises: inputting 400 SACS 16 into timely estimator 23, as illustrated in FIG. 5b.

The process may be further understood by reference to FIG. 9, which schematically illustrates an embodiment being similar to the method discussed with reference to FIGS. 5a and 5b, also involving a timely estimator 23. In FIG. 9, a feedback loop is, however, shown.

Figure 9:
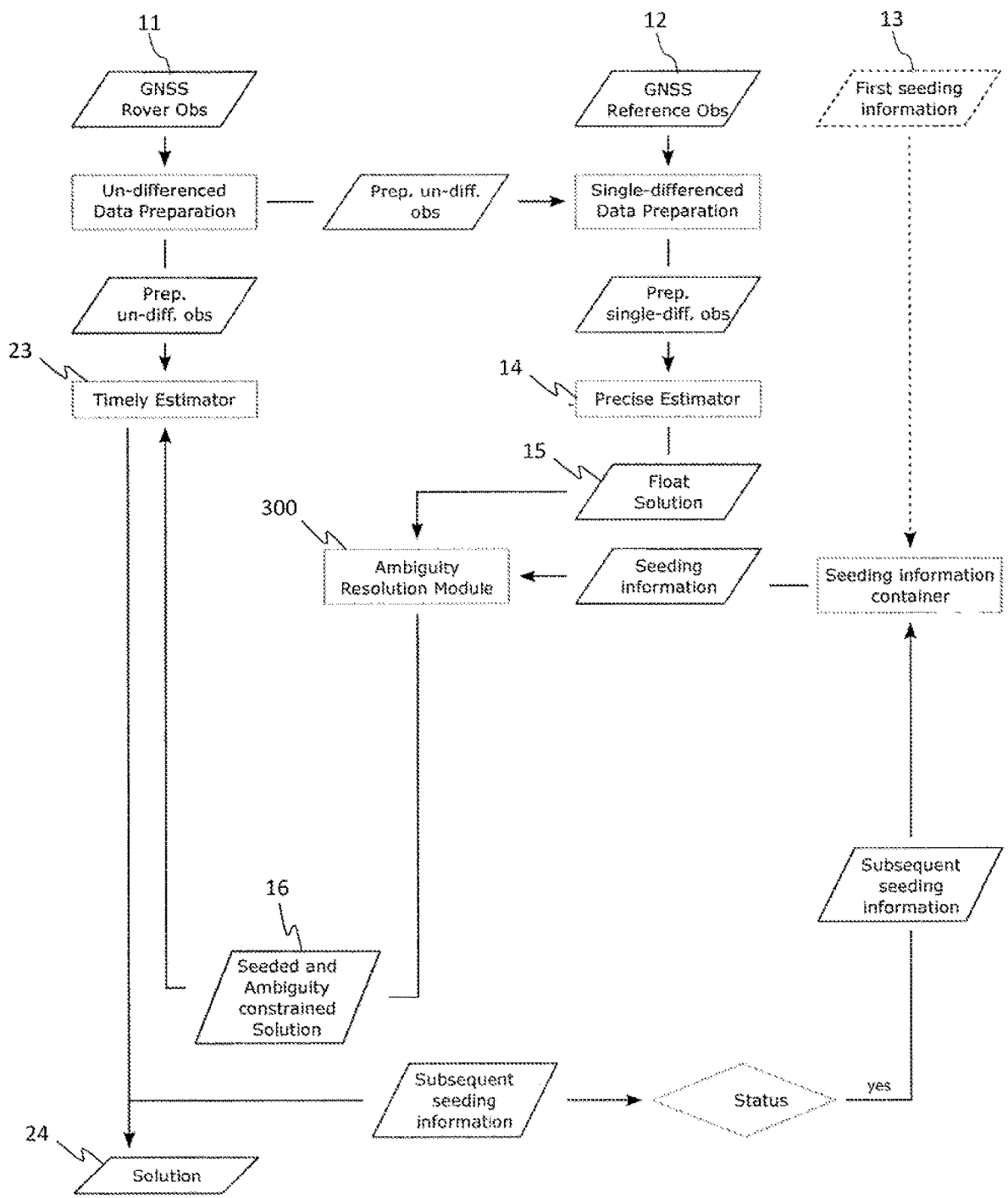
FIG. 9 schematically illustrates an exemplary architecture of a method in one embodiment of the invention, involving a timely estimator.

The method illustrated in FIG. 9 differs from the reference implementation of FIG. 8 in that, in FIG. 9, float solution (FS) 15 is not the sole input of ambiguity resolution module 300. Another input is, for a first receiver epoch, seeding information 13 (or "first seeding information", such as for example position information, ionospheric information, and/or tropospheric information, as explained above) and, for at least one subsequent receiver epoch, subsequent seeding information (such as for example position information, ionospheric information, and/or tropospheric information, as explained above). At each receiver epoch, in a first step, seeding information 13 or subsequent seeding information is used to constrain the phase ambiguities. In a second step, the pre-constrained ambiguities are resolved via ambiguity resolution. Then, in a third step, the resolved ambiguities are used to constrain at least one of the other states of FS 15. The resulting solution is SACS 16. These three steps may be further understood by reference to FIG. 15b, which schematically illustrates an exemplary embodiment for the computation 300 of SACS 16.

Then, still with reference to FIG. 9, SACS 16 is used as input into timely estimator 23. Inputting SACS 16 into timely estimator 23 may for example be performed by using SACS position as linearization point for delta position states in an estimator based on delta-phase observations (in that respect, see for example references [11], [12], [13], [14]) or, alternatively, by recurrently replacing, in timely estimator 23, the values of a subset of state variables computed by timely estimator 23, as described in detail in reference [5].

Afterwards, in timely estimator 23, the latest prepared un-differenced rover observations are used to compute solution 24 including position state variables and other state variables. From solution 24, position information may be derived, which may then be used as subsequent seeding information in the next receiver epoch. In other words, timely estimator 23 (acting as a propagator) propagates SACS 16 from the previous epoch of precise estimator 14 to the next epoch of precise estimator 14, thus resulting in a propagated SACS 16. However, if the subsequent seeding information can be considered as constant between successive epochs, timely estimator 23 may be dispensed with (as illustrated for example by FIGS. 3a to 4c, and FIGS. 13a to 14c). Especially, in some embodiments, no timely estimator 23 is used if ionospheric delay information and/or tropospheric delay information is used as subsequent seeding information 13 instead of position information. In contrast, in some embodiments (as illustrated for example by FIGS. 6a to 7c, and FIGS. 10a to 11c), a timely estimator 23 is used because position information is used as subsequent seeding information 13.

Each of the aforementioned steps may be repeated at each receiver epoch, until termination of the feedback loop initiated based on given seeding information 13.

As described in reference [5], timely estimator 23 may comprise, for example, a Kalman filter, a least squares estimator, and/or a robust estimator. In one embodiment, each of precise estimator 14 and timely estimator 23 comprises a Kalman filter. In another embodiment, each of precise estimator 14 and timely estimator 23 comprises a least squares estimator. In another embodiment, each of precise estimator 14 and timely estimator 23 comprises a robust estimator.

Each of timely estimator 23 and precise estimator 14 computes the respective values of their state variables based on NSS signals 11 observed by the NSS receiver, and/or based on information 11 derived from said NSS signals. In one embodiment, each of timely estimator 23 and precise estimator 14 computes the respective values of their state variables based on carrier phase measurements generated from the NSS signals observed by the NSS receiver.

Precise estimator 14 may be, but need not be, delayed by one or more receiver epochs with respect to timely estimator 23, If precise estimator 14 is delayed with respect to timely estimator 23 (this is typically the case), this means that precise estimator 14 computes the values of its state variables based on (a) NSS signals 11 observed by the NSS receiver, and/or information 11 derived from said NSS signals, after intentionally delaying this first input, e.g. by buffering the information, and (b) reference information 12, this second input being delayed due to, for example, the acquisition, processing, and/or transfer of the information.

For more details regarding the transfer of accuracy by recurrently replacing, in timely estimator 23, the values of a subset of state variables computed by timely estimator 23, regarding values for the typical delay between the estimators, and regarding the components of said delay, see reference [5].

FIGS. 6a to 6c and 7a to 7c schematically illustrate the exemplary architecture of six methods in six embodiments of the invention, each involving a timely estimator and one or more consistency checks. These embodiments differ from those discussed with reference to FIGS. 3a to 3c and 4a to 4c, respectively, in that, in FIGS. 6a to 6c and 7a to 7c, SACS 16 is inputted into timely estimator 23 depending on the outcome of one or more consistency checks and, optionally, a convergence check.

Figure 6A:
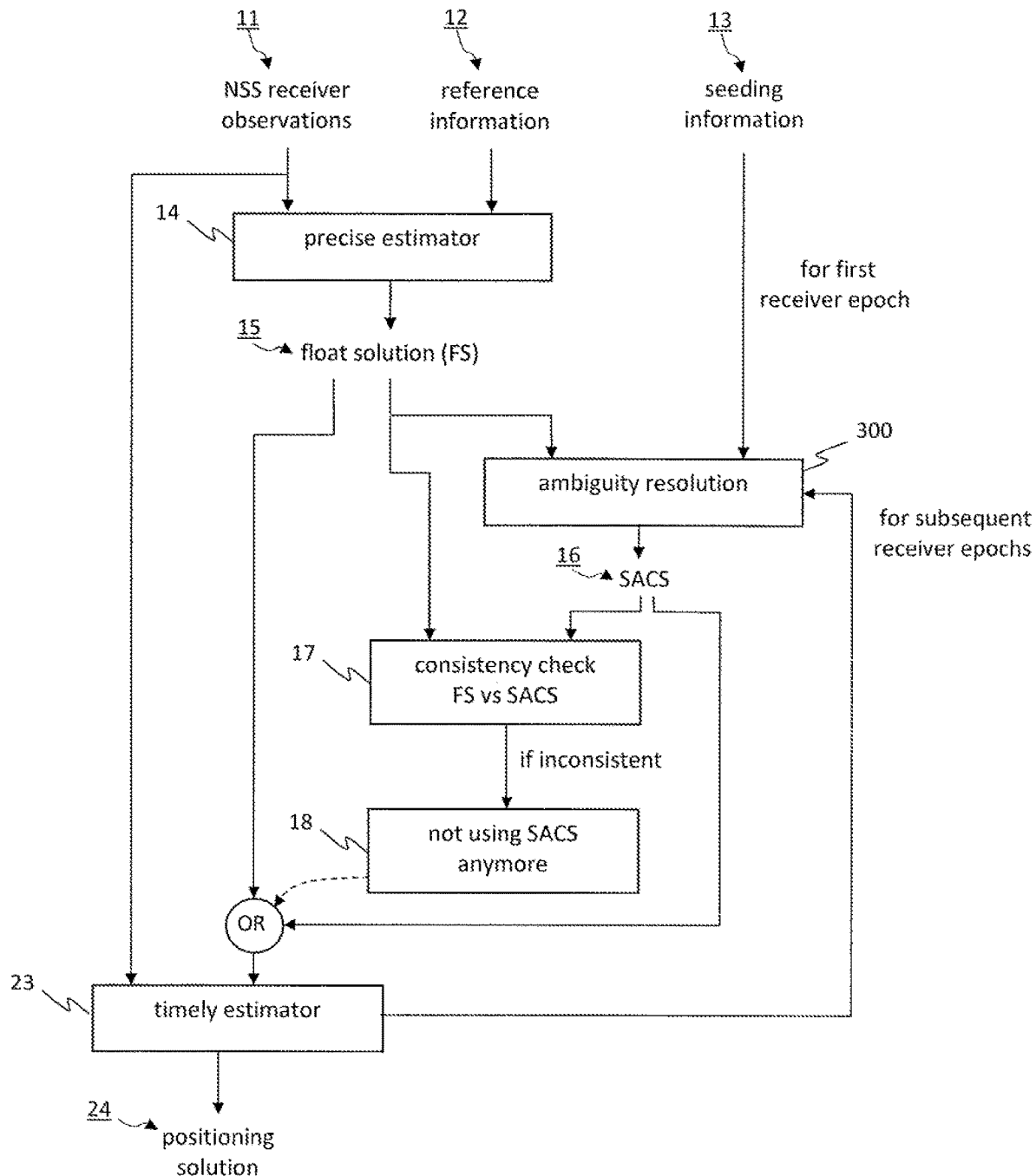
FIGS. 6a to 6c and 7a to 7c schematically illustrate the exemplary architecture of six methods in six embodiments of the invention, each involving a timely estimator and one or more consistency checks.

In the method illustrated by FIG. 6a, inputting into timely estimator 23 a solution computed based on the precise estimator's state variables comprises the following steps: If SACS 16 computed at the receiver epoch under consideration has been determined to be inconsistent with FS 15 computed by precise estimator 14 at the receiver epoch under consideration, FS 15 is inputted 400 into timely estimator 23. Otherwise, SACS 16 is inputted 400 into timely estimator 23. In other words, timely estimator 23 uses either FS 15 or SACS 16 depending on a consistency check 17 based on FS 15 and SACS 16. That is, SACS 16 is no longer used for subsequent epochs, and the feedback loop using seeding information is terminated. This enables the detection of incorrect seeding information so as to prevent the incorrect seeding information from corrupting positioning solution 24. This selection is schematically illustrated by the dotted arrow reaching the element labelled "OR" in the drawing. Namely, if SACS 16 is not to be used anymore 18, FS 15 is inputted into timely estimator 23. Otherwise, SACS 16 is inputted into timely estimator 23.

Figure 10A:
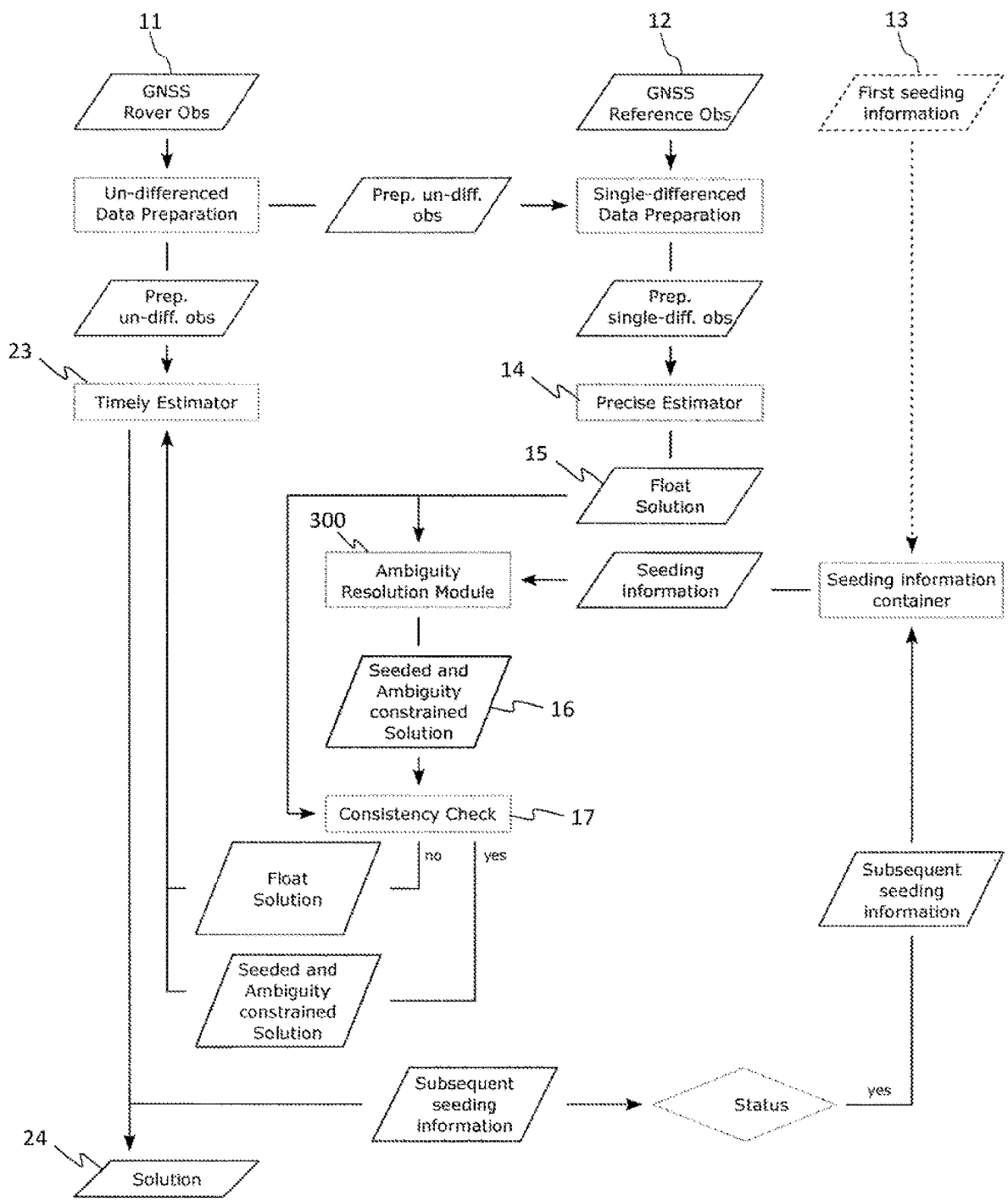
FIGS. 10a to 10c and 11a to 11c schematically illustrate the exemplary architecture of six methods in six embodiments of the invention, each involving a timely estimator and at least a consistency check.

The process may be further understood by reference to FIG. 10a, which schematically illustrates an embodiment being similar to the method discussed with reference to FIG. 6a.

Figure 6B:
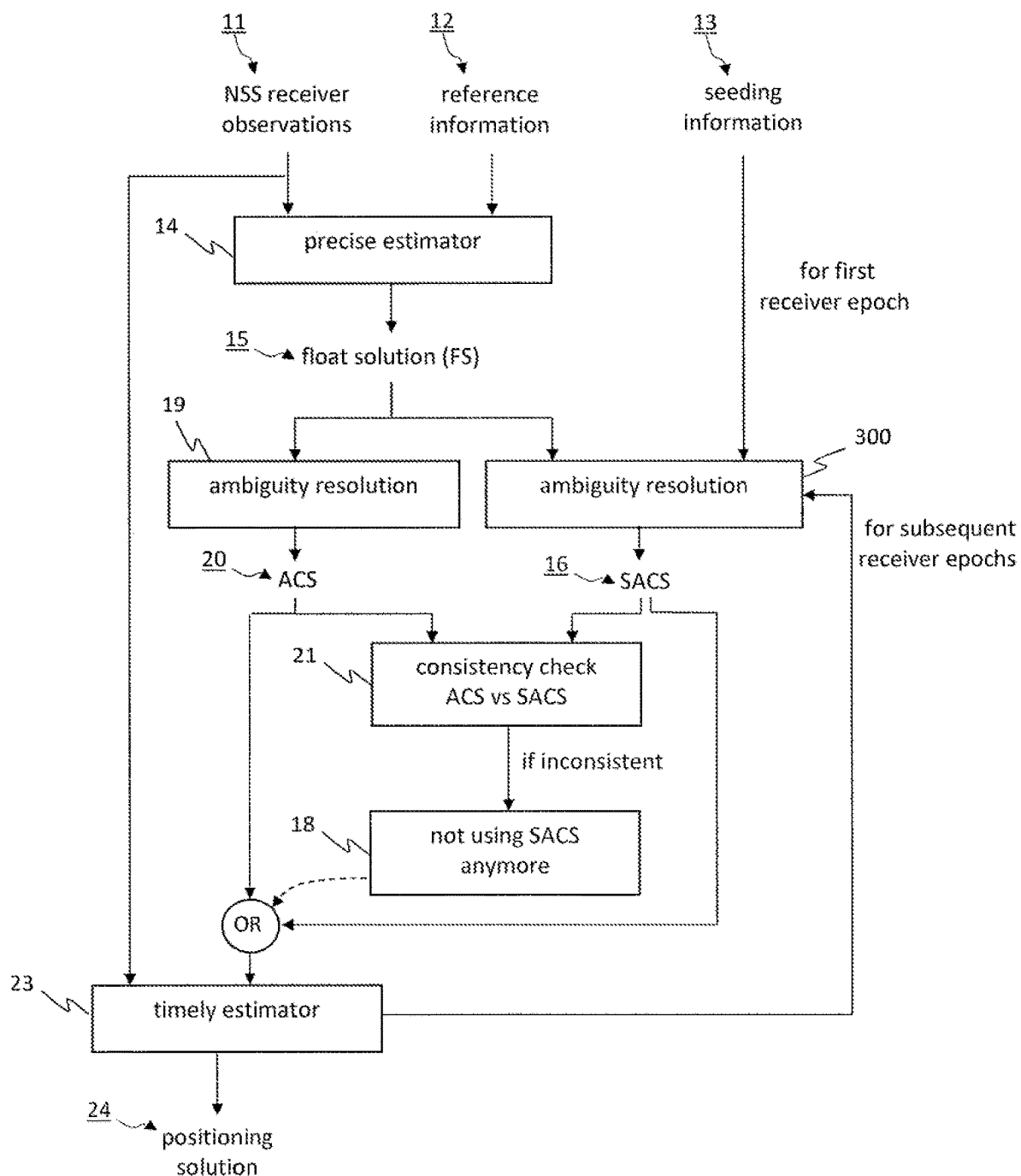

In the method illustrated by FIG. 6b, inputting into timely estimator 23 a solution computed based on the precise estimator's state variables comprises the following steps: If SACS 16 computed at the receiver epoch under consideration has been determined to be inconsistent with ACS 20 computed at the receiver epoch under consideration, ACS 20 is inputted 400 into timely estimator 23. Otherwise, SACS 16 is inputted 400 into timely estimator 23. In other words, timely estimator 23 uses either ACS 20 or SACS 16 depending on a consistency check 21 based on ACS 20 and SACS 16. This enables the detection of incorrect seeding information so as to prevent the incorrect seeding information from corrupting positioning solution 24. The choice between ACS 20 and SACS 16 is schematically illustrated by the dotted arrow reaching the element labelled "OR" in the drawing. Namely, if SACS 16 is not to be used anymore 18 (the feedback loop using seeding information being consequently terminated), ACS 20 is inputted into timely estimator 23. Otherwise, SACS 16 is inputted into timely estimator 23.

Figure 10B:
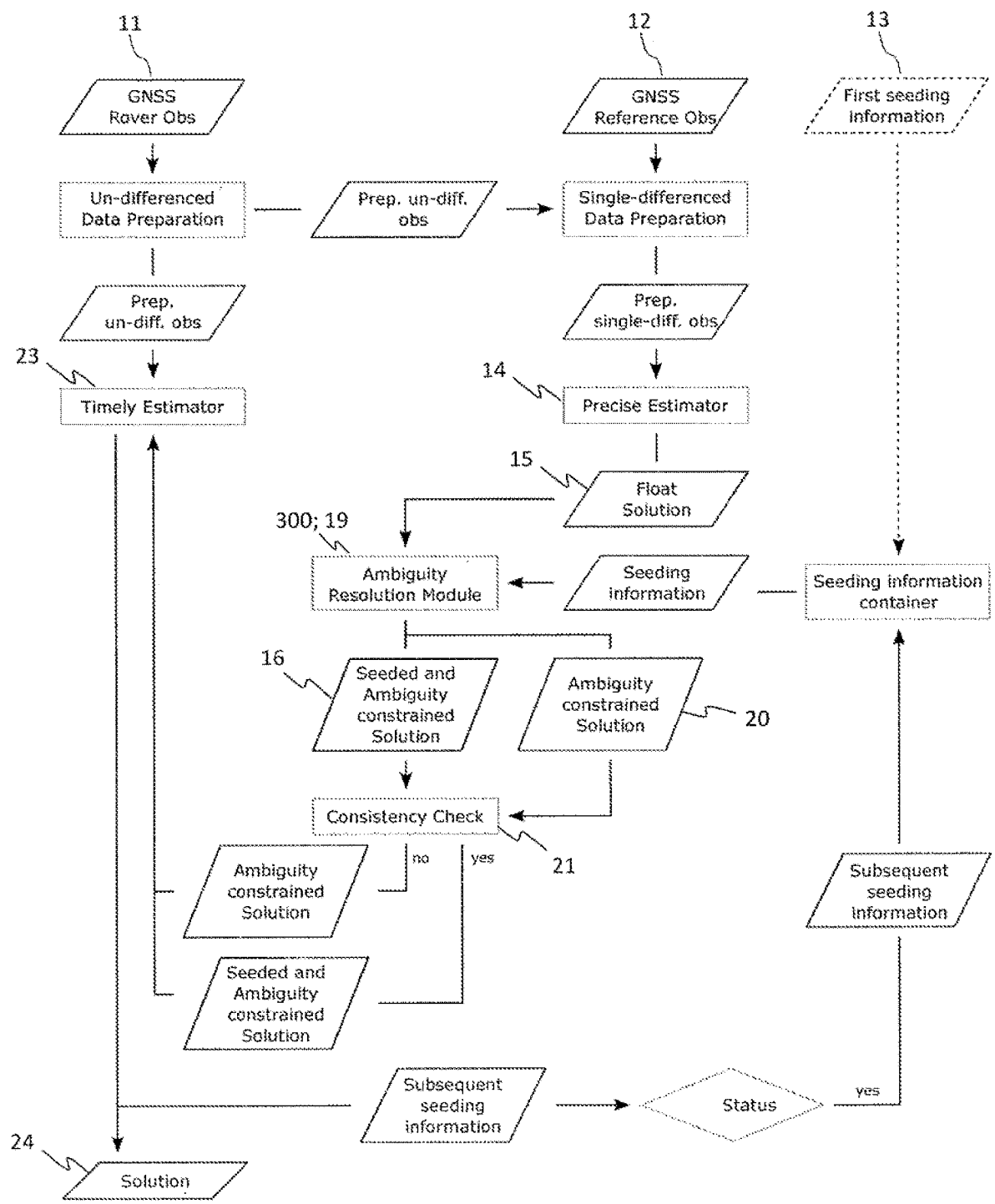

The process may be further understood by reference to FIG. 10b, which schematically illustrates an embodiment being similar to one discussed with reference to FIG. 6b.

Figure 6C:
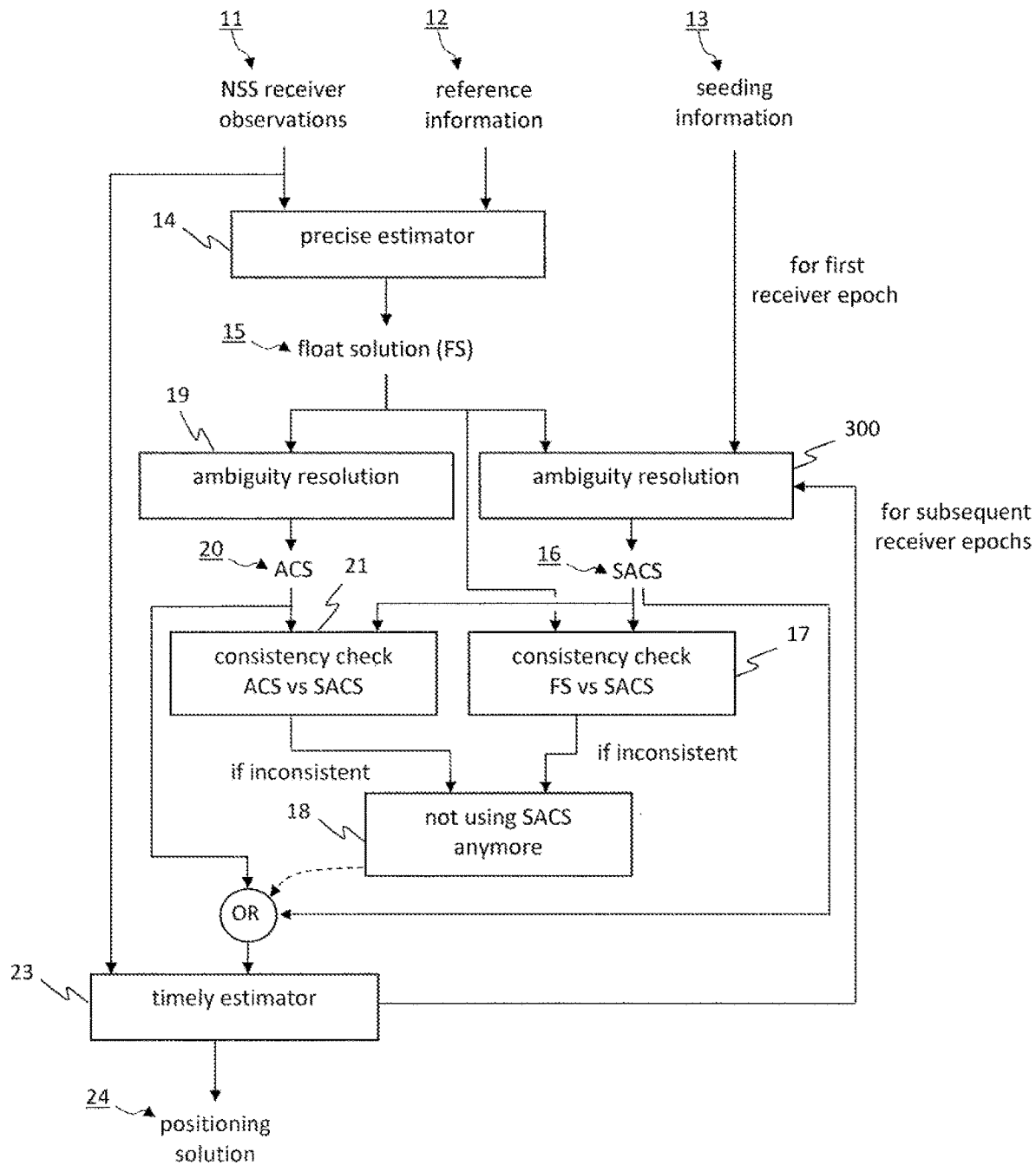

In the method illustrated by FIG. 6c, inputting into timely estimator 23 a solution computed based on the precise estimator's state variables comprises the following steps: If SACS 16 computed at the receiver epoch under consideration has been determined to be inconsistent with FS 15 computed by precise estimator 14 at the receiver epoch under consideration, and/or if SACS 16 computed at the receiver epoch under consideration has been determined to be inconsistent with ACS 20 computed at the receiver epoch under consideration, ACS 20 is inputted 400 into timely estimator 23. Otherwise, SACS 16 is inputted into timely estimator 23. In other words, timely estimator 23 uses either ACS 20 or SACS 16 depending on consistency check 21 "ACS vs SACS", on the one hand, consistency check 17 "FS and SACS", on the other hand. This enables the detection of incorrect seeding information so as to prevent the incorrect seeding information from corrupting positioning solution 24. Again, the choice between ACS 20 and SACS 16 is schematically illustrated by the dotted arrow reaching the element labelled "OR" in the drawing. Namely, if SACS 16 is not to be used anymore 18 (the feedback loop using seeding information being consequently terminated), ACS 20 is inputted into timely estimator 23. Otherwise, SACS 16 is inputted into timely estimator 23.

Figure 10C:
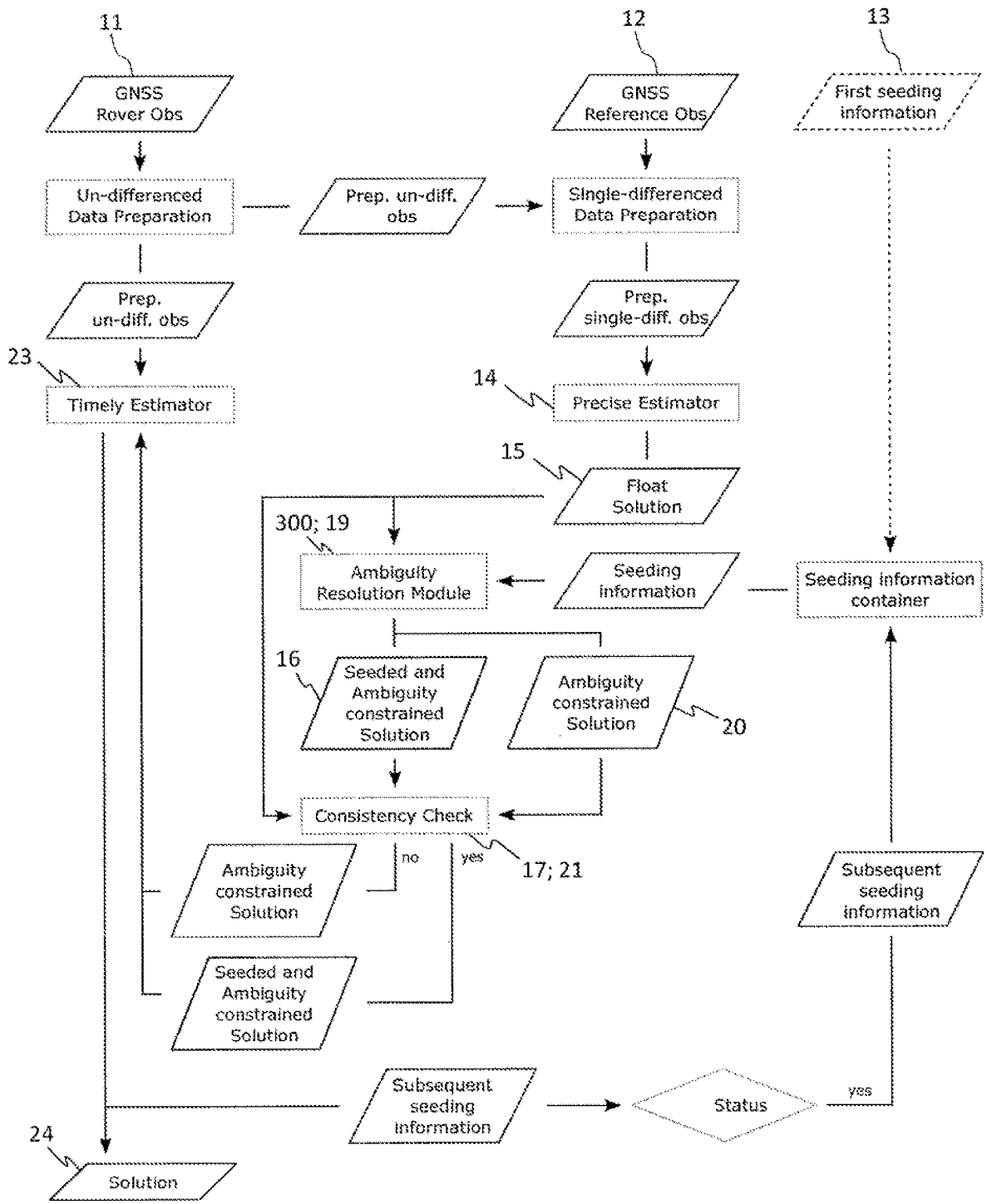

The process may be further understood by reference to FIG. 10c, which schematically illustrates an embodiment being similar to one discussed with reference to FIG. 6c.

Figure 7A:
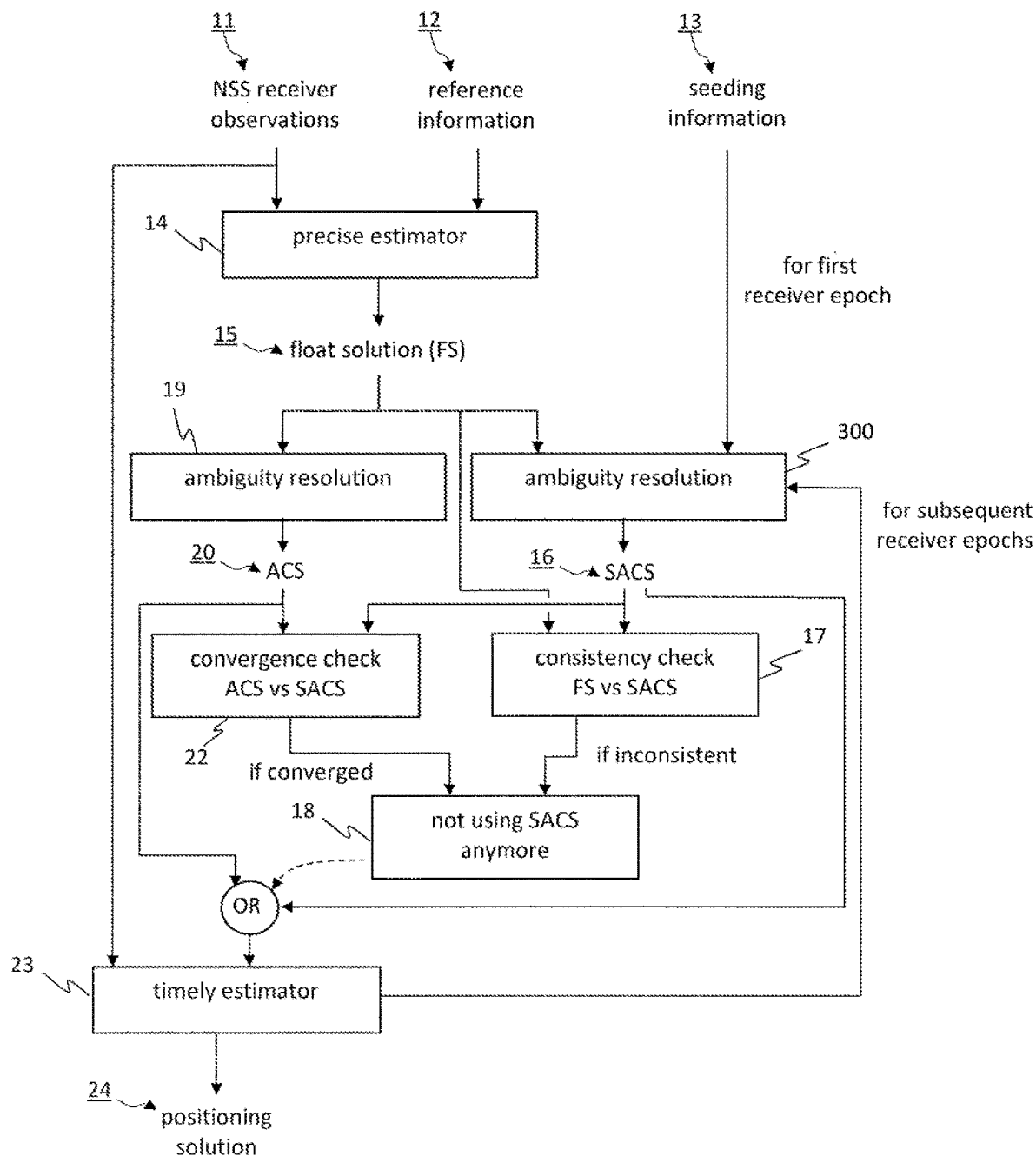

In the method illustrated by FIG. 7a, inputting into timely estimator 23 a solution computed based on the precise estimator's state variables comprises the following steps: If SACS 16 computed at the receiver epoch under consideration has been determined to be inconsistent with FS 15 computed by precise estimator 14 at the receiver epoch under consideration, or if SACS 16 computed at the receiver epoch under consideration and ACS 20 computed at the receiver epoch under consideration have been determined to have converged towards one another, inputting ACS 20 into timely estimator 23. Otherwise, SACS 16 is inputted into timely estimator 23. In other words, timely estimator 23 uses either ACS or SACS depending on convergence check 22 and consistency check 17. The dotted arrow reaching the element labelled "OR" in the drawing illustrates that, if SACS 16 is not to be used anymore 18 (the feedback loop using seeding information being consequently terminated), ACS 20 is inputted into timely estimator 23; otherwise, SACS 16 is inputted into timely estimator 23.

In one embodiment (not illustrated in FIG. 7a), ACS vs SACS convergence check 22 is carried out after FS vs SACS consistency check 17 and only if consistency check 17 did not lead SACS 16 to be considered inconsistent.

Figure 11A:
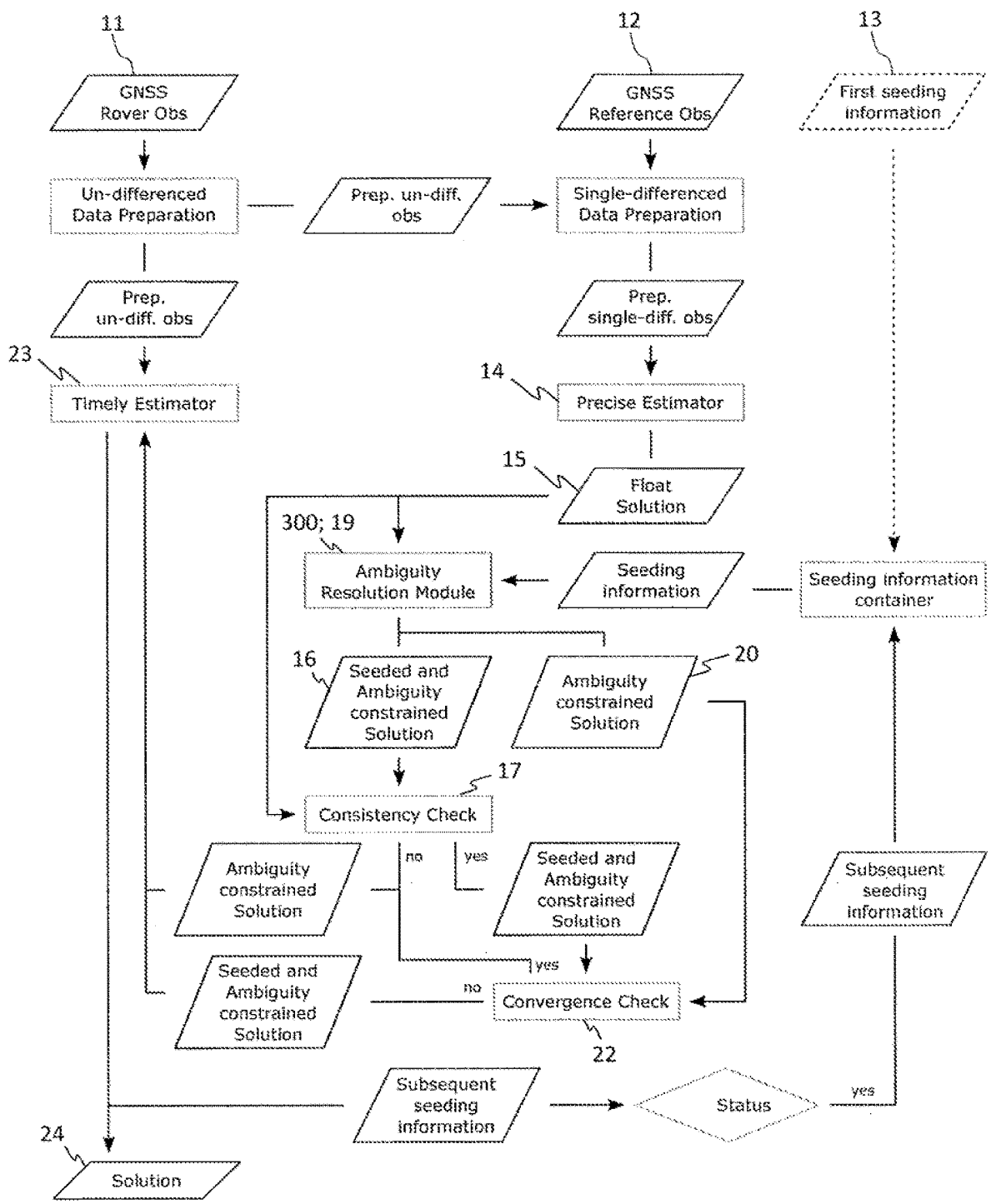

The process may be further understood by reference to FIG. 11a, which schematically illustrates an embodiment being similar to one discussed with reference to FIG. 7a.

Figure 7B:
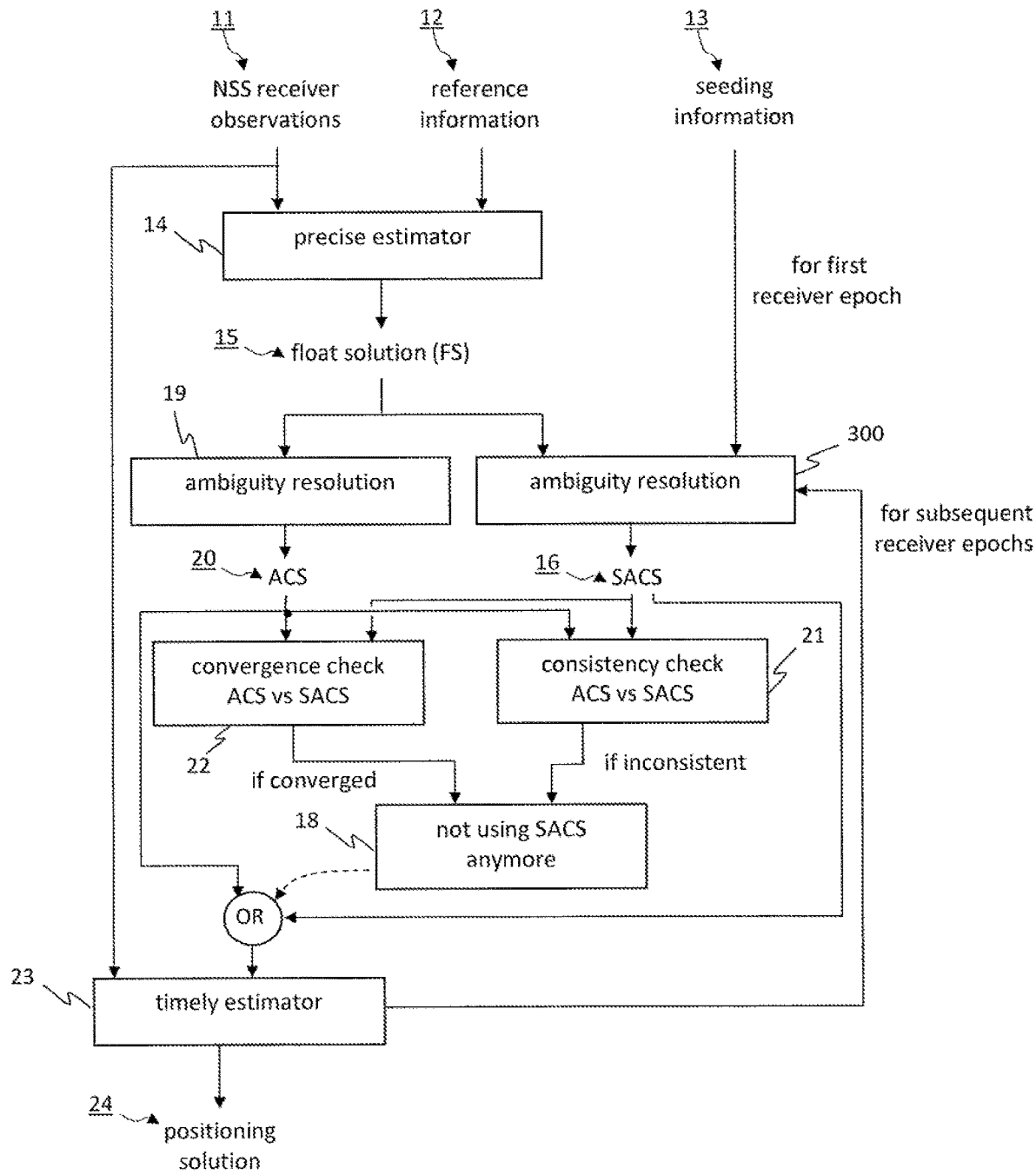

In the method illustrated by FIG. 7b, inputting into timely estimator 23 a solution computed based on the precise estimator's state variables comprises the following steps: if SACS 16 computed at the receiver epoch under consideration has been determined to be inconsistent with ACS 20 computed at the receiver epoch under consideration, or if SACS 16 computed at the receiver epoch under consideration and ACS 20 computed at the receiver epoch under consideration have been determined to have converged towards one another, inputting the ACS 20 is inputted into timely estimator 23. Otherwise, SACS 16 is inputted 400 into timely estimator 23. In other words, timely estimator 23 uses either ACS or SACS depending on convergence check 22 and consistency check 21. Again, the dotted arrow reaching the element labelled "OR" in the drawing illustrates that, if SACS 16 is not to be used anymore 18 (the feedback loop using seeding information being consequently terminated), ACS 20 is inputted into timely estimator 23; otherwise, SACS 16 is inputted into timely estimator 23.

In one embodiment (not illustrated in FIG. 7b), ACS vs SACS convergence check 22 is carried out after ACS vs SACS consistency check 21 and only if consistency check 21 did not lead SACS 16 to be considered inconsistent.

Figure 11B:
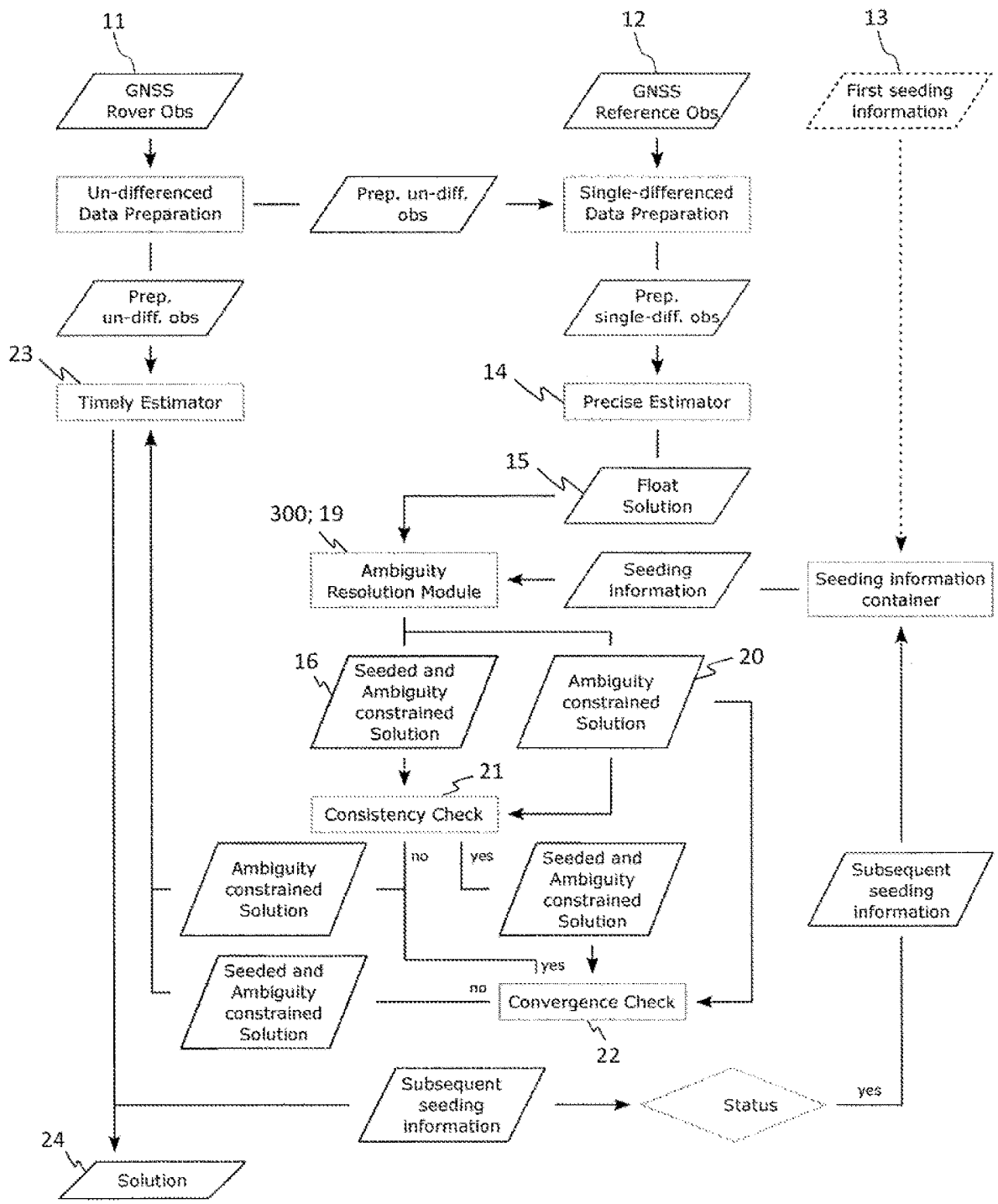

The process may be further understood by reference to FIG. 11b, which schematically illustrates an embodiment being similar to one discussed with reference to FIG. 7b.

Figure 7C:
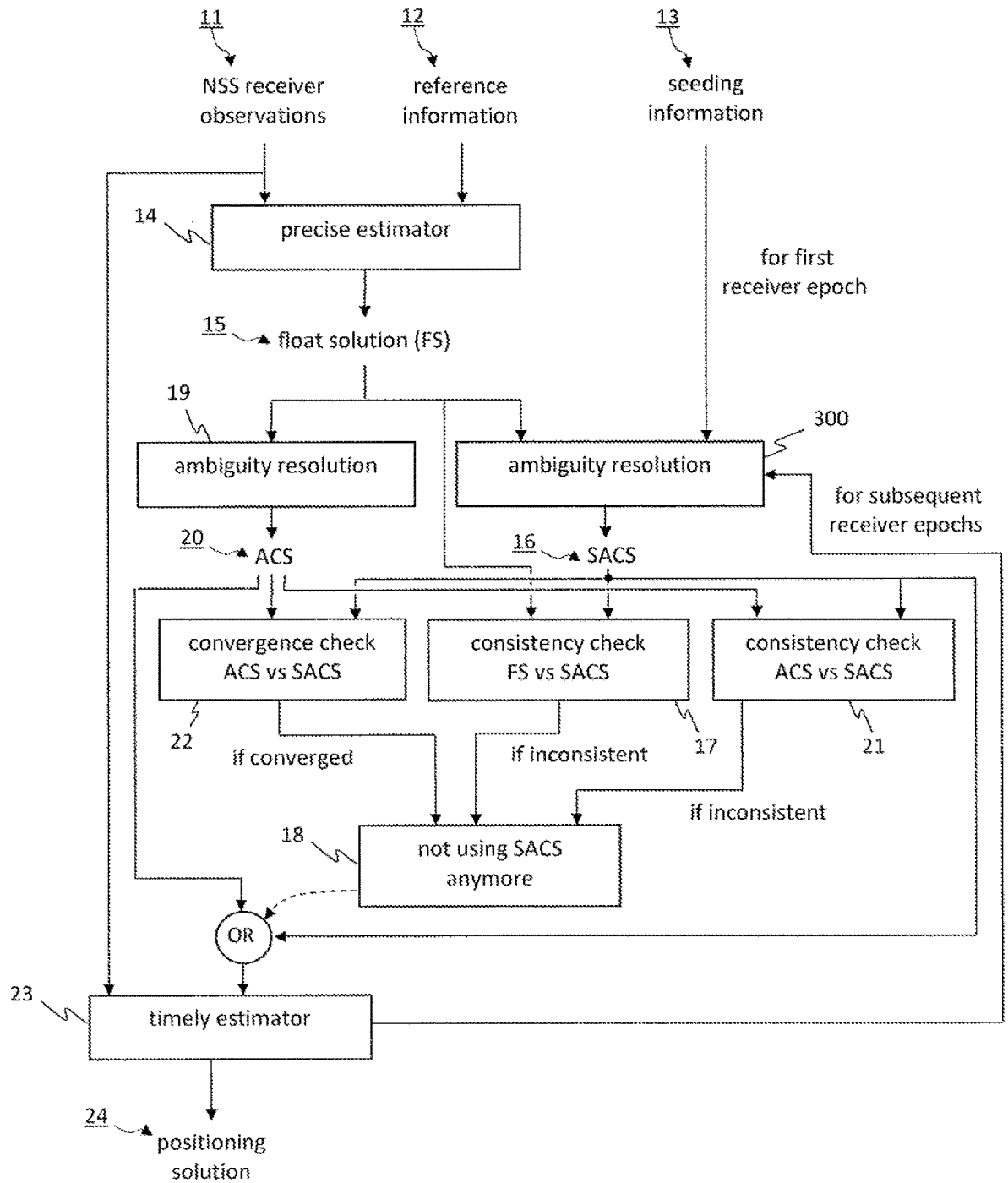

In the method illustrated by FIG. 7c, inputting into timely estimator 23 a solution computed based on the precise estimator's state variables comprises the following steps: If SACS 16 computed at the receiver epoch under consideration has been determined to be inconsistent with ACS 20 computed at the receiver epoch under consideration, or if SACS 16 computed at the receiver epoch under consideration has been determined to be inconsistent with FS 15 computed by precise estimator 14 at the receiver epoch under consideration, or if SACS 16 computed at the receiver epoch under consideration and ACS 20 computed at the receiver epoch under consideration have been determined to have converged towards one another, ACS 20 is inputted 400 into timely estimator 23. Otherwise, SACS 16 is inputted 400 into timely estimator 23. In other words, timely estimator 23 uses either ACS or SACS depending on convergence check 22, and consistency checks 17 and 21. Again, the dotted arrow reaching the element labelled "OR" in the drawing expresses that, if SACS 16 is not to be used anymore 18 (the feedback loop using seeding information being consequently terminated), ACS 20 is inputted into timely estimator 23; otherwise, SACS 16 is inputted into timely estimator 23.

In one embodiment (not illustrated in FIG. 7c), ACS vs SACS convergence check 22 is carried out after FS vs SACS consistency check 17 and ACS vs SACS consistency check 21 and only if neither consistency check 17 nor consistency check 21 led SACS 16 to be considered inconsistent.

Figure 11C:
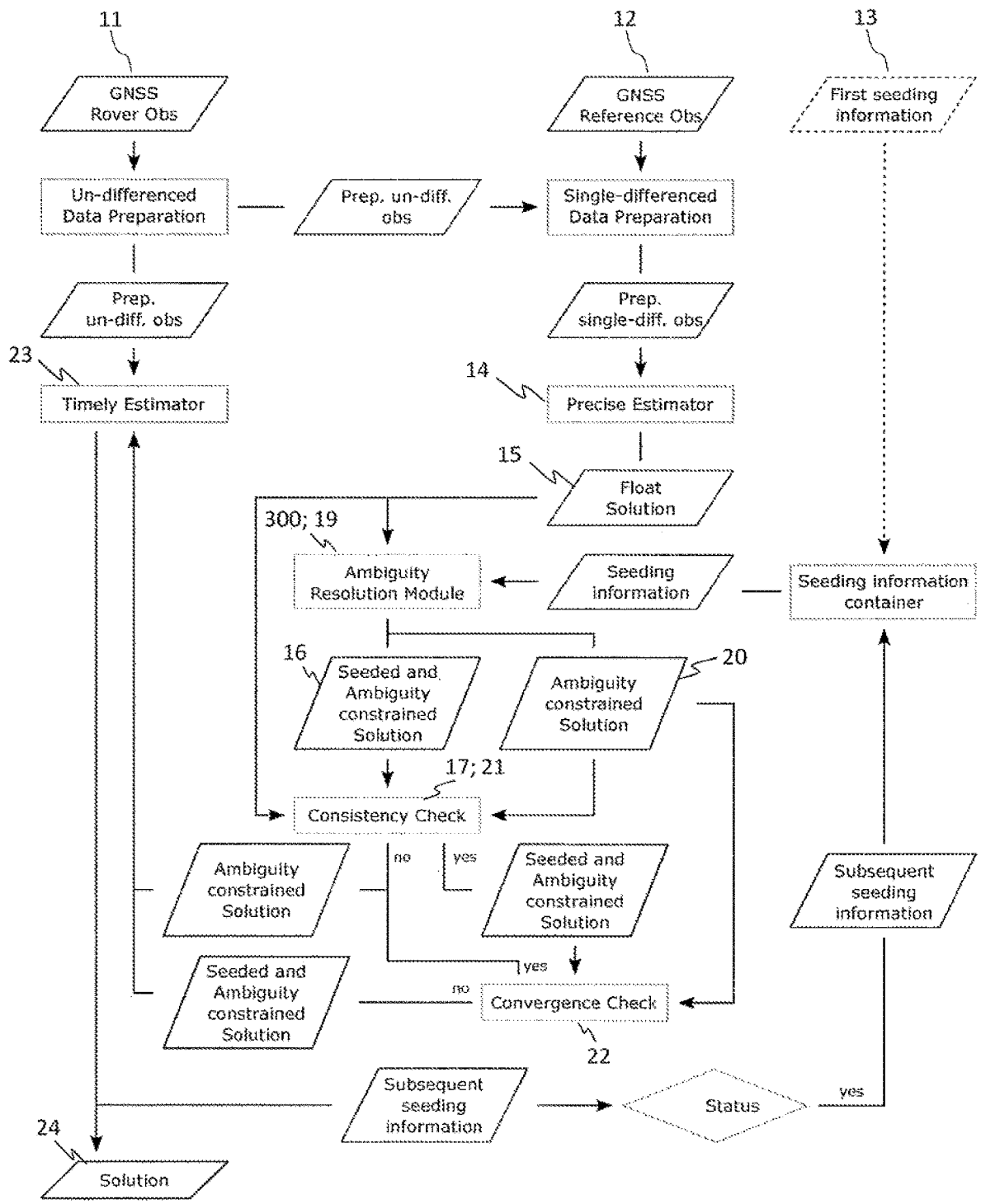

The process may be further understood by reference to FIG. 11c, which schematically illustrates an embodiment being similar to the method discussed with reference to FIG. 7c.

Let us now further explain the context in which some embodiments of the invention have been developed, for a better understanding thereof, as well as some technical considerations that may be helpful for understanding some embodiments of the invention and problems addressed by these embodiments. Afterwards, further embodiments of the invention are discussed.

Let us consider, as an example, for code $P_{i,km}^{j}$ and carrier phase $\Phi_{i,km}^{j}$ observations between receiver i and satellite j=1, ..., J on frequency band k=1, ..., K and modulation type m, the following simplified observation model without any derivative parameters like velocities. (Note that, regarding the carrier phase $\Phi_{i,km}^{j}$ observations, the modulation type dependency in the phase observation can be suppressed by assuming that the different phase signals on a frequency band are already shifted to a common base inside the receiver, e.g. L2C is assumed to be shifted by −0.25 cycles to compensate the 90 degrees rotation of the quadrature phase on which it is modulated. However, noise and multipath terms—that are usually not modeled—still have a different contribution on the phase observation for different modulation types.) The observation model relates the observations to certain physical model parameters, $$P_{i,km}^j = \rho_i^j + c\Delta t_i - c\Delta t^j + T_i^j + I_{P,i,k}^j + b_{P,i,km} - b_{P,km}^j + m_{P,i,km}^j + v_{P,i,km}^j \quad (1)$$

$$\Phi_{i,km}^j = \rho_i^j + c\Delta t_i - c\Delta t^j + T_i^j I_{\Phi,i,k}^j + b_{\Phi,i,k} - b_{\Phi,k}^j + \lambda_k N_{i,k}^j + m_{\Phi,i,km}^j + v_{\Phi,i,km}^j \quad (2)$$

with (see reference [7]) geometrical range from satellite j to receiver i;

$$\rho_i^j = \|r^j(t^{sent\_j}) - r(t_{rec\_i})\|$$

$$= \left\| \underbrace{R_z(-\overline{\omega}_{Earth}(t_{rev\_i} - t^{sent\_j}))x_{ECEF}^j(t^{sent\_j})}_{=:r^j} - \underbrace{r_{ECEF\_i}(t_{rec\_i})}_{=:r_{0i}+\Delta r_i} \right\|$$

$$\approx \underbrace{\|r^j - r_{0i}\|}_{=:\rho_{0i}^j} - \underbrace{\frac{r^j - r_{0i}}{\|r^j - r_{0i}\|}}_{:=-e_{0i}^j} \circ \Delta r_i$$

with signal sent time $t^{sent\_j}$, signal reception time $t_{rec\_i}$, earth rotation rate $\overline{\omega}_{Earth}$, rotation matrix around earth z-axis $R_z$, ECEF (Earth-centered, Earth-fixed) coordinate vectors of satellite $r_{ECEF}^j$ (known from broadcast ephemeris or a more precise source) and receiver $r_{ECEP\_i}$, approximate receiver position in ECEF $r_{0i}$ and approximate relation $$t^{sent\_j} \approx \underbrace{t_{0\_rec\_i} - P_i^j/c}_{=:t_0^{sent\_j}} - \Delta t^j(t_0^{sent\_j})$$

with approximate signal reception time $t_{0\_rec\_i}$ as measured by the receiver, and any code observation $P_i^j$ of $P_{i,km}^j$.

c speed of light
$\Delta t_i$ receiver clock error of receiver i
$\Delta t^j$ satellite clock error of satellite j (known from broadcast ephemeris or a more precise source)
$T_i^j$ tropospheric delay from satellite j to receiver i, usually modeled as $T_i^j = T_{0i}^j + m_i^j \Delta T_i$ with troposphere model $T_{0i}^j$, mapping function $m_i^j$ and receiver dependent troposphere parameter $T_i$, or as $T_i^j = T_{0i}^j + \alpha_i T_{0i}^j$ with scaling factor parameter $\alpha_i$.

$$I_{P,i,k}^j = \frac{I_{1i}^j}{f_k^2} + \frac{2I_{2i}^j}{f_k^3} + \frac{3I_{3i}^j}{f_k^4}$$

code ionospheric delay on frequency $f_k$ $$I_{\Phi,i,k}^j = -\frac{I_{1i}^j}{f_k^2} - \frac{I_{2i}^j}{f_k^3} - \frac{I_{3i}^j}{f_k^4}$$

carrier phase ionospheric delay on frequency $f_k$
$b_{P,i,km}$ code receiver bias
$b_{P,km}^j$ code satellite bias
$b_{\Phi,i,k}$ phase receiver bias (independent of modulation type m)
$b_{\Phi,k}^j$ phase satellite bias (independent of modulation type m)

$N_{i,k}^j$ integer ambiguity term from satellite j to receiver ion wavelength $\lambda_k$
$m_{P,i,km}^j$ code multipath from satellite j to receiver i
$m_{\Phi,i,km}^j$ phase multipath from satellite j to receiver i
$v_{P,i,km}^j$ code random noise term
$v_{\Phi,i,km}^j$ phase random noise term Examples of different modulation types (also called code types) are in case of GPS L1C/A, L1P, L1C on L1-frequency band and L2C, L2P on L2-frequency band and in case of GLONASS L1C, L1P and L2C, L2P. Note that for the GLONASS satellite system, wavelength $\lambda_k$ and frequency $f_k$ also depend on a satellite specific frequency channel number so that the notation could be extended to $\lambda_k^{(j)}$ and $f_k^{(j)}$. In addition, especially the code receiver biases $b_{P,i,km}$ also have a channel and therefore satellite dependency. Therefore a more precise formulation for the code receiver bias would be $b_{P,i,km}^j = b_{P,i,km} + \Delta b_{Pj,km}^j$.

In the following, the second order $$\frac{I_{2i}^j}{f_k^3}$$

and third order $$\frac{I_{3i}^j}{f_k^4}$$

ionospheric terms, which are typically in the range of less than 2 cm (see references [7], [10], are neglected. By doing so, $$I_{P,i,k}^j = \frac{I_{1i}^j}{f_k^2} = -I_{\Phi,i,k}^j \text{ with } I_i^j := I_{1i}^j.$$

Under very severe geomagnetic active conditions, the second and third order terms can reach tens of centimeters. However, these conditions typically occur for only a few days in many years. The higher-order ionospheric terms can be taken into account by ionospheric models based on the Appleton-Hartree equation that relates the phase index of refraction of a right hand circularly polarized wave propagating through the ionosphere to the wave frequency $f_k$, the electron density and the earth magnetic field. Approximations to the Appleton-Hartree equation allow to relate the parameters $I_{2i}^j$, $I_{3i}^j$ of the second and third order ionospheric terms to the first order ionospheric estimation parameter $I_i^j := I_{li}^j$, which is a measure of the total electron content along the signal propagation path. Thus, higher-order ionospheric terms can be corrected based on observation data on at least two frequencies (see reference [7]).

Using the simplified ionosphere parametrization $$I_{P,i,k}^j = -I_{\Phi,i,k}^j = \frac{I_i^j}{f_k^2} = \frac{I_{0i}^j}{f_k^2} + \frac{\Delta I_i^j}{f_k^2}$$

with known ionosphere model $$\frac{I_{0i}^j}{f_k^2},$$

recognizing the troposphere model parametrization, neglecting multipath and noise terms, inserting the approximation for the geometrical range, restricting the model to receiver i=1 and ignoring the modulation type index m, we obtain the rover model equations $$P_{1,k}^j = \rho_{01}^j + e_{01}^j \circ \Delta r_1 + c\Delta t_1 - \qquad (3)$$
$$c\Delta t^j + T_{01}^j + m_1^j \Delta T_1 + \frac{I_{01}^j}{f_k^2} + \frac{\Delta I_1^j}{f_k^2} + b_{P,1,k} - b_{P,k}^j$$

$$\Phi_{1,k}^j = \rho_{01}^j + e_{01}^j \circ \Delta r_1 + c\Delta t_1 - c\Delta t^j + \qquad (4)$$
$$T_{01}^j + m_1^j \Delta T_1 - \frac{I_{01}^j}{f_k^2} - \frac{\Delta I_1^j}{f_k^2} + b_{\Phi,1,k} - b_{\Phi,k}^j + \lambda_k N_{1,k}^j$$

For a second receiver that is used as a reference receiver with known position, we have the same equations with each index i=1 substituted by i=2 and ignoring the term $e_{02}^{j\circ}\Delta r_2$ due to the known position of the reference ($\Delta r_2 = 0$).

In usual RTK processing, the reference receiver is given by a usual physical receiver. If this reference is not too far away (e.g. less than 100 km) from the rover, it is possible to derive a precise position for the rover within a few seconds.

One approach to PPP processing is to use the precise orbits, precise satellite clocks and biases, and possibly additional ionosphere and troposphere model information, which are transmitted in PPP, to generate artificial observations that can be processed as in usual RTK. In these artificial observations, all pure receiver-dependent quantities are set to zero. Also the arbitrary value of the ambiguity can be set to zero. This results in the simplified equations for artificial reference data $$P_{2,k}^j = \rho_{02}^j - c\Delta t^j + T_{02}^j + \frac{I_{02}^j}{f_k^2} - b_{P,k}^j \qquad (5)$$

$$\Phi_{2,k}^j = \rho_{02}^j - c\Delta t^j + T_{02}^j - \frac{I_{02}^j}{f_k^2} - b_{\Phi,k_{1,k}}^j. \qquad (6)$$

By computing the artificial reference data for the approximate rover position, we get $\rho_{02}^j = \rho_{01}^j$, $T_{02}^j = T_{01}^j$, $I_{02}^j = I_{01}^j$, so that by differencing between rover and artificial reference all terms in the reference cancel. With the definitions, $\Delta P_k^j := P_{1,k}^j - P_{2,k}^j$, $\Delta \Phi_k^j := \Phi_{1,k}^j - \Phi_{2,k}^j$, we obtain from equations (3) and (4):

$$\Delta P_k^j = e_{01}^j \circ \Delta r_1 + c\Delta t_1 + m_1^j \Delta T_1 + \frac{\Delta I_1^j}{f_k^2} + b_{P,1,k} \qquad (7)$$

$$\Delta \Phi_k^j = e_{01}^j \circ \Delta r_1 + c\Delta t_1 + m_1^j \Delta T_1 - \frac{\Delta I_1^j}{f_k^2} + b_{\Phi,1,k} + \lambda_k N_{1,k}^j. \qquad (8)$$

If the artificial reference is not evaluated for the rover position, one may keep track of the known quantities $\rho_{01}^j$, $\rho_{02}^j$, $T_{01}^j$, $T_{02}^j$, $I_{01}^j$, $I_{02}^j$. This is usually done in a data-preparation step where the observations are accordingly adapted.

These observation equations define a linear system of equations that is growing with each incoming observation over time. Omitting the meanwhile unnecessary receiver index i=1, the observation equations can be rewritten in matrix form as follows:

$$\underbrace{\begin{pmatrix} \Delta P_1^1(t_1) \\ \Delta P_2^1(t_1) \\ \Delta P_1^2(t_1) \\ \Delta P_2^2(t_1) \\ \vdots \\ \Delta \Phi_1^J(t_1) \\ \Delta \Phi_2^J(t_1) \\ \vdots (t_2) \end{pmatrix}}_{=:z} = \qquad (9)$$

$$\underbrace{\begin{pmatrix} e_{0x}^1 & e_{0y}^1 & e_{0z}^1 & 1 & m^1 & 1/f_1^2 & \ldots & 0 & 1 & 0 & 0 & 0 & \ldots & 0 & \ldots \\ e_{0x}^1 & e_{0y}^1 & e_{0z}^1 & 1 & m^1 & 1/f_2^2 & \ldots & 0 & 0 & 1 & 0 & 0 & \ldots & 0 & \ldots \\ e_{0x}^2 & e_{0y}^2 & e_{0z}^2 & 1 & m^2 & 1/f_1^2 & \ldots & 0 & 1 & 0 & 0 & 0 & \ldots & 0 & \ldots \\ e_{0x}^2 & e_{0y}^2 & e_{0z}^2 & 1 & m^2 & 1/f_2^2 & \ldots & 0 & 0 & 1 & 0 & 0 & \ldots & 0 & \ldots \\ \vdots & \vdots & \vdots & \vdots & \vdots & \vdots & \ldots & \vdots & & & & & \ldots & & \ldots \\ e_{0x}^J & e_{0y}^J & e_{0z}^J & 1 & m^J & 0 & \ldots & -1/f_1^2 & 0 & 0 & 0 & 0 & \ldots & 0 & \ldots \\ e_{0x}^J & e_{0y}^J & e_{0z}^J & 1 & m^J & 0 & \ldots & -1/f_2^2 & 0 & 0 & 1 & 0 & \ldots & \lambda_2 & \ldots \\ \vdots & \vdots & \vdots & \vdots & \vdots & & \ldots & & \vdots & \vdots & \vdots & \vdots & \ldots & & \ldots \end{pmatrix}}_{=:H}$$

$$\underbrace{\begin{pmatrix} \Delta x(t_1) \\ \Delta y(t_1) \\ \Delta z(t_1) \\ c\Delta t(t_1) \\ \Delta T(t_1) \\ \Delta I^1(t_1) \\ \vdots \\ \Delta I^J(t_1) \\ b_{P,1}(t_1) \\ b_{P,2}(t_1) \\ b_{\Phi,1}(t_1) \\ b_{\Phi,2}(t_1) \\ N_1^1(t_1) \\ \vdots \\ N_2^J(t_1) \\ \vdots (t_2) \end{pmatrix}}_{=:x}$$

Let index k be related to quantities at time step $t_k$. Then equation (9) can be written as $$\underbrace{\begin{pmatrix} z_1 \\ z_2 \\ \vdots \\ z_n \end{pmatrix}}_{=z} = \underbrace{\begin{pmatrix} H_1 & 0 & 0 & 0 \\ 0 & H_2 & 0 & 0 \\ 0 & 0 & \ddots & 0 \\ 0 & 0 & 0 & H_n \end{pmatrix}}_{=H} \underbrace{\begin{pmatrix} x_1 \\ x_2 \\ \vdots \\ x_n \end{pmatrix}}_{=x}. \qquad (10)$$

with measurement vector $z_k$ and unknown parameter state vector $x_k$ at time step $t_k$. The design matrices $H_k$ define the functional part of the measurement model. There is also a stochastic part of the measurement model that defines the uncertainty $v_k$ of measurements $z_k$, so that $$z_k = H_k x_k + v_k. \tag{11}$$

Typically, $v_k$ is assumed to be Gaussian distributed with zero mean and covariance matrix $E[v_k v_k^T] =: R_k$.

It is reasonable to assume that the parameters $x_k$ at successive time steps are not totally independent. Therefore a transition matrix $\Phi_{k-1}$ is introduced that defines the functional part of a physically motivated dynamic model that relates $x_{k-1}$ to $x_k$. Also this relation has a stochastic nature that can be represented by noise $\overline{\omega}_{k-1}$ added to the time transferred state parameters $x_{k-1}$ $$x_k = \Phi_{k-1} x_{k-1} + \overline{\omega}_{k-1}. \tag{12}$$

$\overline{\omega}_{k-1}$ is also typically assumed to be Gaussian distributed with zero mean and a covariance matrix $E[\overline{\omega}_{k-1} \overline{\omega}_{k-1}^T] =: Q_{k-1}$.

In GNSS processing without derivative states (like velocities), the time transition matrix $\Phi_{k-1}$ is typically just the unit matrix, so that $x_k = x_{k-1} + \overline{\omega}_{k-1}$. Note that, for states in $x_k$ that are quickly changing from epoch to epoch, a large noise input makes this dynamic model again realistic. Examples for such quickly changing states are the receiver clock error $c\Delta t_k$ or the receiver position offset $(\Delta x_k, \Delta y_k, \Delta z_k)$ in the non-static case. Noise input covariance matrix $Q_k$ is usually assumed to be a diagonal matrix with zero variance for the ambiguity parameters and huge variance for the receiver clock error. Finding reasonable variances for the other parameters is a tuning problem. The ionosphere-related variances in $Q_k$ are to be taken into account as well. Fast convergence of position offset parameters within a few seconds is (without further information) possible with tight variances for $\Delta I^j$. However, this requires a precise ionosphere model in the artificial reference in equations (5), (6) that reflects the true ionospheric delay in the bounds given by $Q_k$. Without ionosphere model, convergence times are usually below 30 minutes to 4 cm horizontal accuracy in 95% of the convergence runs (assuming the use of advanced ambiguity resolution strategies, see for example well-known Least-squares AMBiguity Decorrelation Adjustment (LAMBDA) method). With a global ionosphere model derived from about 100 worldwide distributed reference stations, convergence times shrink to about 15 minutes to 4 cm horizontal accuracy in 95% of convergence runs. With a regional ionosphere model derived from a dense network of reference stations (with a station separation of less than 200 km), the typical convergence times come down to a few seconds to 4 cm horizontal accuracy in 95% of convergence runs. Some embodiments of the invention relate to the PPP scenario when no ionosphere model or just a global ionosphere model is available and form an alternative approach in order to achieve short convergence times with help of seeding information 13, such as for example a known position at the boot time of the NSS receiver.

Observation covariance matrix $R_k$ is also typically chosen as a diagonal matrix (thus assuming that observations on code and phase and for different satellites are not correlated). Phase observations are typically modeled with a two orders of magnitude tighter standard deviation than for code observations, both obeying an elevation dependent distribution (which explains the time dependency of $R_k$).

The mathematical problem of finding the optimal (in a least squares sense) state vector $\hat{x}_k$ and its covariance matrix $P_k := E[(x_k - \hat{x}_k)(x_k - \hat{x}_k)^T]$ that obey equations (11) and (12), i.e.

$$\hat{x}_k = \underset{x_k}{\operatorname{argmin}} (z_k - H_z x_k)^t R_k^{-1} (z_k - H_k x_k) + \tag{13}$$

$$(x_k - \Phi_{k-1} \hat{x}_{k-1})^t Q_{k-1}^{-1} (x_k - \Phi_{k-1} \hat{x}_{k-1})$$

can be solved in a sequential way by the Kalman filter update equations.

Given an initial guess for the estimated state vector $\hat{x}_0$ (typically $\hat{x}_0 = 0$) together with an assumed covariance matrix $P_0$ (typically $P_0$ is setup in a similar way as noise input matrix $Q_0$ but with large variances for the ambiguities), the estimated state vector $\hat{x}_k$ and state covariance matrix $P_k$ are first propagated forward in time in a prediction step (also called time update) resulting in a predicted state vector $\hat{x}_k^-$ and predicted state covariance matrix $P_k^-$ $$\hat{x}_k^- = \Phi_{k-1} \hat{x}_{k-1} \tag{14}$$

$$P_k^- = \Phi_{k-1} P_{k-1} \Phi_{k-1}^T + Q_{k-1}. \tag{15}$$

Then follows a correction step by the observation vector $z_k$, in the measurement update $$\hat{x}_k = \hat{x}_k^- + K_k (z_k - H_k \hat{x}_k^-) \tag{16}$$

$$P_k = (1 - K_k H_k) P_k^- \tag{17}$$

with Kalman gain matrix $K_k$.

$$K_k = P_k^- H_k^T (H_k P_k^- H_k^T + R_k)^{-1}. \tag{18}$$

Figure 19:
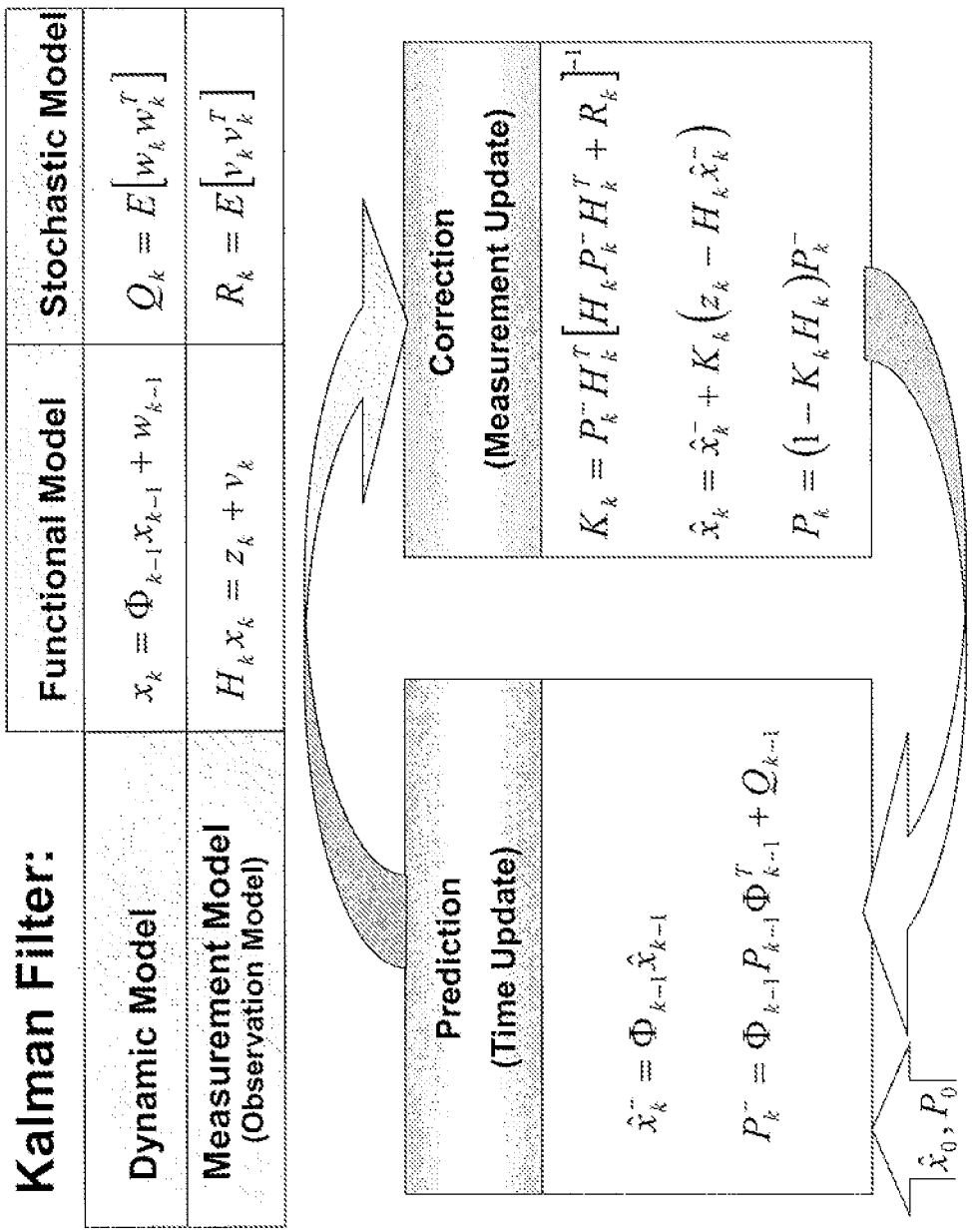
FIG. 19 schematically illustrates Kalman filter update equations in one embodiment of the invention.

FIG. 19 provides a concise and schematic overview of the described Kalman filter update equations (see also, for example, reference [6]).

The estimated delta position states $\Delta \hat{r} = (\Delta \hat{x}, \Delta \hat{y}, \Delta \hat{z})$ in $\hat{x}_k$, that define together with the initial position $r_0 = (x_0, y_0, z_0)$ the estimated float receiver position $\hat{r} = r_0 + \Delta \hat{r}$, converge very slowly.

Note that in a kinematic processing scenario the variances of the delta position states are significantly opened up every epoch by noise input on the position entries in $Q_k$. Thus the position states re-converge every epoch, but the result of this re-convergence depends on how far the other parameters that get little or no noise input have converged in the meantime. Thereby, especially the ionosphere and ambiguity states may be considered.

The variances of the ambiguity states can be significantly reduced thanks to the integer nature of the ambiguities. However, the ambiguities introduced so far do not have integer nature. The Kalman filter does not have knowledge of the integer nature of the ambiguities. In the first processing epoch, the receiver clock modeling parameter in the Kalman filter basically takes the average of all code and phase observations, Receiver biases take over average deviations from this overall average on code and phase and for different frequency bands. Thus the clock and bias parameters also absorb parts of the real ambiguities, shifting them away from integer values. Alternatively, this can be interpreted in the sense that the ambiguities absorb parts of the real receiver clock and biases.

In order to get to integer quantities, on each GNSS frequency band k a common reference ambiguity $\hat{N}_k^{j_0}$ may be subtracted from all the other ambiguities, formally resulting into double-difference ambiguities that cancel receiver clock and bias contributions in the ambiguities. Since the ambiguities of the artificial reference have been chosen to be 0, single difference receiver ambiguities between satellites result in the PPP scenario.

$$\nabla \hat{N}_k^j := \hat{N}_k^j - \hat{N}_k^{j0}, k=1, \ldots, K. \qquad (19)$$

Note that we have reused here k as a frequency band index while the index k belonged in equations (10) to (18) to time step $t_k$.

More precisely, equation (19) can also be expressed via a single difference transformation matrix $T_{SD}$ that also transforms the ambiguity covariance matrix $P_{\hat{N}\hat{N}}$ $$\nabla \hat{N} = T_{SD} \hat{N}, P_{\nabla \hat{N} \nabla \hat{N}} = T_{SD} P_{\hat{N}\hat{N}} T_{SD}^T. \qquad (20)$$

In the following discussion, we substitute $\nabla \hat{N}$ again by $\hat{N}$ in order to simplify the expressions. Nevertheless, it should be kept in mind that, from here on, $\hat{N}$ corresponds to a double-differenced ambiguity vector having integer nature.

Integer resolution means finding one (or more) double-differenced integer vectors that are closest to the estimated double-differenced float ambiguity vector $\hat{N}$ in the metric defined by the inverse ambiguity covariance matrix $P_{\hat{N}\hat{N}}^{-1}$, i.e. minimizing $$\chi_i^2 := (N_i - \hat{N})^T P_{\hat{N}\hat{N}}^{-1} (N_i - \hat{N}) N_i \in \mathbb{Z}^{KJ}, i=1, \ldots, m. \qquad (21)$$

There is no analytical method to find these minimizing integer vectors $N_i$. This is known as an NP-hard (non-deterministic polynomial time hard) problem that becomes more and more severe in higher and higher dimensions. One way to determine the best integer vectors is by inserting an integer ambiguity vector in equation (21) (thus evaluating its $\chi^2$) and comparing it to the $\chi^2$ values of other integer vectors. Nevertheless, efficient search strategies exist, which already exclude, during the step-wise computation of $\chi^2$ for a particular integer vector, huge amounts of integer vectors as possible candidates for the best integer vectors. Any integer vector whose partial $\chi^2$ is already larger than the $\chi^2$ of the best candidate found so far can be immediately rejected. In this way, the space of possible integer vectors (called the search space) successively shrinks during the search process. An efficient approach for determining the best integer candidates is for example the well-known LAMBDA method, which allows even faster detection of irrelevant ambiguity vectors by de-correlating the ambiguity components as best as possible in a first step (while preserving the integer nature and the volume of the search space) (in that respect see, for example, references [8], [9]).

In the ambiguity resolution, the variances of the ambiguities should be reliably reduced compared to the float ambiguity solution. These reduced variances can be transferred (by the method described in the following) to other states such as delta positions and ionospheric states, resulting in a quicker, but nevertheless reliable, convergence.

The general mathematical relationship is as follows (see e.g. reference [9]). Given a decomposition of an estimated state vector $\hat{x}$ into a part $\hat{a}$ and $\hat{b}$, we have:

$$\hat{x} = \begin{pmatrix} \hat{a} \\ \hat{b} \end{pmatrix}, P_{\hat{x}\hat{x}} = \begin{pmatrix} P_{\hat{a}\hat{a}} & P_{\hat{a}\hat{b}} \\ P_{\hat{b}\hat{a}} & P_{\hat{b}\hat{b}} \end{pmatrix}. \qquad (22)$$

In case we know that $\hat{b}$ actually takes the value $\check{b}$ with covariance matrix $P_{\check{b}\check{b}}$, the conditional estimate of $\hat{a}$ under this constraint $\hat{b} \to \check{b}$ is given by $\tilde{a}$ with $$\tilde{a} = \hat{a} + P_{\hat{a}\hat{b}} P_{\hat{b}\hat{b}}^{-1} (\check{b} - \hat{b}) \qquad (23)$$

$$P_{\tilde{a}\tilde{a}} = P_{\hat{a}\hat{a}} + (P_{\hat{a}\hat{b}} P_{\hat{b}\hat{b}}^{-1})(P_{\check{b}\check{b}} - P_{\hat{b}\hat{b}})(P_{\hat{a}\hat{b}} P_{\hat{b}\hat{b}}^{-1})^T. \qquad (24)$$

Figure 20:
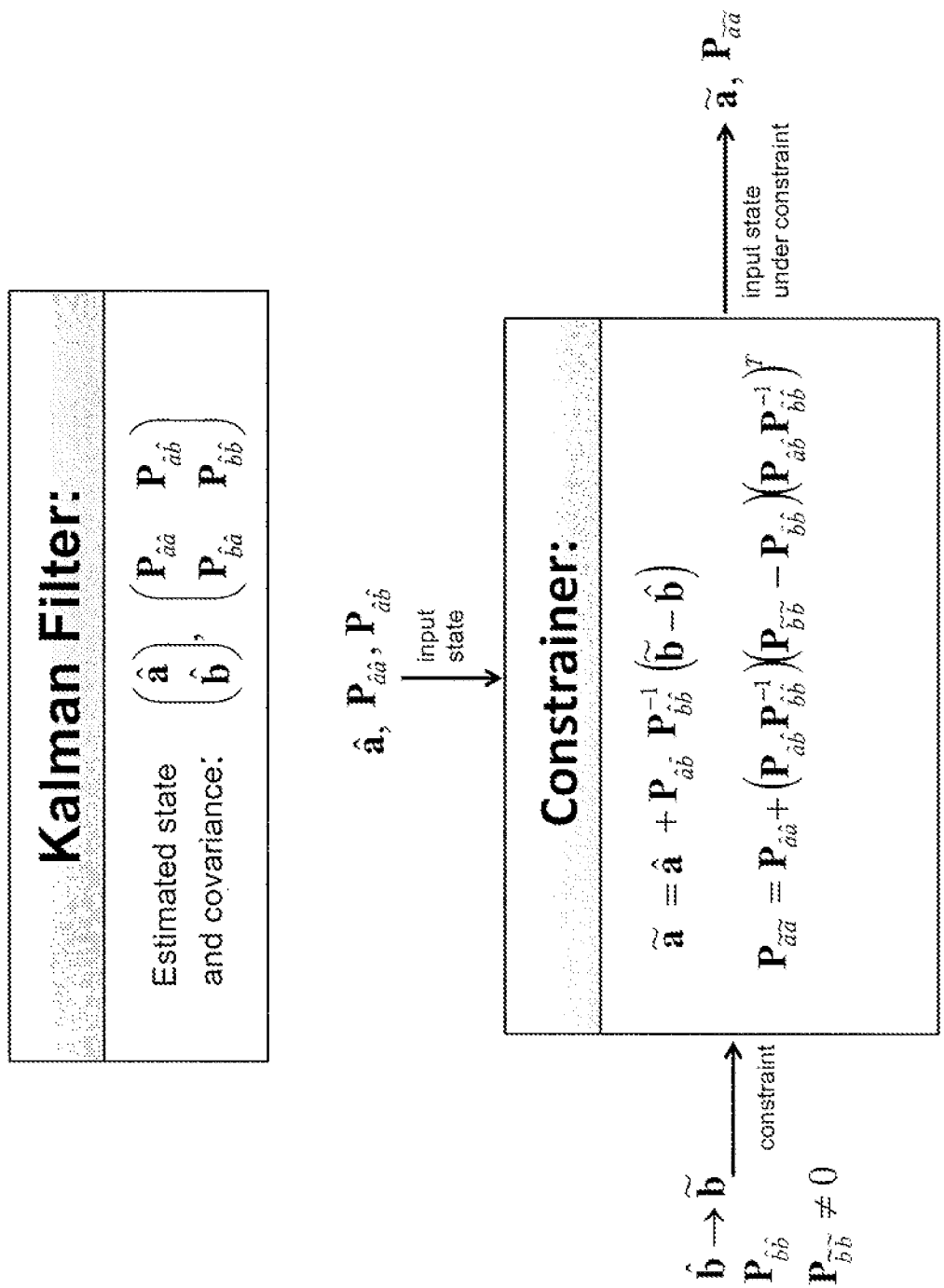
FIG. 20 schematically illustrates a Kalman filter and a constrainer in one embodiment of the invention.

$P_{\hat{a}\hat{b}} P_{\hat{b}\hat{b}}^{-1}$ acts as a projector from b-space into a-space. Equations (23) and (24) operate as a "constrainer" on $\hat{a}$. This is schematically illustrated in FIG. 20.

When making use of the integer nature of ambiguities, the ambiguity vector $\check{N}$ derived from $N_i$ in (21) takes over the role of $\check{b}$. $\tilde{a}$ describes e.g. the delta position states $\Delta \tilde{r}$ or the ionospheric delays $\Delta \tilde{I}$ under this ambiguity constraint $$\Delta \tilde{r} = \Delta \hat{r} + P_{\Delta \hat{r} \hat{N}} P_{\hat{N}\hat{N}}^{-1} (\check{N} - \hat{N}) \qquad (25)$$

$$P_{\Delta \tilde{r} \Delta \tilde{r}} = P_{\Delta \hat{r} \Delta \hat{r}} + (P_{\Delta \hat{r} \hat{N}} P_{\hat{N}\hat{N}}^{-1})(P_{\check{N}\check{N}} - P_{\Delta \hat{N} \hat{N}})(P_{\Delta \hat{r} \hat{N}} P_{\hat{N}\hat{N}}^{-1})^T \qquad (26)$$

$$\Delta \tilde{I} = \Delta \hat{I} + P_{\Delta \hat{I} \hat{N}} P_{\hat{N}\hat{N}}^{-1} (\check{N} - \hat{N}) \qquad (27)$$

$$P_{\Delta \tilde{I} \Delta \tilde{I}} = P_{\Delta \hat{I} \Delta \hat{I}} + (P_{\Delta \hat{I} \hat{N}} P_{\hat{N}\hat{N}}^{-1})(P_{\check{N}\check{N}} - P_{\hat{N}\hat{N}})(P_{\Delta \hat{I} \hat{N}} P_{\hat{N}\hat{N}}^{-1})^T. \qquad (28)$$

Equation (23) allows to derive a precise position for time step $t_k$ to which the PPP corrections (5) and (6) correspond. However, these corrections become available at the rover at $t'_k > t_k$.

Thus, during the corrections arrival times interval $[t'_{k-1}, t'_k]$, the latest available precise position belongs to $t_{k-1}$. During this time interval, the rover already generates new observations. In order to provide a precise position for $t \in ]t'_{k-1}, t'_k[$, a timely estimator may be introduced in addition to the precise estimator that we have described so far (in that respect, see for example reference [5]). Another timely estimator may be based on delta phase observations between times t and $t_{k-1}$ (see references [11], [12], [13], [14]).

Let us now describe further embodiments of the invention, and aspects of some embodiments already described above.

As mentioned above, in PPP, the integer resolved position still needs typically up to 30 minutes to converge below 4 cm horizontal accuracy, without a global ionosphere model, With a known precise position or more generally seeding information 13, the convergence or reconvergence of ambiguities can be accelerated, which in turn helps determine the position more accurately in the next time step, even if the NSS receiver is moving.

To do so, again equations (23) and (24) for conditional estimates can be used. This time the known position $\Delta \check{r}$ takes over the role of the constraint $\check{b}$. $\tilde{a}$ represents the ambiguities $\hat{\tilde{N}}$ under this constraint $$\hat{\tilde{N}} = \hat{N} + P_{\Delta \hat{r} \Delta \hat{r}}^{-1}(\Delta \check{r} - \Delta \hat{r}) \qquad (29)$$

$$P_{\hat{\tilde{N}}\hat{\tilde{N}}} = P_{\Delta \hat{r} \Delta \hat{r}} + (P_{\hat{N}\Delta \hat{r}} P_{\Delta \hat{r} \Delta \hat{r}}^{-1})(P_{\Delta \hat{r} \Delta \hat{r}} - P_{\delta \check{r} \Delta \check{r}})(P_{\hat{N}\Delta \hat{r}} P_{\Delta \hat{r} \Delta \hat{r}}^{-1})^T. \qquad (30)$$

This corresponds to a specific form of the first step of operation 300 as discussed with reference to FIG. 1a, namely: constraining the ambiguities of precise estimator 14 by seeding information 13.

The ambiguity search can now be performed on these pre-constrained (or 'seeded') ambiguities resulting in resolved, ambiguities Ň. This corresponds to a specific form of the second step of operation 300 as discussed with reference to FIG. 1a, namely: resolving the resulting, constrained precise estimator's ambiguities.

In a similar way as discussed with reference to equations (25) to (28), the resolved ambiguities N can be used to constrain the position and ionospheric states of precise estimator 14:

$$\Delta \tilde{\tilde{r}} = \Delta \hat{r} + P_{\Delta \hat{r} \hat{N}} P_{\hat{N}\hat{N}}^{-1} (\check{N} - \hat{N}) \tag{31}$$

$$P_{\Delta[\$]\$\tilde{\ }\$\$[\$]\$\tilde{\ } \Delta\tilde{\tilde{r}} \Delta[\$]\$\tilde{\ }\$\$[\$]\$\tilde{\ } \Delta\tilde{\tilde{r}}} = P_{\Delta \hat{r} \Delta \hat{r}} + (P_{\Delta \hat{r} \hat{N}} P_{\hat{N}\hat{N}}^{-1})(P_{\check{N}\check{N}} - P_{\hat{N}\hat{N}})(P_{\Delta \hat{r} \hat{N}} P_{\hat{N}\hat{N}}^{-1})^T \tag{32}$$

$$\Delta \tilde{\tilde{I}} = \Delta \hat{I} + P_{\Delta \hat{I} \hat{N}} P_{\hat{N}\hat{N}}^{-1} (\check{N} - \hat{N}) \tag{33}$$

$$P_{\Delta \tilde{\tilde{I}} \Delta \tilde{\tilde{I}}} = P_{\Delta \hat{I} \Delta \hat{I}} + (P_{\Delta \hat{I} \hat{N}} P_{\hat{N}\hat{N}}^{-1})(P_{\check{N}\check{N}} - P_{\hat{N}\hat{N}})(P_{\Delta \hat{I} \hat{N}} P_{\hat{N}\hat{N}}^{-1})^T \tag{34}$$

This corresponds to a specific form of the third step of operation 300 as discussed with reference to FIG. 1a, namely: constraining at least one of the other state variables of precise estimator 14 by the resolved ambiguities.

This results into an even more precise position than the given position since also the observations of the first receiver epoch are taken into account.

In some embodiments, the "seeded and ambiguity constrained position solution", or seeding- and ambiguity-constrained solution (SACS) 16, from equations (31) and (32) can be checked for consistency against the float solution (FS) 15 obtained from the position part of equations (16) and (17) (as illustrated for example in FIGS. 3a, 4a, 6a, 7a, 10a, 11a, 13a, and 14a), or against the position solution, also called ambiguity-constrained solution (ACS) 20, of equations (25) and (26) that was constrained by ambiguities (as illustrated for example in FIGS. 3b, 4b, 6b, 7b, 10b, 11b, 13b, and 14b), or against both FS 15 and ACS 20 (as illustrated for example in FIGS. 3c, 4c, 6c, 7c, 10c, 11c, 13c, and 14c).

Namely, SACS 16 of equation (31) with uncertainty (32) should lie in the range defined by the covariance matrix of FS 15 of equation (17) around FS 15 of equation (16), e.g.

$$\|\Delta \tilde{\tilde{r}} - \Delta \hat{r}\| \leq 3 \cdot \sqrt{\text{trace}(P_{\Delta[\$]\$\tilde{\ }\$\$[\$]\$\tilde{\ } \Delta\tilde{\tilde{r}} \Delta[\$]\$\tilde{\ }\$\$[\$]\$\tilde{\ } \Delta\tilde{\tilde{r}}}) + \text{trace}(P_{\Delta \hat{r} \Delta \hat{r}})}, \tag{35}$$

, and/or in the range defined by the covariance matrix of the ACS 20 of equation (26) around ACS 20 of equation (25), respectively, e.g.

$$\|\Delta \tilde{\tilde{r}} - \Delta \check{r}\| \leq 3 \cdot \sqrt{\text{trace}(P_{\Delta[\$]\$\tilde{\ }\$\$[\$]\$\tilde{\ } \Delta\tilde{\tilde{r}} \Delta[\$]\$\tilde{\ }\$\$[\$]\$\tilde{\ } \Delta\tilde{\tilde{r}}}) + \text{trace}(P_{\Delta \check{r} \Delta \check{r}})}. \tag{36}$$

These consistency tests 17, 21 enable the detection of false or poor seeding information 13. Alternatively, in one embodiment, the consistency tests in equations (35) and (36) can each be separated into two tests for horizontal and vertical components (as e.g. in FIG. 16a).

Embodiments of the invention are, however, not limited to handling the initial receiver epoch $t_0$ where seeding information 13 was anyhow given. After this initial receiver epoch, the NSS receiver is allowed to move. In order to render the iteration of the described procedure possible, a constraint for obtaining pre-constrained ambiguities in the next receiver epoch is advantageous. To do so, at least two alternative approaches are available, as will be described below.

In that context, the consistency checks 17, 21 against FS 15 and ACS 20 may be repeated for every receiver epoch. The reduced uncertainty in FS 15 as well as in ACS 20 renders these consistency checks 17, 21 more and more efficient over time.

In addition, in some embodiments, SACS 16 is checked against ACS 20 via a small, prescribed bound in a convergence check 22 (as illustrated for example in FIGS. 4a to 4c, 7a to 7c, 11a to 11c, and 14a to 14c). Once this bound is reached, ACS 20 can be regarded as converged. The seeding process may then be stopped 18.

Two alternative approaches for iterating the seeding of ambiguity state variables in successive epochs are as follows:

In the first iteration approach, the iteration may be carried out without a timely estimator (as illustrated for example in FIGS. 3a to 4c, and 13a to 14c). Here, the ionospheric states $\Delta \tilde{I}(t_{k-1})$ and their covariance information, determined via equations (33) and (34), are first propagated to the current epoch $t_k$ $$\Delta \tilde{\tilde{I}}^-(t_k) = \Phi_{\Delta I}(t_{k-1}) \Delta \tilde{\tilde{I}}(t_{k-1}) \tag{37}$$

$$P_{\Delta \tilde{\tilde{I}} \Delta \tilde{\tilde{N}}}(t_k) = \Phi_{\Delta I}(t_{k-1}) P_{\Delta \tilde{\tilde{I}} \Delta \tilde{\tilde{I}}}(t_{k-1}) \Phi^T(t_{k-1}) + Q_{\Delta I}(t_{k-1}). \tag{38}$$

where the state transition matrix $\Phi_{\Delta i}$ is typically just the identity matrix. The noise input matrix $Q_{\Delta i}$ is typically of diagonal form with small entries representing the uncertainty that is introduced on the ionosphere of a particular satellite during the time interval from $t_{k-1}$ to $t_k$.

$\Delta \tilde{I}^-(t_k)$ is then used for pre-constraining ambiguities $$\hat{\hat{N}}(t_k) = \hat{N}(t_k) + P_{\hat{N} \Delta I}(t_k) P_{\Delta I \Delta I}^{-1}(t_k)(\Delta \tilde{I}^-(t_k) - \Delta \hat{I}(t_k)) \tag{39}$$

$$P_{\hat{N}\hat{N}}(t_k) = P_{\Delta I \Delta I}(t_k) + (P_{\hat{N} \Delta I}(t_k)(P_{\Delta I \Delta I}^{-1}(t_k)(P_{\Delta I \Delta I}^-(t_k) - P_{66 I \Delta I}(t_k))(P_{\hat{N} \Delta I}(t_k) P_{\Delta I \Delta I}(t_k))^T. \tag{40}$$

Ambiguity resolution and transferring resolved ambiguities to position and ionospheric states work in the same manner as described in equations (31) to (34) for the initial epoch $t_0$. With $\Delta \tilde{I}(t_k)$ determined via equations (33) and (34) everything is prepared for the next iteration. One advantage of the approach is that it is insensitive to cycle slips on all phase observations.

A second iteration approach for pre-constraining ambiguities at time step is to compute a position via a timely estimator 23 (as illustrated for example in FIGS. 6a to 7c, and 10a to 11c). Once $$\hat{r}(t_k) = \hat{r}(t_{k-1}) + \Delta \hat{r}(t_k, t_{k-1}). \tag{41}$$

is known, we have the same prerequisites as in the initial epoch and can already proceed the iteration with equations (29) to (32), i.e. ambiguity pre-constraining via known position, ambiguity resolution, and transferring resolved ambiguities to the position states of the precise filter. The computations expressed in equations (33) and (34) for obtaining precise ionospheric states may not be necessary in that case.

System (or Apparatus)

Figure 21A:
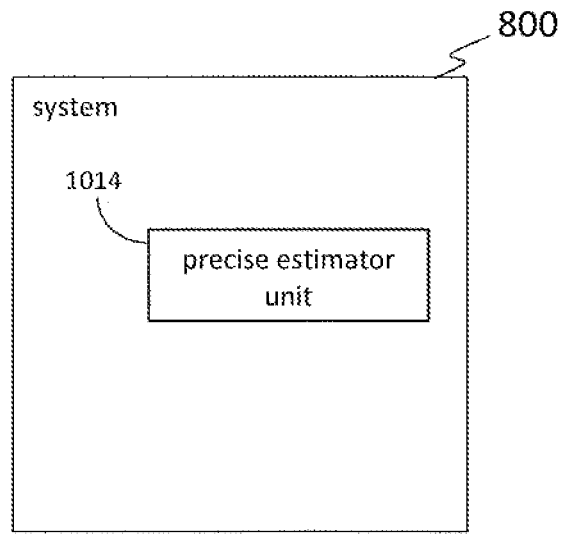
FIGS. 21a and 21b schematically illustrate two systems in two embodiments of the invention.

In one embodiment, schematically illustrated by FIG. 21a, a system 800 comprises an NSS receiver and/or a processing entity capable of receiving data from the NSS receiver. In one embodiment, system 800 is an NSS receiver. In another embodiment, system 800 is a processing entity capable of receiving data from an NSS receiver. System 800 aims at estimating parameters useful to determine a position. The NSS receiver observes an NSS signal from each of a plurality of NSS satellites over multiple receiver epochs.

System 800 comprises a unit 1014, herein referred to as "precise estimator unit" 1014, configured to implement a filter 14 ("precise estimator"). Precise estimator 14, implemented by precise estimator unit 1014, is configured to use state variables comprising at least, but not only, ambiguities in the carrier phases, and to compute values of its state variables and associated covariances, those values being here referred to as a "float solution" (FS) 15. FS 15 is computed based on (a) at least one of: (a.1) NSS signals 11 observed by the NSS receiver, and (a.2) information 11 derived from said NSS signals; and (b) information, here referred to as "reference information" 12, comprising at least one of: (b.1) observations that are not derived from NSS signals observed by the NSS receiver, and (b.2) information derived from said observations. System 800 is configured for: obtaining information, here referred to as "seeding information" 13, comprising at least one of: (i) a position of the NSS receiver and associated covariances, (ii) tropospheric delay information and associated covariances: and (iii) ionospheric delay information and associated covariances. Furthermore, system 800 is configured for computing a constrained solution, here referred to as "seeding- and ambiguity-constrained solution" or SACS 16, by constraining the ambiguities of the precise estimator 14 by seeding information 13, by resolving the resulting, constrained precise estimator's ambiguities, and by constraining at least one of the other state variables of precise estimator 14 by the resolved ambiguities.

Figure 21B:
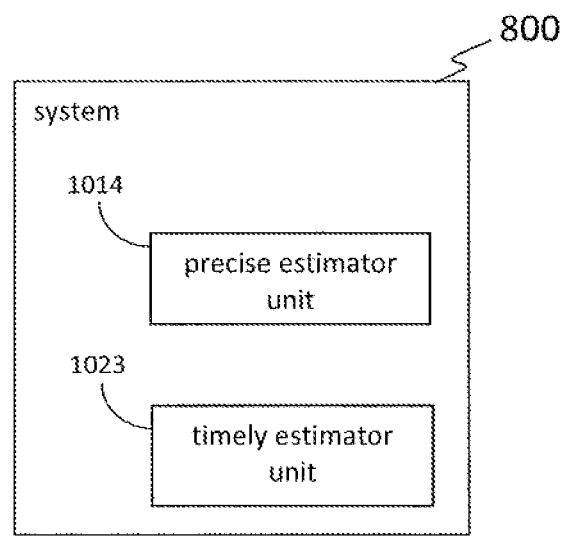

System 800 may also be configured for carrying out, in some embodiments, consistency check(s) and/or a convergence check, as discussed above. System 800 may also comprise, in some embodiments, a timely estimator unit 1023 implementing timely estimator 23, as discussed above and as schematically illustrated in FIG. 21*b*.

Additional Remarks

Any of the above-described methods and their embodiments may be implemented, at least partially, by means of a computer program. The computer program may be loaded on an apparatus, such as for example an NSS receiver (running on a rover station or a reference station) or a server (which may comprise one or a plurality of computers). Therefore, the invention also relates, in some embodiments, to a computer program, which, when carried out on an apparatus as described above, such as for example an NSS receiver (running on a rover station or a reference station) or a server, carries out any one of the above-described methods and their embodiments.

The invention also relates, in some embodiments, to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates, in some embodiments, to a computer-readable medium (or to a computer-program product) having computer-executable instructions for carrying out any one of the methods of the invention.

The invention also relates, in some embodiments, to a firmware update adapted to be installed on receivers already in the field, i.e. a computer program which is delivered to the field as a computer program product. This applies to each of the above-described methods, systems and apparatuses.

NSS receivers may include an antenna, or may include multiple antennas to support attitude determination which may also benefit from some embodiments of the present invention, where said antennas are configured to receive the signals at the frequencies broadcasted by the satellites, processor units, one or more accurate clocks (such as crystal oscillators or atomic disciplined crystal oscillators), one or more central processing units (CPU), one or more memory units (RAM, ROM, flash memory, or the like), a display for displaying position information to a user, and the user interface for letting a user enter seeding information 13.

Where the terms "precise estimator unit", "timely estimator unit", "propagator unit", and the like are used herein as units (or sub-units) of an apparatus (such as an NSS receiver), no restriction is made regarding how distributed the constituent parts of a unit (or sub-unit) may be. That is, the constituent parts of a unit (or sub-unit) may be distributed in different software or hardware components or devices for bringing about the intended function. Furthermore, the units may be gathered together for performing their functions by means of a combined, single unit (or sub-unit).

The above-mentioned units and sub-units may be implemented using hardware, software, a combination of hardware and software, pre-programmed ASICs (application-specific integrated circuit), etc. A unit may include a central processing unit (CPU), a storage unit, input/output (I/O) units, network connection devices, etc.

Although the present invention has been described on the basis of detailed examples, the detailed examples only serve to provide the skilled person with a better understanding, and are not intended to limit the scope of the invention. The scope of the invention is much rather defined by the appended claims.

ABBREVIATIONS

ACS ambiguity-constrained solution
BDS BeiDou Navigation Satellite System
ECEF Earth-centered, Earth-fixed
FS float solution
GNSS global navigation satellite system
GPS Global Positioning System
ITRF International Terrestrial Reference System
LAMBDA Least-squares AMBiguity Decorrelation Adjustment
NSS navigation satellite system
PPP precise point positioning
PRN pseudo-random number
RAM random-access memory
RNSS regional navigation satellite system
ROM read-only memory
RTK real-time kinematic
SACS seeding- and ambiguity-constrained solution

REFERENCES

[1] Hofmann-Wellenhof B., et al., *GNSS, Global Navigation Satellite Systems, GPS, GLONASS, Galileo, & more*, Springer-Verlag Wien, 2008.

[2] Landau, H., Vollath, U., Chen. X, "Virtual Reference Station Systems", *Journal of Global Positioning Systems* (2002) Vol. 1, No. 2: 137-143

[3] Chen, X., Allison, T., Cao, W. Ferguson, K., Grüunig, S., Gomez, V., Kipka, A., Köhler, J., Landau, H., Leandro, R., Lu, G., Stolz, R., Talbot, N., "Trimble RTX, an innovative New Approach for Network RTK", 24th International Technical Meeting of the Satellite Division of the Institute of Navigation 2011, ION GNSS 2011, 3: 2214-2219.

[4] Brown et al., "RTK Rover Performance using the Master-Auxiliary Concept", *Journal of Global Positioning Systems* (2006), Vol. 5, No. 1-2: 135-144

[5] European patent application 16 188 047.1, filed on Sep. 9, 2016, by Trimble Navigation Limited, and entitled: "Advanced navigation satellite system positioning method and system using delayed precise information".

[6] Kalman, R. E. (1960). A New Approach to Linear Filtering And Prediction Problems. *ASME Journal of Basic Engineering*, 35-45.

[7] S. Datta-Barua, T. W. (2008). Bounding Higher Order Ionosphere Errors for the Dual Frequency GPS User. *Radio Science*.

[8] Teunissen, P. J. (1994). A new method for fast carrier phase ambiguity estimation. *Proceedings of IEEE Position Location and Navigation Symposium PLANS'94*, 562-573.

[9] Teunissen, P. J. (1995). The least-squares ambiguity decorrelation adjustment: a method for fast GPS integer ambiguity estimation. *Journal of Geodesy*, 65-82.

[10] Y. T. Morton, F. v. (2009). Assessment of the Higher Order ionosphere Error on Position Solutions. *NAVIGATION, Journal of The Institute of Navigation*, Vol 56, No. 3, 185-193.

[11] U.S. Pat. No. 9,562,975 B2

[12] EP 3 206 050 A1

[13] WO 2012/151006 A2

[14] U.S. Pat. No. 9,322,918 B2

The invention claimed is:

1. Method, carried out by at least one of a navigation satellite system receiver, hereinafter abbreviated as "NSS receiver", and a processing entity capable of receiving data from the NSS receiver, for estimating parameters useful to determine a position, the NSS receiver observing an NSS signal from each of a plurality of NSS satellites over multiple epochs, each of these epochs being hereinafter referred to as "receiver epoch", the method comprising:

operating a filter, hereinafter referred to as "precise estimator", that uses state variables comprising at least, but not only, ambiguities in the carrier phases, and computes values of its state variables and associated covariances, those values being hereinafter referred to as a "float solution", based on:
- at least one of: NSS signals observed by the NSS receiver, and information derived from said NSS signals; and
- information, hereinafter referred to as "reference information", comprising at least one of: observations from at least one reference NSS receiver, and information derived from said observations;

obtaining information, hereinafter referred to as "seeding information", comprising at least one of:
(i) a position of the NSS receiver and associated covariances,
(ii) tropospheric delay information and associated covariances, and
(iii) ionospheric delay information and associated covariances;

computing a constrained solution, hereinafter referred to as "seeding- and ambiguity-constrained solution", by constraining the ambiguities of the float solution from the precise estimator by the seeding information, by resolving the resulting pre-constrained ambiguities, and by constraining at least one state variable of the precise estimator other than the ambiguities in the carrier phase by the resolved ambiguities; and determining the position of the NSS receiver using the seeding- and ambiguity-constrained solution or information derived from said seeding- and ambiguity-constrained solution.

2. Method of claim 1, wherein, for a first receiver epoch, the seeding- and ambiguity-constrained solution is computed by constraining the ambiguities of the float solution from the precise estimator by the seeding information, by resolving the resulting pre-constrained ambiguities, and by constraining at least one state variable of the precise estimator other than the ambiguities in the carrier phases by the resolved ambiguities; and the method further comprises the following steps:
for a second receiver epoch after the first receiver epoch, the seeding- and ambiguity-constrained solution is computed by constraining the ambiguities of the precise estimator using the seeding- and ambiguity-constrained solution computed for the first receiver epoch, by resolving the resulting pre-constrained ambiguities, and by constraining at least one state variable of the precise estimator other than the ambiguities in the carrier phases by the resolved ambiguities; and for at least one receiver epoch after the second receiver epoch, the seeding- and ambiguity-constrained solution is computed by constraining the ambiguities of the precise estimator using the seeding- and ambiguity-constrained solution computed for the receiver epoch preceding the receiver epoch under consideration, by resolving the resulting pre-constrained ambiguities, and by constraining at least one state variable of the precise estimator other than the ambiguities in the carrier phases by the resolved ambiguities.

3. Method of claim 1, further comprising, at a receiver epoch under consideration:

determining whether the seeding- and ambiguity-constrained solution computed at the receiver epoch under consideration is inconsistent with the float solution computed by the precise estimator at the receiver epoch under consideration; and if so, not using the seeding- and ambiguity-constrained solution computed at the receiver epoch under consideration to constrain the ambiguities of the precise estimator in order to compute a seeding- and ambiguity-constrained solution for any receiver epoch following the receiver epoch under consideration.

4. Method according to claim 1, further comprising, at a receiver epoch under consideration:

computing a further constrained solution, hereinafter referred to as "ambiguity-constrained solution", by resolving the pre-constrained ambiguities and by constraining at least one state variable of the precise estimator other than the ambiguities in the carrier phases by the resolved ambiguities.

5. Method of claim 4, further comprising, at a receiver epoch under consideration:

determining whether the seeding- and ambiguity-constrained solution computed at the receiver epoch under consideration is inconsistent with the ambiguity-constrained solution computed at the receiver epoch under consideration, and, if so, not using the seeding- and ambiguity-constrained solution computed at the receiver epoch under consideration to constrain the ambiguities of the precise estimator in order to compute a seeding- and ambiguity-constrained solution for any receiver epoch following the receiver epoch under consideration.

6. Method of claim 4, further comprising, at the receiver epoch under consideration:

determining whether the seeding- and ambiguity-constrained solution computed at the receiver epoch under consideration and the ambiguity-constrained solution computed at the receiver epoch under consideration have converged towards one another, and, if so, not using the seeding- and ambiguity-constrained solution computed at the receiver epoch under consideration to constrain the ambiguities of the precise estimator in order to compute a seeding- and ambiguity-constrained solution for any receiver epoch following the receiver epoch under consideration.

7. Method according to claim 1, further comprising:
operating a further filter, hereinafter referred to as "timely estimator", that:
also uses state variables; and
computes values of its state variables and associated covariances based on at least one of: NSS signals observed by the NSS receiver at the current receiver epoch, and information derived from said NSS signals; and
inputting into the timely estimator a solution computed based on the precise estimator's state variables.

8. Method of claim 7, wherein inputting into the timely estimator a solution computed based on the precise estimator's state variables comprises:
inputting the seeding- and ambiguity-constrained solution into the timely estimator.

9. Method according to claim 7, wherein inputting into the timely estimator a solution computed based on the precise estimator's state variables comprises:
at a receiver epoch under consideration:
determining whether the seeding- and ambiguity-constrained solution computed at the receiver epoch under consideration has been determined to be inconsistent with the float solution computed by the precise estimator at the receiver epoch under consideration;
if so, inputting the float solution into the timely estimator; and
otherwise, inputting the seeding- and ambiguity-constrained solution into the timely estimator.

10. Method according to claim 7, wherein inputting into the timely estimator a solution computed based on the precise estimator's state variables comprises:
at a receiver epoch under consideration:
determining whether the seeding- and ambiguity-constrained solution computed at the receiver epoch under consideration has been determined to be inconsistent with the ambiguity-constrained solution computed at the receiver epoch under consideration;
if so, inputting the ambiguity-constrained solution into the timely estimator; and
otherwise, inputting the seeding- and ambiguity-constrained solution into the timely estimator.

11. Method according to claim 7, wherein inputting into the timely estimator a solution computed based on the precise estimator's state variables comprises:
at a receiver epoch under consideration:
determining whether the seeding- and ambiguity-constrained solution computed at the receiver epoch under consideration has been determined to be inconsistent with the float solution computed by the precise estimator at the receiver epoch under consideration, or if the seeding- and ambiguity-constrained solution computed at the receiver epoch under consideration has been determined to be inconsistent with the ambiguity-constrained solution computed at the receiver epoch under consideration;
if so, inputting the ambiguity-constrained solution into the timely estimator; and
otherwise, inputting the seeding- and ambiguity-constrained solution into the timely estimator.

12. Method according to claim 7, wherein inputting into the timely estimator a solution computed based on the precise estimator's state variables comprises:
at a receiver epoch under consideration:
determining whether the seeding- and ambiguity-constrained solution computed at the receiver epoch under consideration has been determined to be inconsistent with the float solution computed by the precise estimator at the receiver epoch under consideration, or if the seeding- and ambiguity-constrained solution computed at the receiver epoch under consideration and the ambiguity-constrained solution computed at the receiver epoch under consideration have been determined to have converged towards one another;
if so, inputting the ambiguity-constrained solution into the timely estimator; and
otherwise, inputting the seeding- and ambiguity-constrained solution into the timely estimator.

13. Method according to claim 7, wherein inputting into the timely estimator a solution computed based on the precise estimator's state variables comprises:
at a receiver epoch under consideration:
determining whether the seeding- and ambiguity-constrained solution computed at the receiver epoch under consideration has been determined to be inconsistent with the ambiguity-constrained solution computed at the receiver epoch under consideration, or if the seeding- and ambiguity-constrained solution computed at the receiver epoch under consideration and the ambiguity-constrained solution computed at the receiver epoch under consideration have been determined to have converged towards one another;
if so, inputting the ambiguity-constrained solution into the timely estimator; and
otherwise, inputting the seeding- and ambiguity-constrained solution into the timely estimator.

14. Method according to claim 7, wherein inputting into the timely estimator a solution computed based on the precise estimator's state variables comprises:
at a receiver epoch under consideration:
determining whether the seeding- and ambiguity-constrained solution computed at the receiver epoch under consideration has been determined to be inconsistent with the ambiguity-constrained solution computed at the receiver epoch under consideration, or if the seeding- and ambiguity-constrained solution computed at the receiver epoch under consideration has been determined to be inconsistent with the float solution computed by the precise estimator at the receiver epoch under consideration, or if the seeding- and ambiguity-constrained solution computed at the receiver epoch under consideration and the ambiguity-constrained solution computed at the receiver epoch under consideration have been determined to have converged towards one another;
if so, inputting the ambiguity-constrained solution into the timely estimator; and
otherwise, inputting the seeding- and ambiguity-constrained solution into the timely estimator.

15. System comprising at least one of a navigation satellite system receiver, hereinafter abbreviated as "NSS receiver", and a processing entity capable of receiving data from the NSS receiver, for estimating parameters useful to determine a position, the NSS receiver observing an NSS signal from each of a plurality of NSS satellites over multiple epochs, each of these epochs being hereinafter referred to as "receiver epoch", the system comprising:
- a filter, hereinafter referred to as "precise estimator", configured to use state variables comprising at least, but not only, ambiguities in the carrier phases, and to compute values of its state variables and associated covariances, those values being hereinafter referred to as a "float solution", based on:
  - at least one of: NSS signals observed by the NSS receiver, and information derived from said NSS signals; and
  - information, hereinafter referred to as "reference information", comprising at least one of: observations from at least one reference NSS receiver, and information derived from said observations;

the system being configured for:
- obtaining information, hereinafter referred to as "seeding information", comprising at least one of:
  - (i) a position of the NSS receiver and associated covariances, and
  - (ii) tropospheric delay information and associated covariances, and
  - (iii) ionospheric delay information and associated covariances; and computing a constrained solution, hereinafter referred to as "seeding- and ambiguity-constrained solution", by constraining the ambiguities of the float solution from the precise estimator by the seeding information, by resolving the resulting pre-constrained ambiguities, and by constraining at least one state variable of the precise estimator other than the ambiguities in the carrier phase by the resolved ambiguities; and determining the position of the NSS receiver using the seeding- and ambiguity-constrained solution or information derived from said seeding- and ambiguity-constrained solution.

16. Computer program or set of computer programs comprising non-transitory computer-readable instructions configured, when executed on a computer or set of computers, to cause the computer or set of computers to carry out the method according claim 1.

* * * * *